US012709011B2

(12) United States Patent
Simon et al.

(10) Patent No.: US 12,709,011 B2
(45) Date of Patent: Aug. 18, 2026

(54) APPARATUS AND METHOD FOR AUTOMATIC PALLET BUILDER CALIBRATION

(71) Applicant: SYMBOTIC CANADA, ULC, Lafontaine (CA)

(72) Inventors: Christian Simon, Laval (CA); William Légaré, Terrebonne (CA); Tristan Bouchard, Lafontaine (CA); Yannick Delisle, Lafontaine (CA)

(73) Assignee: SYMBOTIC CANADA, ULC (CA)

( * ) Notice: Subject to any disclaimer, the term of this patent is extended or adjusted under 35 U.S.C. 154(b) by 858 days.

(21) Appl. No.: 18/168,315

(22) Filed: Feb. 13, 2023

(65) Prior Publication Data

US 2023/0278221 A1 Sep. 7, 2023

Related U.S. Application Data

(60) Provisional application No. 63/310,450, filed on Feb. 15, 2022.

(51) Int. Cl.
*B25J 9/16* (2006.01)

(52) U.S. Cl.
CPC .......... *B25J 9/1687* (2013.01); *B25J 9/1692* (2013.01); *B25J 9/1697* (2013.01)

(58) Field of Classification Search
CPC ...... B25J 9/1687; B25J 9/1692; B25J 9/1697; B25J 9/023; B65G 61/00; B65G 2203/041; B65G 47/904; B65G 47/905; B65G 57/03; B65G 2201/02; B65G 2814/035; G05B 2219/40006; G05B 2219/40067
See application file for complete search history.

(56) References Cited

U.S. PATENT DOCUMENTS

| | | | | |
|---|---|---|---|---|
| 10,369,698 | B1 | 8/2019 | Islam et al. | |
| 10,576,636 | B1 * | 3/2020 | Islam | B25J 9/1692 |
| 10,706,587 | B1 | 7/2020 | Sorgi et al. | |
| 11,508,088 | B2 * | 11/2022 | Islam | B25J 9/1697 |
| 2014/0121804 | A1 * | 5/2014 | Guo | B25J 9/1692 700/108 |
| 2016/0214255 | A1 | 7/2016 | Uhlenbrock et al. | |
| 2019/0016543 | A1 * | 1/2019 | Turpin | B25J 9/1697 |
| 2020/0238525 | A1 | 7/2020 | Drixler et al. | |

(Continued)

*Primary Examiner* — Timothy R Waggoner
(74) *Attorney, Agent, or Firm* — Perman & Green, LLP

(57) ABSTRACT

A pallet building apparatus, for automatically building a pallet load of pallet load article units onto a pallet support, includes a frame defining a pallet station with a pallet building base for the pallet support, an articulated robot connected to the frame, at least one three-dimensional camera, connected to the frame separate and distinct of the articulated robot, and disposed to generate three-dimensional imaging of the pallet support on the pallet building base and of a pallet load build on the pallet support, a controller operably connected to the at least one articulated robot and the at least one three-dimensional camera, and an automatic calibration system for calibrating the articulated robot, the controller being communicably connected to the automatic calibration system, and being configured to automatically calibrate the articulated robot, from a substantially uncalibrated state, and automatically teach the articulated robot a location of the pallet station.

34 Claims, 49 Drawing Sheets

(56) References Cited

U.S. PATENT DOCUMENTS

2020/0273138 A1* 8/2020 Chavez .................. G06T 7/174
2020/0276713 A1 9/2020 Zhang et al.
2021/0114826 A1 4/2021 Simon et al.
2024/0091952 A1* 3/2024 Li .......................... B25J 9/1692

* cited by examiner

100WS
10C
10B
PALLETIZER/DE-PALLETIZER CELL
14
310
142
Op
IN/OUT CASE CONVEYOR
150B
160
AUTOMATED STORAGE AND RETRIEVAL SYSTEM
BOT(S)
110
130A
130
130B
100
STORAGE STRUCTURE LEVEL(S)/ARRAY
PICKING AISLES
TRANSFER DECK(S)
STORAGE LOCATION(S)
130SL
Bp
Ip
150C
150A
10A
170
180C
180
PALLET LOAD OUT
199
WAREHOUSE MANAGEMENT SYSTEM
CONTROLLER
199C
UI
175C
175
PALLET LOAD IN 14
14
310C2
24

RFR
Z
X
310C3
14F
310C4
310C1
12
BPAL
10
FOV3
SPAL
FOV2
3DS
301
FOV1

10
FER
ER
301
24
ER
ER
12
BPAL
310C4
310C3
ER
310C2
310C1
45°
45°
14
14

APPARATUS AND METHOD FOR AUTOMATIC PALLET BUILDER CALIBRATION

CROSS-REFERENCE TO RELATED APPLICATIONS

This application is a non-provisional of and claims the benefit of U.S. provisional application No. 63/310,450 filed on Feb. 15, 2022, the disclosure of which is incorporated herein by reference in its entirety.

BACKGROUND

1. Field

The disclosed embodiment, and aspects thereof, generally relate to storage and retrieval systems and, more particularly, to palletizing/depalletizing cells of the storage and retrieval systems.

2. Brief Description of Related Developments

The retail distribution of products (whether for conventional "brick and mortar" stores, online stores, or mixed retail channels) demands improvements in storage, sortation, and transport efficiencies, particularly for distribution of what is known as mixed cases or heterogeneous cases (within a given transport) whether for store replenishment or individual orders. The application of intelligent/adaptive automation thereto has increasingly facilitated improvement in efficiency at many levels of distribution including storage, sortation and transport.

Still, persistently difficult problems remain producing bottlenecks that disrupt, or adversely impact general system efficiency, such as the mixed case pallet load (or truck load) efficiency problem. As may be readily realized, the difficulty of the pallet load (or truck load) efficiency problem is not due singularly from the desire for high packing density, but rather pallet load efficiency is dependent on both packing density and building the pallet load in a time optimal manner (i.e. the build puzzle of packing the pallet load to densities over 90% may be solved readily given whatever time necessary and the necessary selection of mixed cases, but such pallet load would not be efficient if the pallet load build time is not time optimal).

Calibration of conventional pallet loaders (e.g., robotic palletizers) may affect pallet building efficiency, creating bottlenecks in system throughput efficiency. The pallet loaders are generally calibrated, with respect to the position of features of a pallet loader workspace (e.g., pallet locations, conveyor locations, etc.) that the pallet loader interfaces with. Conventionally, the calibration of a pallet loader is performed manually by a pallet loader expert in a time consuming and complex process. Due to each pallet loader being calibrated by a human, the calibration is subjective and may be inconsistent, depending highly on the thoroughness and skill of the human performing the calibration. Moreover, it is difficult to identify root causes of palletization inaccuracies due to the subjective nature of the manual calibration process.

BRIEF DESCRIPTION OF THE DRAWINGS

The foregoing aspects and other features of the disclosed embodiment are explained in the following description, taken in connection with the accompanying drawings, wherein.

DETAILED DESCRIPTION

Figure 1:
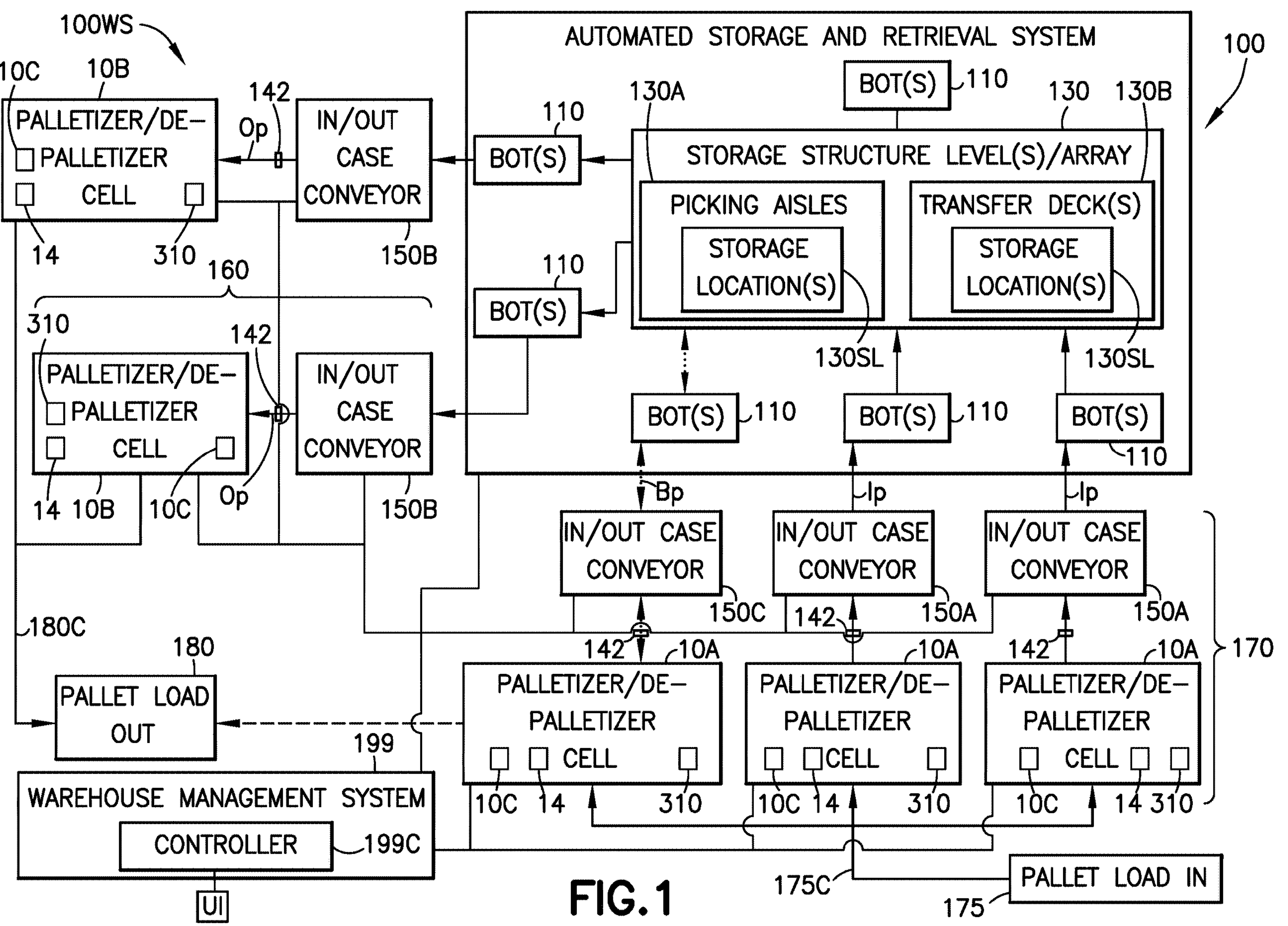
FIG. 1 is a schematic illustration of a distribution facility in accordance with aspects of the disclosed embodiment.

FIG. 1 is a schematic illustration of a warehouse system or distribution facility 100WS (referred to herein as warehouse system 100WS) in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used. It should be understood that while the distribution facility 100WS is described herein as an automated distribution facility the aspects of the disclosed embodiment are also applicable to distribution facilities having any suitable transport systems, such as both automated and manual transport systems or to wholly manual transport systems.

Figure 2:
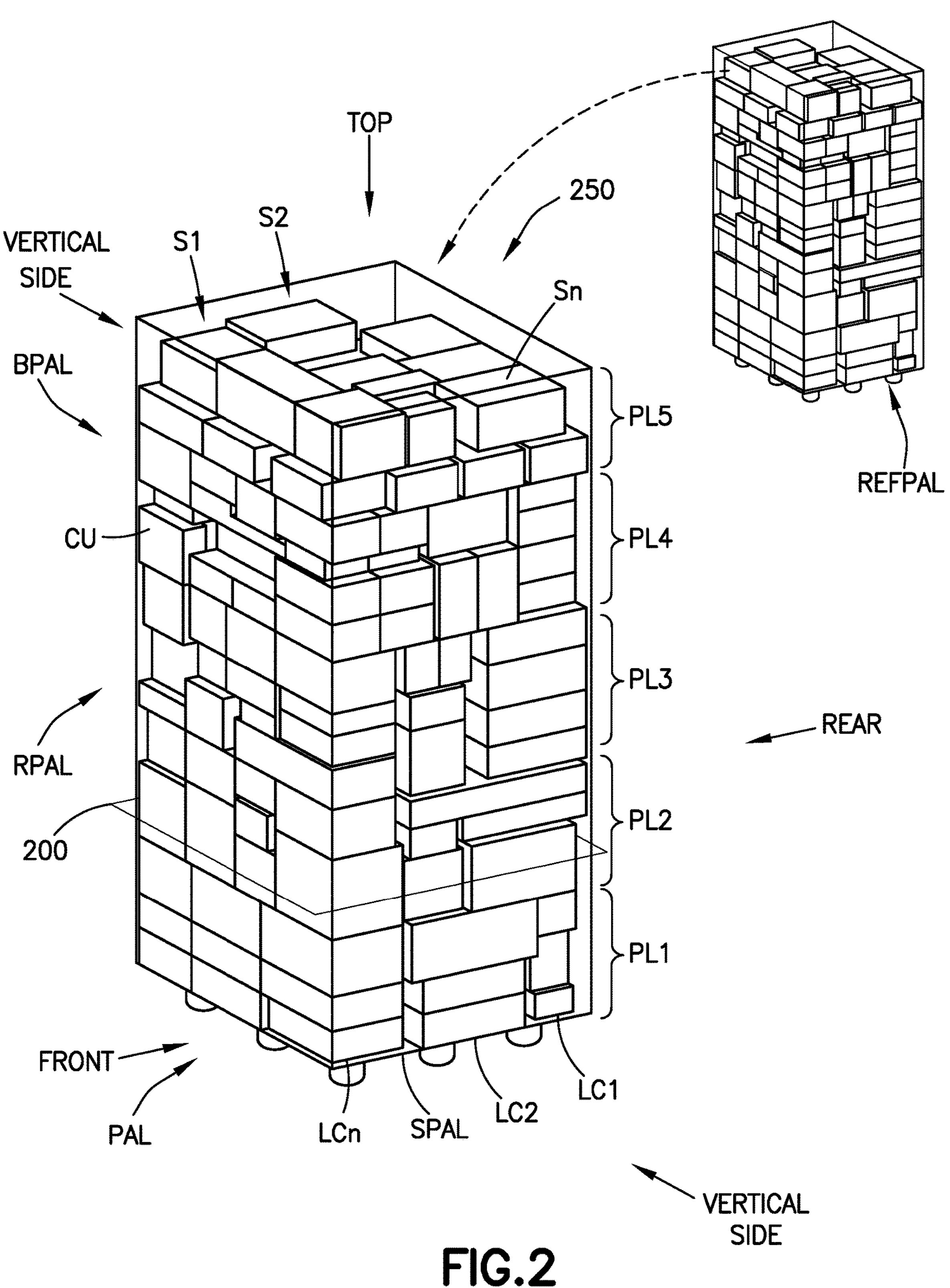
FIG. 2 is a schematic illustration of a pallet load in accordance with aspects of the disclosed embodiment.

Referring to FIGS. 1 and 2, in accordance with the aspects of the disclosed embodiment, the warehouse system 100WS includes at least one real time adaptive palletizer/depalletizer cell 10A, 10B (generally referred to herein as palletizer cell 10). The palletizer cell 10 has one or more robotic case manipulator(s) 14 (also referred to herein as articulated robots or robots) that place (individually or manufactured pickfaces) mixed pallet load article units CU (also referred to herein as case units or cases) in stacks SL1-Sn and/or layers PL1-PL4 building a mixed case pallet load PAL with vision system assistance, such as in the manner described in U.S. Pat. No. 10,894,676 issued on Jan. 19, 2021, the disclosure of which is incorporated herein by reference in its entirety.

The palletizer cell 10 (or pallet building apparatus) is provided with a vision system 310 including three-dimensional (3D) time of flight (TOF) camera(s) 310C1-310C4 and an electromagnetic sensor 500, separate and distinct from the three-dimensional cameras 310C1-310C4, (collectively referred to herein as the vision system 310—see FIGS. 3A-4N and 5A-5B), that is employed, in the manner described herein, for fully automatic calibration (and maintenance of that calibration) and validation of the palletizer cell 10 (e.g., from a substantially uncalibrated state).

The three-dimensional (3D) time of flight (TOF) camera (s) and the electromagnetic sensor 500 (e.g., a two-dimensional (2D) color camera 500C) are mounted to the frame 24 of the palletizer cell 10 separate and distinct from the robot(s) 14. The three-dimensional camera(s) may be included in the automatic calibration system ACS and is/are connected to the frame and configured to three-dimensionally image at least one part of the robot(s) 14, and the pallet support SPAL or pallet load build BPAL on the pallet building base 301. For example, the vision system 310 forms at least part of an automatic calibration system ACS for calibrating the robot(s) 14 of the palletizer cell 10. As will be described herein, the controller 10C is communicably connected to the automatic calibration system ACS so as to automatically calibrate the robot(s) 14, from the substantially uncalibrated state, and automatically teach the robot(s) a location or datum (i.e., a surface or feature of the palletizer cell pallet station from which other features of the palletizer cell pallet) of the palletizer cell 10 pallet station (e.g., a location of the pallet load support SPAL on the elevator 12 and/or empty pallet conveying mechanism 20) resolving a position of the end effector or end of arm tool(s) 410 of the robot(s) 14 to the pallet station to build a pallet load (such as in FIG. 2) with placement of an article or case unit CU (also referred to herein as a pallet load article unit) on the pallet load support SPAL. The controller 10C characterizes a placement location for each case unit CU placed with the end effector 410 that builds the pallet load PAL on the pallet support SPAL. The controller 10C is configured to calibrate at least the three-dimensional cameras 310C1-310C4 of the vision system 310 relative to the end of arm tool 410 based on, for example, at least data obtained from the automatic calibration system ACS. As will be described herein, the controller 10C and the automatic calibration system ACS are configured to effect automatic calibration and automatic teaching of the robot(s) 14 substantially coincident with the automatic calibration of each three-dimensional camera 310C1-310C4 imaging each case unit CU, placed by the robot(s) 14, building the pallet load PAL.

As used herein, calibration includes one or more of automatic calibration for travel (i.e., in a lift direction) of a pallet lift or elevator 12 (see, e.g., FIGS. 3A-3C, 4, and 4B—e.g., automatically compute the zero position of the lift 12), automatic calibration of a push axis PAX of an end of arm tool 410 (see FIG. 4) of a robot 14 (e.g., automatically validate/compute the zero position of the end of arm tool 410), automatic teaching of a referential frame (e.g., coordinate system and work envelope) of a robot 14, automatic teaching of work referential frames (also referred to as pallet offsets), and automatic detection of calibration errors/mechanical issues (e.g., abnormal robot kinematics, abnormal encoder operations, bent transfer forks 20, bent fingers on the end of arm tool 410, skewed lift 12, uncentered pallets, etc.), automatically define a pick position of an infeed conveyor 16, automatically define common reference (e.g., to each of the robots 14) references (e.g., pallet transfer fork 20 reference frame, reference frame of a pallet on the fork 20, and reference frame of a pallet on the lift 12) of the palletizer cell 10.

The vision system 310 may also be employed to validate calibration of the robot 14 at any suitable time, such as after a robot move error and/or periodically. As may be realized, the automatic calibration of the robot 14 may coincidently resolve pallet quality/controls and build with the robot 14. The vision system 310, incorporated into the automated palletizer cell 10, informs and enables a cell controller 10C so as to provide, real time command inputs (to the automation such as the robot(s) 14) that are responsive to calibration fixture locations/movements to effect automatic calibration of the robot 14 in the manner described herein.

The aspects of the disclosed embodiment provide for simplification of and acceleration of palletizer cell robots 14 calibration and teaching. For exemplary purposes, the robot (s) 14 described herein are four degree of freedom (4-axis) robots but the aspects of the disclosed embodiment may be equally applied to six degree of freedom (6-axis) robots or robots having any suitable degrees of freedom. As the calibration and teaching of the robots 14 is fully automatic (e.g., not dependent on human interaction), the calibration/teaching of the robots 14 is consistent across the robots 14 of a same palletizer cell 10 and between the robots 14 of different palletizer cells 10 in a same facility (and between robots/palletizer cells of different facilities). With the calibration/recalibration of the cells 10 being fully automatic, the calibration may be verified periodically so as to substantially prevent and detect misalignment between palletizer cell 10 components (e.g., misalignment of robot 14 axes, misalignment of lift 12 axes, etc.) Data from the calibration/teaching may also be stored in controller 10C to provide for quantitative evaluation of calibration/teaching accuracy.

Referring again to FIG. 1, in accordance with aspects of the disclosed embodiment the distribution facility 100WS includes a storage and retrieval system 100 that may operate in a retail distribution center or warehouse to, for example, fulfill orders received from retail stores for case units. In one example, the case units may be cases or units of goods not stored in trays, on totes or on pallets (e.g. uncontained). In other examples, the case units may be cases or units of goods that are contained in any suitable manner such as in trays, on totes or on pallets. It is noted that the case units may include cased units of goods (e.g. case of soup cans, boxes of cereal, etc.) or individual goods that are adapted to be taken off of or placed on a pallet. In accordance with the aspects of the disclosed embodiment, shipping cases for case units (e.g. cartons, barrels, boxes, crates, jugs, or any other suitable device for holding case units) may have variable sizes and may be used to hold case units in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different case units (e.g. each pallet may hold different types of case units—a pallet holds a combination of soup and cereal). In the aspects of the disclosed embodiment, the storage and retrieval system described herein may be applied to any environment in which case units are stored and retrieved.

The storage and retrieval system 100 may be configured for installation in, for example, existing warehouse structures or adapted to new warehouse structures. In the aspects of the disclosed embodiment, the storage and retrieval system may include one or more in-feed transfer station 170 and one or more out-feed transfer station 160, in/out case conveyors 150A, 150B, 150C (generally referred to as in/out case conveyors 150), a storage structure array 130, and a number of autonomous vehicular transport robots 110 (referred to herein as "bots"). In the aspects of the disclosed embodiment, the storage and retrieval system may also include robot or bot transfer stations, as described in U.S. Pat. No. 9,096,375 issued on Aug. 4, 2015 the disclosure of which is incorporated by reference herein in its entirety. In the aspects of the disclosed embodiment, the bot transfer stations may provide an interface between the bots 110 and the in/out case conveyors 150 such that case units can be indirectly transferred between the bots 110 and the in/out case conveyors 150 through the bot transfer stations. In the aspects of the disclosed embodiment case units may be transferred directly between the bots 110 and the in/out case conveyors 150.

The storage structure array 130 may include multiple levels of storage rack modules that form a storage array of storage locations 130SL for case units, each storage location 130SL of which is arranged for storage of at least one case unit at each storage location 130SL. In one aspect, each level of the storage structure array 130 includes respective storage/picking aisles 130A, and transfer decks 130B for transferring case units between any of the storage areas of the storage structure array 130 and any shelf of any in/out case conveyors 150. The storage aisles 130A, and transfer decks 130B are also configured to allow the bots 110 to traverse the storage aisles 130A and transfer decks 130B for placing case units into picking stock and to retrieve ordered case units, where the case units are stored or otherwise held in the storage aisles 130A and/or on the transfer deck 130B in storage locations 130SL. The bots 110 may be any suitable bots capable of carrying and transferring case units throughout the storage and retrieval system 100. Suitable examples of bots can be found in, for exemplary purposes only, U.S. Pat. No. 8,425,173 issued on Apr. 23, 2013, U.S. Pat. No. 9,561,905 issued on Feb. 7, 2017, U.S. Pat. No. 8,965,619 issued on Feb. 24, 2015, U.S. Pat. No. 8,696,010 issued on Apr. 15, 2014, U.S. Pat. No. 9,187,244 issued on November 113/326,952 (which is non-provisional of U.S. Ser. No. 61/423,365 filed on Dec. 15, 2010) entitled "Automated Bot with Transfer Arm" filed on Dec. 15, 2011, and U.S. Pat. No. 9,499,338 issued on Nov. 22, 2016, the disclosures of which are incorporated by reference herein in their entireties. The bots 110 may be configured to place case units, such as the above described retail merchandise, into picking stock in the one or more levels of the storage structure array 130 and then selectively retrieve ordered case units for shipping the ordered case units to, for example, a store or other suitable location.

The in-feed transfer stations 170 and out-feed transfer stations 160 may operate together with their respective in/out case conveyors 150A, 150B for bi-directionally transferring case units to and from one or more levels of the storage structure array 130 effecting infeed of the case units into the storage structure array 130 and output of the case units from the storage structure array 130. It is noted that while the in-feed transfer stations 170 and the outfeed transfer stations 160 (and their respective in/out case conveyors 150A, 150B and palletizer/depalletizer cells 10A, 10B) are described as being dedicated inbound (e.g. in-feed) transfer stations 170 and dedicated outbound (e.g. out-feed) transfer stations 160, in the aspects of the disclosed embodiment each of the transfer stations 170, 160 may be used for both inbound and outbound transfer of case units from the storage and retrieval system. It is noted that while in/out case conveyors are described herein, the conveyors may be any suitable conveyors (including any suitable transport path orientation, such as vertical and/or horizontal conveyor paths) or transfer/picking devices having any suitable transport path orientation.

In one aspect, as described above, each of the in-feed transfer stations 170 and the out-feed transfer stations 160 include a respective in/out case conveyor 150A, 150B and a respective palletizer/depalletizer cell 10A, 10B (referred to generally herein as palletizer cell 10). In one aspect, the palletizer/depalletizer cells 10 are automated cells each being configured to receive loaded pallets (such as with uniform or mixed case units or products) from, for example, a pallet load in 175 area which may include an in-out loaded pallet conveyor 175C (illustrated in FIG. 1 as an input conveyor) and/or build a loaded pallet (such as with uniform or mixed case units or products) for transport to, for example, a pallet load out 180 area which may include an in-out loaded pallet conveyor 180C (illustrated in FIG. 1 as an output conveyor). In one aspect, the conveyors 175C, 180C are each connected to the storage structure array 130 and are configured so as to bi-directionally transport loaded pallets in an input direction towards the storage structure array 130, and in a different output direction away from the storage structure array 130. In one aspect, the conveyors 175C, 180C may each include a conveyor arrangement with a distributed conveyor bed arranged to form a conveying path or in other aspects, the conveyors 175C, 180C may be discrete transport units such as, for example, a fork lift/pallet truck. Suitable examples of automated palletizer/depalletizer cells 10A, 10B may be found in U.S. Pat. No. 10,370,199 issued on Aug. 6, 2019, and U.S. Pat. No. 8,965,559 issued on Feb. 24, 2015, the disclosures of which are incorporated herein by reference in their entireties. Each palletizer cell includes one or more robotic case manipulators 14, which may also be referred to articulated robots or robots. The one or more robotic case manipulators 14 are configured, as described herein, so as to transport and place the pallet load article units CU (also referred to herein as cases or case units) serially onto a pallet support so as to build the pallet load 250 on a pallet building base 301 (see FIG. 3).

Where the palletizer cell 10 functions in an output role as a palletizer, pallet load article units CU, that can be of various sizes, arrive at the palletizer cell 10 via the in/out case conveyors 150B, are picked by one of the robotic case manipulators 14 and placed on the pallet PAL as will be described herein. Where the palletizer cell 10 functions in an output role as a palletizer, a full pallet PAL (see FIG. 2) made from a variety of case units is ready to be picked up by a forklift from the palletizer cell 10 for conveyance to a pallet load out 180 area. Where the palletizer/depalletizer cell 10 functions in an input role as a depalletizer, a full pallet (which may be similar to pallet PAL and formed of homogenous or mixed cases) made from a variety of pallet load article units CU is transferred to the palletizer cell 10 in any suitable manner, such as a fork lift, from a pallet load in 175 area. The one or more robotic case manipulators 14 pick the pallet load article units CU from the pallet PAL for transfer into the storage structure array 130.

In one aspect, each in-feed transfer station 170 forms, a case input path Ip where the palletizer/depalletizer cell 10A depalletizes case units, layer by layer, or otherwise depalletizes the case units into single case units from standard pallets (e.g. homogenous pallets having a stability suitable for automatic engagement of a pallet layer by an automatic layer interface unit, such as the picking product apparatus 14). The palletizer/depalletizer cell 10A is in communication with a transport system of the automated storage and retrieval system 100, such as an in/out case conveyor 150A so as to form an integral input system (e.g. the in-feed transfer station 170) that feeds case units to the automated storage and retrieval system 100. Each in-feed transfer station 170 defines the case input path Ip that is integrated with the automated storage and retrieval system 100 and warehouse management system 199, where the warehouse management system 199 includes any suitable controller 199C configured with any suitable non-transitory program code and memory to manage, at least, case unit input to the storage structure array 130B, case unit storage distribution within the storage structure array 130B and case unit retrieval from the storage structure array 130B, case unit inventory/replenishment and case unit output.

In one aspect, each case unit input path Ip includes at one corresponding case unit inspection cell 142 in communication with the warehouse management system 199. In one aspect, the at least one corresponding case unit inspection cell 142 may be any suitable inspection cell including any suitable volumetric inspection, such as with a multi-dimensional light curtain, imaging systems and/or any other suitable sensing/sensor arrangement configured to detect case unit defects and identify the case units for, e.g., inventory, transport sequencing, storage distribution and sequencing the case unit for output from the storage structure array 130B.

In one aspect, as noted above, the palletizer/depalletizer cell 10A may be fully automatic so as to break down or decommission layer(s) from a pallet unloading at the palletizer/depalletizer cell 10A. It is noted that, referring to FIG. 2, the term decommission refers to the removal of a pallet layer PL1, PL2, PL3, PL4 (in whole or in part) from a pallet PAL so that each pallet load article unit CU is removed from the layer PL1, PL2, PL3, PL4 at a predetermined level 200 (which may correspond to a decommissioning/commissioning level or transfer plane) of the pallet PAL so that the pallet PAL is indexed to a next level of the pallet PAL (e.g., with the pallet lift PLFT—see FIG. 4) for removal of the next layer PL2, PL3 (in whole or in part) corresponding to the next level of the pallet PAL.

In one aspect, the palletizer/depalletizer cell 10A is configured to decommission the layers PL1, PL2, PL3, PL4 so that the decommissioning is synchronous or otherwise harmonized (e.g. matched with) by the warehouse management system 199 with a predetermined rate of case unit flow or feed rate, established by the warehouse management system 199, in the automated storage and retrieval system 100. For example, in one aspect, the warehouse management system 199 is configured to set and/or monitor a predetermined rate of case unit flow within the automated storage and retrieval system 100. For example, the warehouse management system 199 monitors and manages the automated systems of the automated storage and retrieval system 100 (such as, e.g., the in/out case conveyors 150A, 150B, bots 110 and palletizer/depalletizer cells 10A, 10B), where each of the automated systems, or one or more of automated systems have a given transaction time (such as a time/period to effect a basic unit of transport or transfer of cases, e.g. to transfer a case unit on/off the in/out case conveyor to a pick/place station, or lift a case unit a predetermined distance, or bot transfer pick/place on a storage location, a time to transfer a pallet layer to or from a pallet, etc.) that in effect, singularly or in combination define, under control of the warehouse management system 199 or any other suitable controller of the automated storage and retrieval system 100 (e.g. bot controllers, conveyor controllers, palletizer/depalletizer controllers, etc.), the predetermined rate of case unit flow in the automated storage and retrieval system 100 established by the warehouse management system 199. For example, the controller 199C of the warehouse management system 199 is communicably connected to the in-out case conveyor(s) 150A, 150B so that the in-out case conveyor(s) 150A, 150B bi-directionally transport the case units to and from the storage structure array 130 at a predetermined case feed rate. The controller 199C may also be communicably connected to a palletizer-depalletizer cell 10A, 10B corresponding to the in-out case conveyor(s) 150A, 150B so that the layer commissioning and decommissioning the palletizer/depalletizer cell 10A, 10B, which are respectively substantially continuous, matches the predetermined case feed rate. While the aspects of the disclosed embodiment are described herein with respect to a distribution facility 100WS having automated storage and retrieval system 100 with automated transport systems, the aspects of the disclosed embodiment are also applicable to distribution facilities having any suitable transport systems such as both automated and manual transport systems or to wholly manual transport systems, where both the automated transport transactions and the manual transport transactions each have respective transaction times where the commissioning and decommissioning of case units to and from pallets may be matched to the transaction times in a manner substantially similar to that described herein.

In one aspect, each out-feed transfer station 160 forms, a case output path Op where the palletizer/depalletizer cell 10B palletizes case units, layer by layer onto pallets PAL such as with an automatic layer interface unit, such as the one or more robotic case manipulators 14. In one aspect, the pallets PAL may be formed as standard pallets (e.g. homogeneous case units) or as mixed pallets, such as described in U.S. Pat. No. 9,856,083 issued on Jan. 2, 2018 the disclosure of which is incorporated herein by reference in its entirety. In one aspect, the warehouse management system 199 is configured to establish a pallet solution, with mixed case units, that provides a stable pallet load stack suitable for an end effector of the one or more robotic case manipulators 14 to transfer as a layer. As described above, a suitable example, of the palletizer/depalletizer cell 10B may be found in U.S. Pat. No. 10,370,199 issued on Aug. 6, 2018, the disclosure or which was previously incorporated herein by reference in its entirety.

In one aspect, the palletizer/depalletizer cell 10B is in communication with a transport system of the automated storage and retrieval system 100, such as an in/out case conveyor 150B so as to form an integral output system (e.g. the out-feed transfer station 160) that receives case units from the automated storage and retrieval system 100 for placement on pallets according to any suitable case out order sequence. For example, as described above, pallet load article units CU routed to the one or more robotic case manipulators 14 are transferred to the pallet PAL by the end effector of the one or more robotic case manipulators 14, with the pallet load article units CU (output case units) being arranged in a predetermined sequence established by the warehouse management system 199, layer by layer (noting that the layer may cover the pallet in whole or in part) to form a standard output pallet load.

Each out-feed transfer station 160 defines the case output path Op that is integrated with the automated storage and retrieval system 100 and warehouse management system 199, where the warehouse management system 199 includes any suitable controller 199C configured with any suitable non-transitory program code and memory to manage the operation of the distribution facility 100WS, including case unit output from the storage structure array 130B, as described herein. In one aspect, each case unit output path Op includes at least one corresponding case unit inspection cell 142 (as described above) in communication with the warehouse management system 199. In one aspect, as noted above, the palletizer/depalletizer cell 10B may be fully automatic so as to build or commission layer(s) to a pallet loading at the palletizer/depalletizer cell 10B. It is noted that, referring to FIG. 2, the term commission refers to the construction of a pallet layer PL1, PL2, PL3, PL4 (in whole or in part) to a pallet PAL so that each pallet load article unit CU is inserted to the layer PL1, PL2, PL3, PL4 at a predetermined level 200 (which may correspond to a decommissioning/commissioning level or transfer plane) of the pallet PAL until the pallet layer PL1, PL2, PL3, PL4 is formed so that the pallet PAL is indexed to a next level (e.g., with the pallet lift PLFT—see FIG. 4) of the pallet PAL for building of the next layer PL1, PL2 (in whole or in part) corresponding to the next level of the pallet PAL. In one aspect, the palletizer/depalletizer cell 10B is configured to commission the layers PL1, PL2, PL3, PL4 so that the commissioning is synchronous or otherwise harmonized (e.g. matched with) by the warehouse management system 199 with a predetermined rate of case unit flow or feed rate, established by the warehouse management system 199, in the automated storage and retrieval system 100 in a manner substantially similar to that described above with respect to the decommissioning of the layers PL1, PL2, PL3, PL4 where the warehouse management system 199 manages case unit retrieval order and the sequence of mixed case unit output to loadout sequence of the mixed case unit pallet load, and other associated aspects of output such as inventory reconciliation.

Figure 3A:
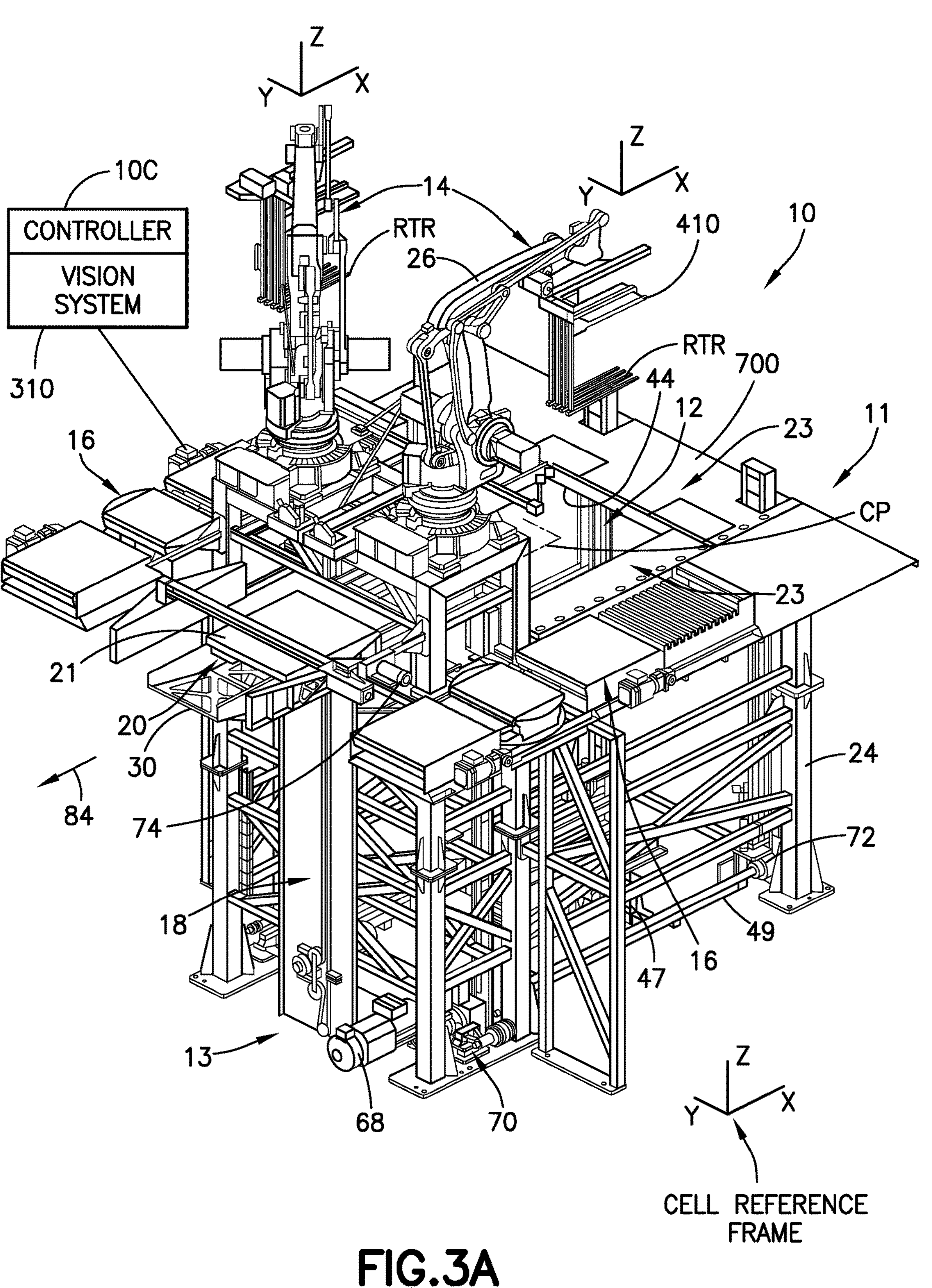
FIG. 3A is a top perspective illustration of a palletizer cell of FIG. 1 in accordance with aspects of the disclosed embodiment where, the system is shown with an empty pallet elevator at its upper position and a palletizing elevator in its lower position.
Figure 4:
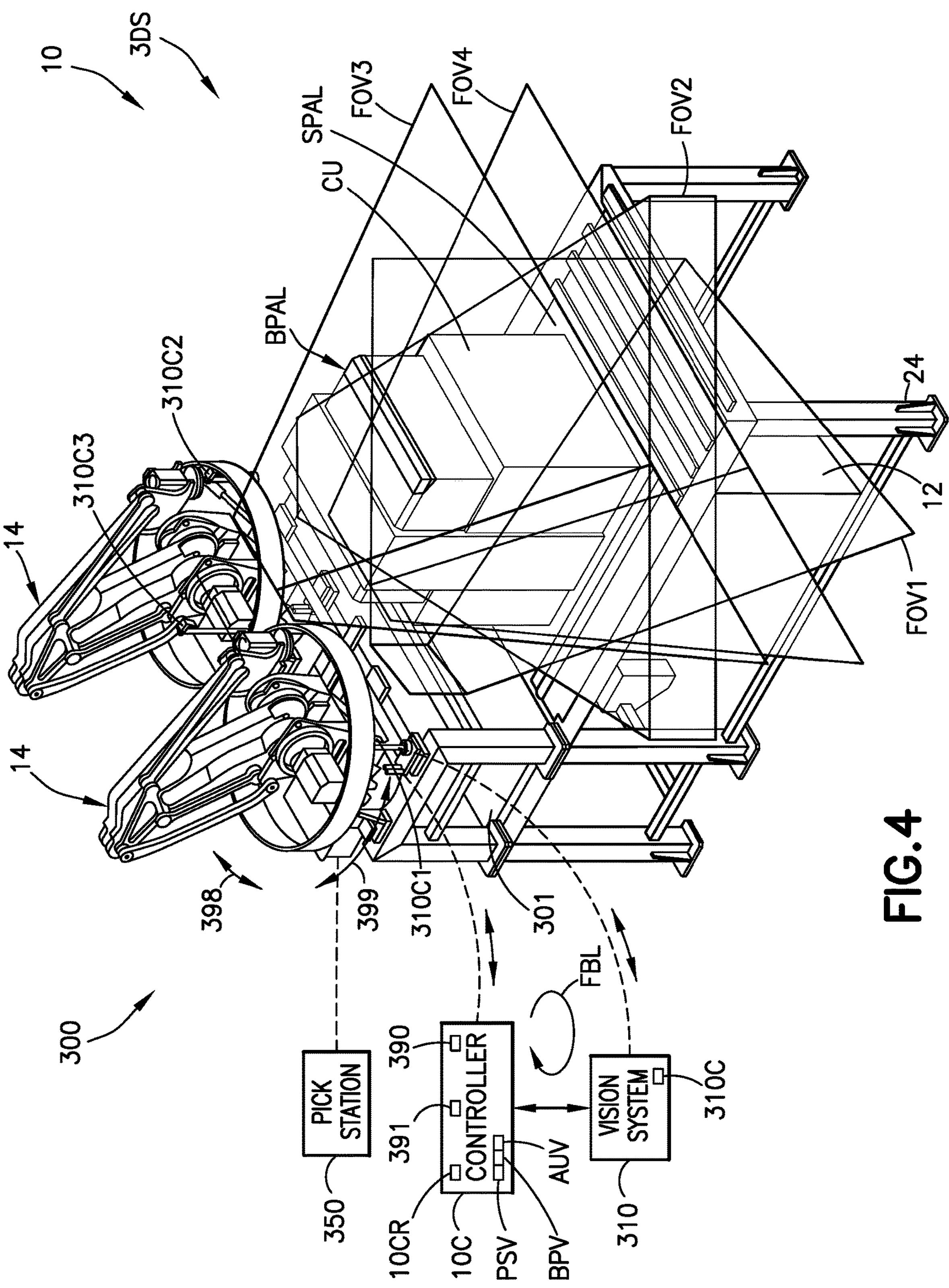
FIG. 4 is a schematic isometric view of the palletizer cell of FIG. 3A in accordance with aspects of the disclosed embodiment.
Figure 4A:
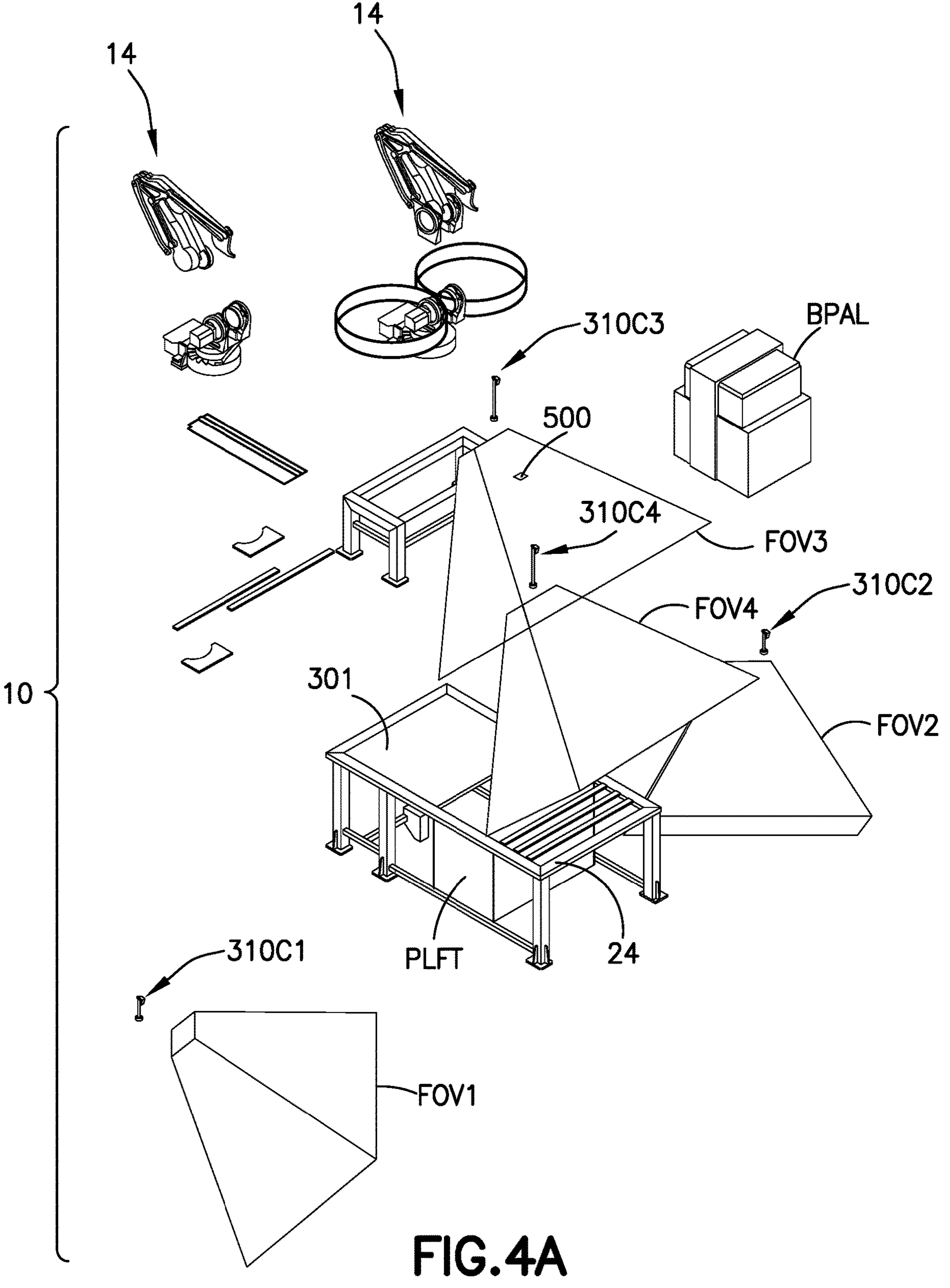
FIG. 4A is a schematic exploded isometric view of the palletizer cell of FIG. 4 in accordance with aspects of the disclosed embodiment.
Figure 4B:
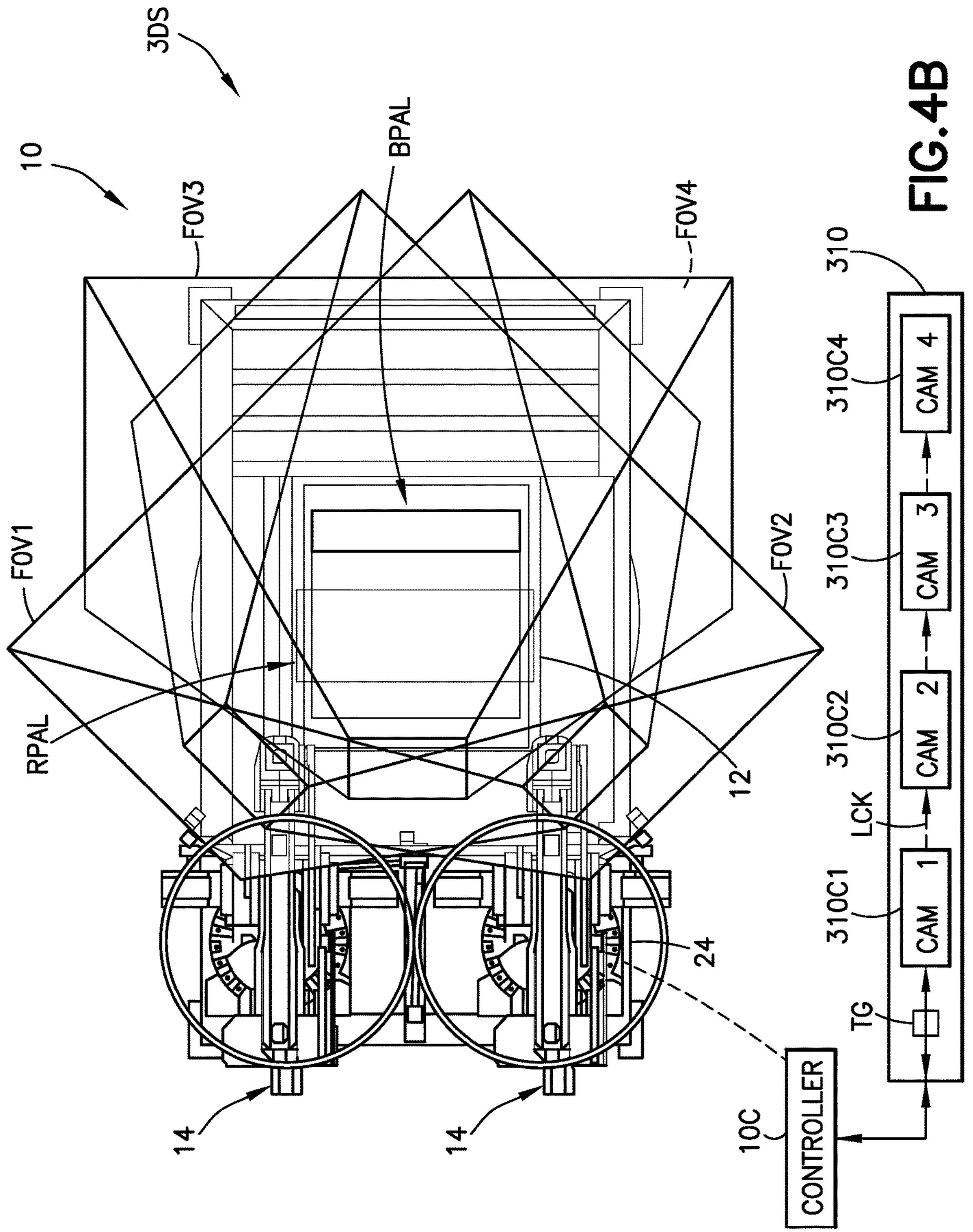
FIG. 4B is a schematic plan or top view of the palletizer cell of FIG. 4 in accordance with aspects of the disclosed embodiment.
Figure 4C:
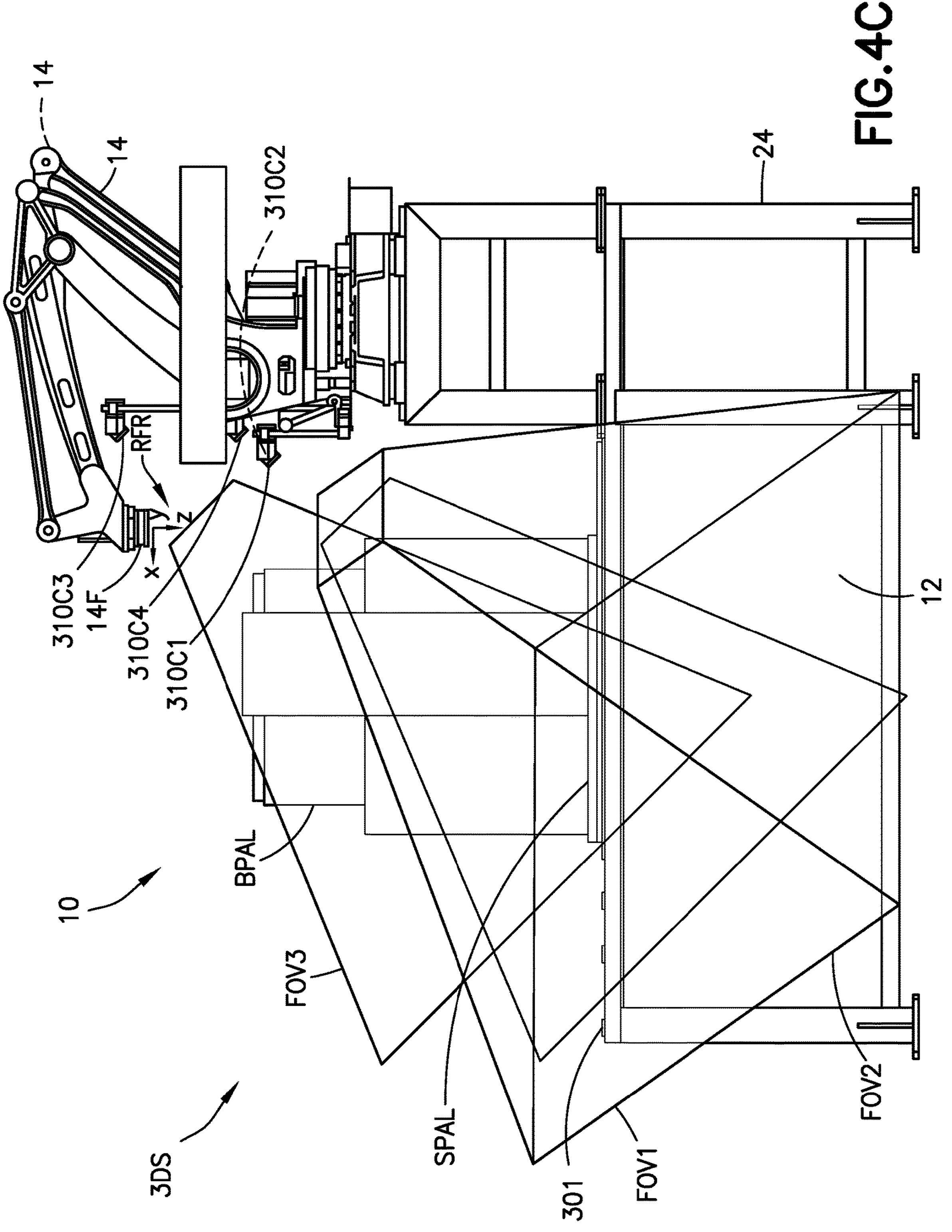
FIG. 4C is a schematic right side view of the palletizer cell of FIG. 4 in accordance with aspects of the disclosed embodiment.
Figure 4D:
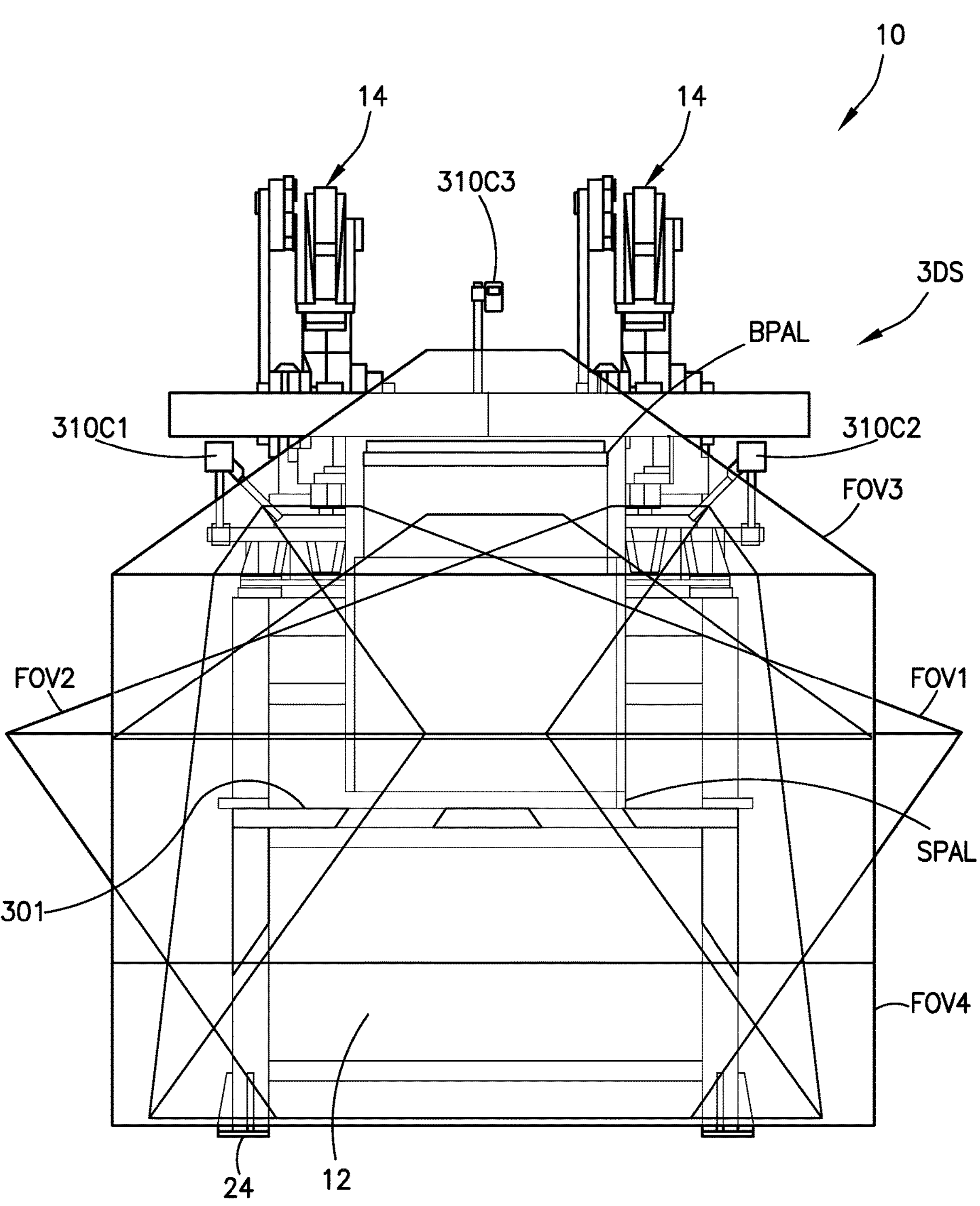
FIG. 4D is a schematic front view of the palletizer cell of FIG. 4 in accordance with aspects of the disclosed embodiment.
Figure 4E:
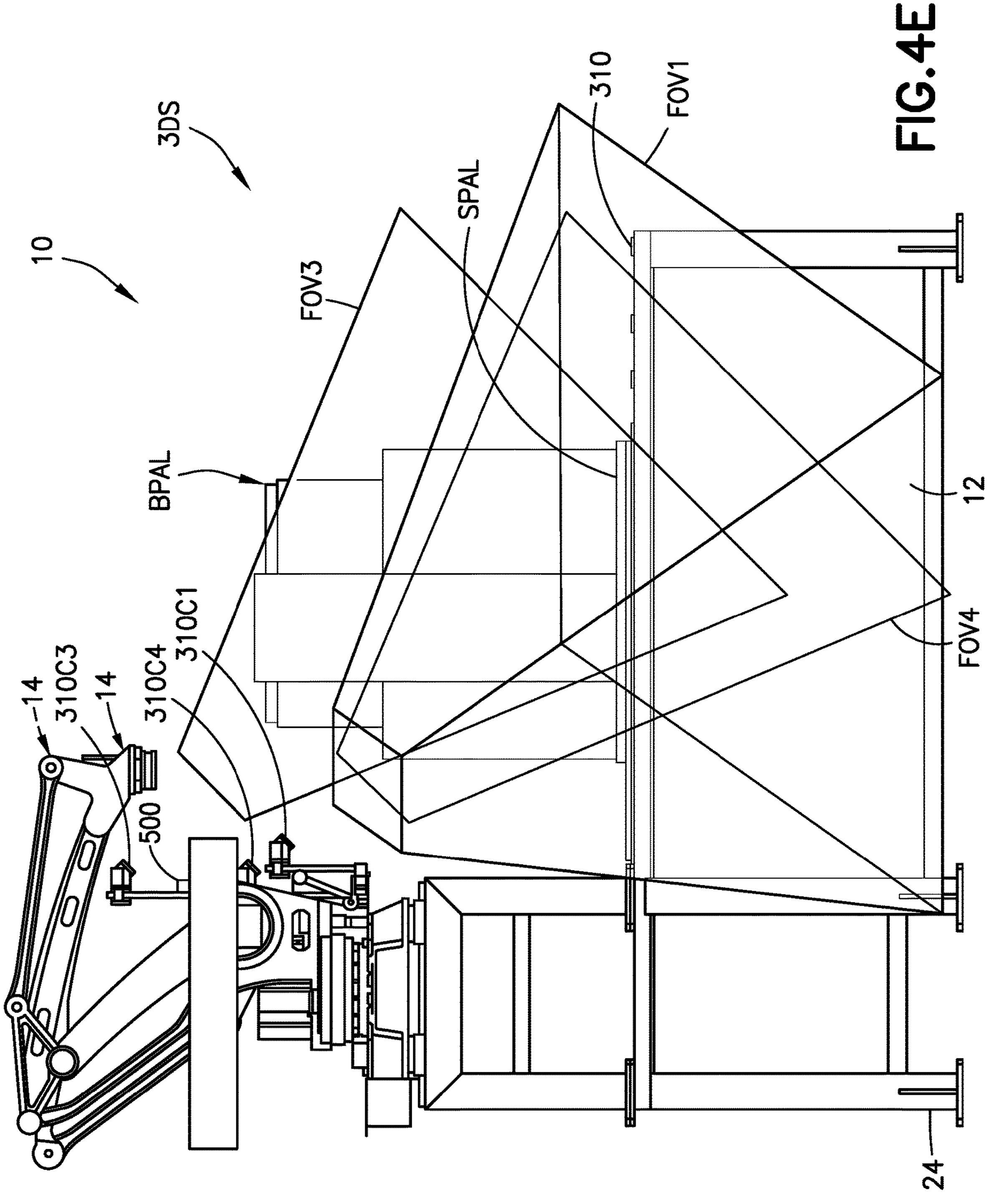
FIG. 4E is a schematic left side view of the palletizer cell of FIG. 4 in accordance with aspects of the disclosed embodiment.
Figure 4F:
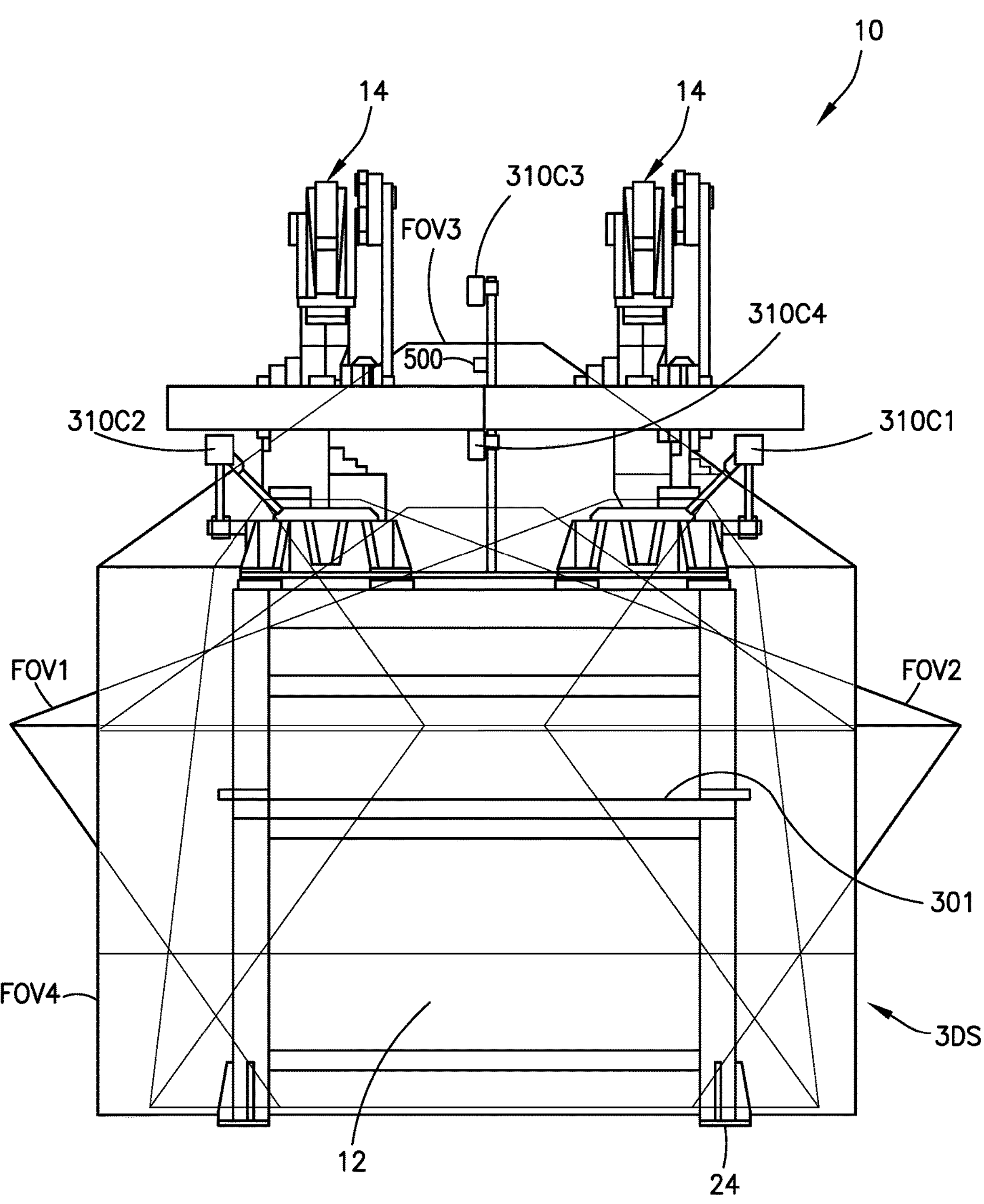
FIG. 4F is a schematic rear or back view of the palletizer cell of FIG. 4 in accordance with aspects of the disclosed embodiment.
Figure 4G:
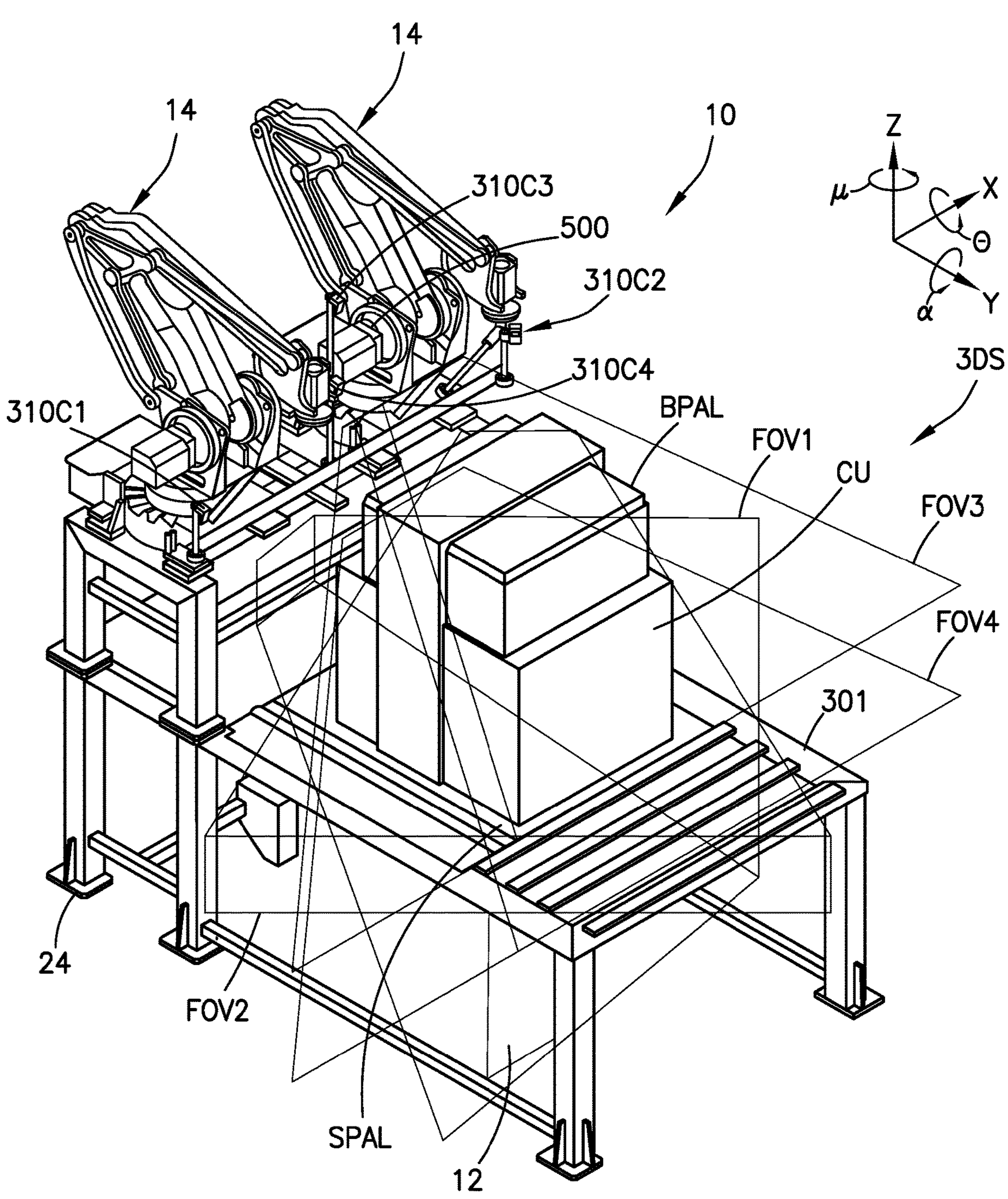
FIG. 4G is a schematic isometric view of the palletizer cell of FIG. 4 in accordance with aspects of the disclosed embodiment.
Figure 4H:
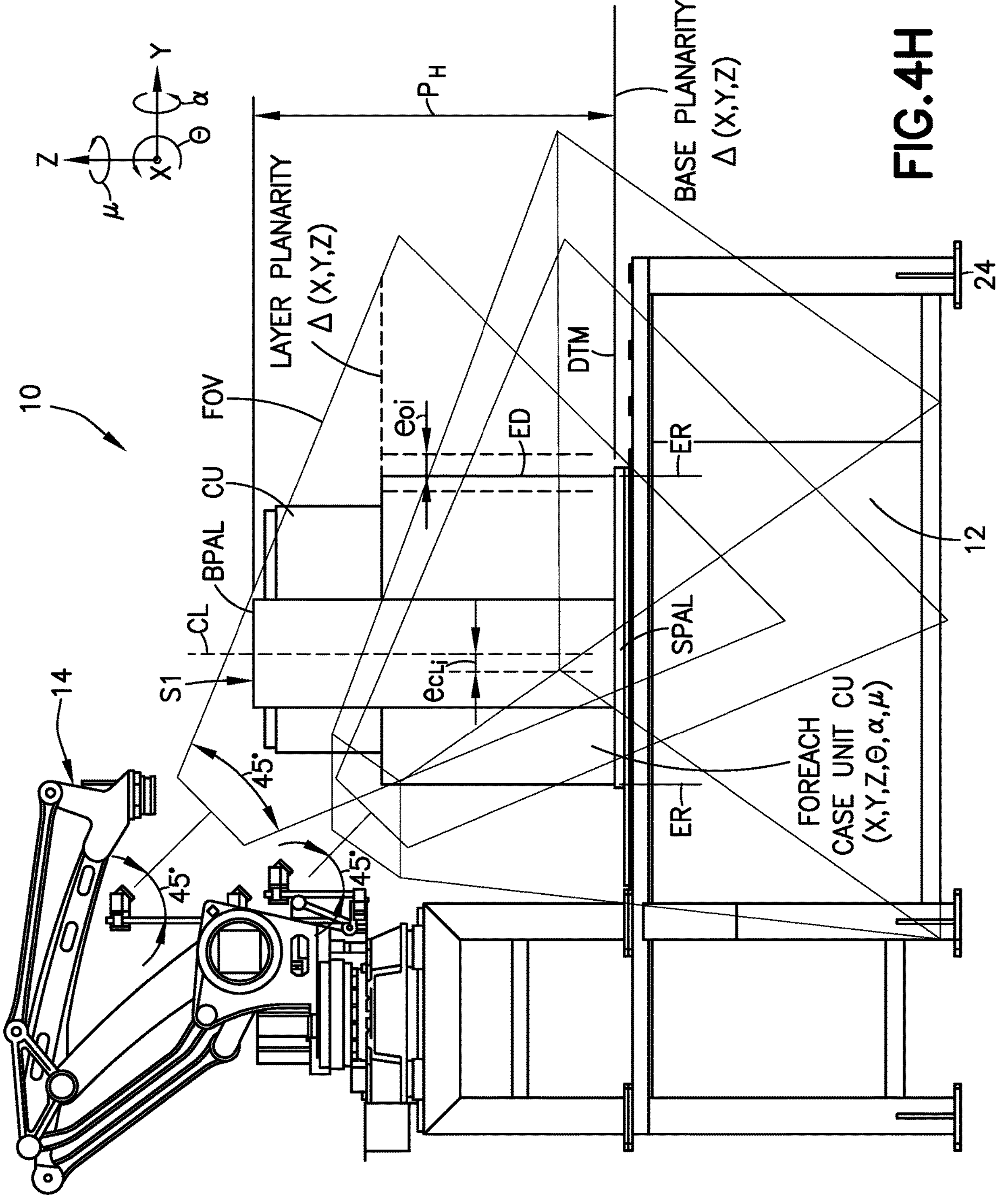
FIG. 4H is a schematic left side view of the palletizer cell of FIG. 4 in accordance with aspects of the disclosed embodiment.
Figure 4I:
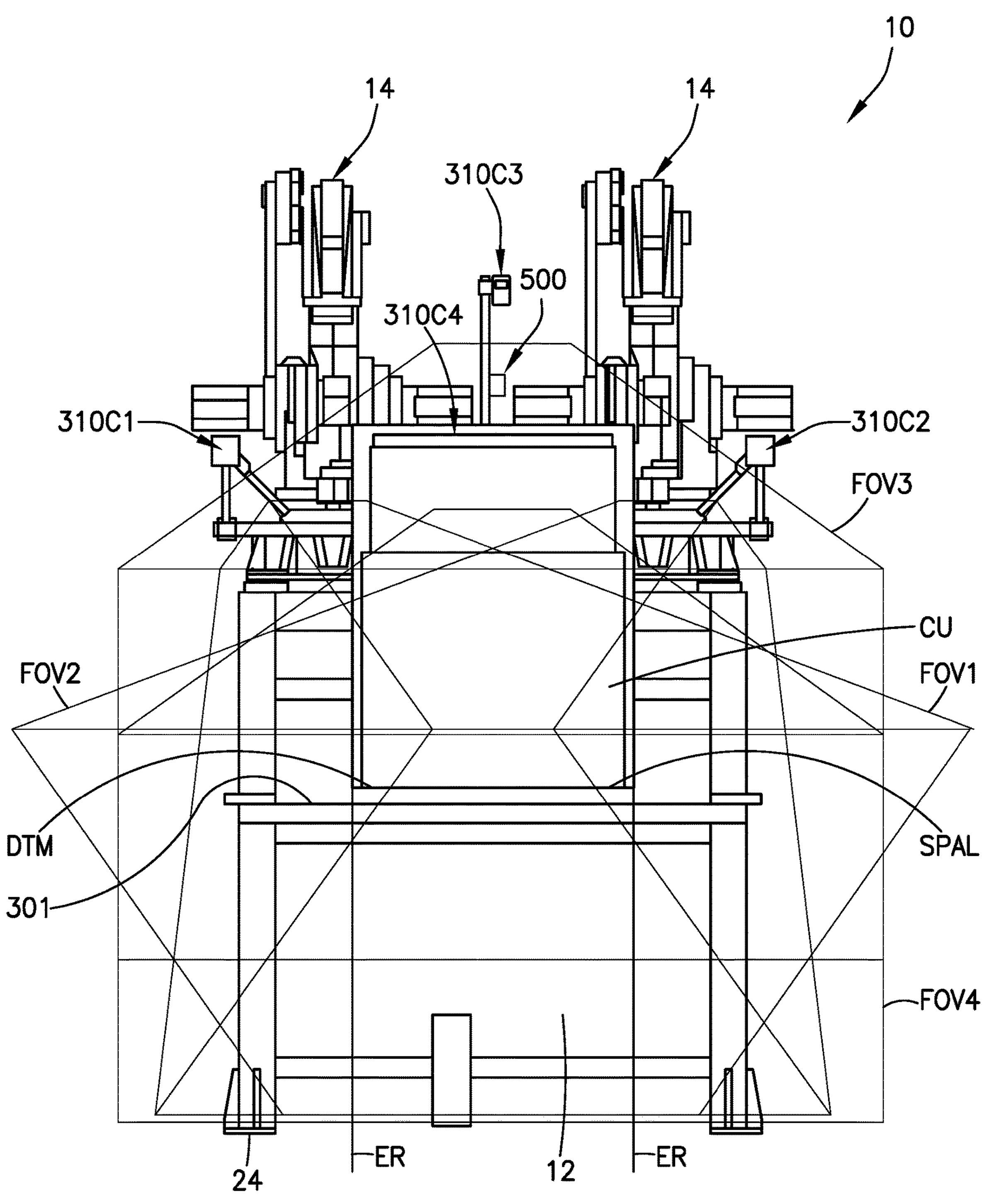
FIG. 4I is a schematic front view of the palletizer cell of FIG. 4 in accordance with aspects of the disclosed embodiment.
Figure 4J:
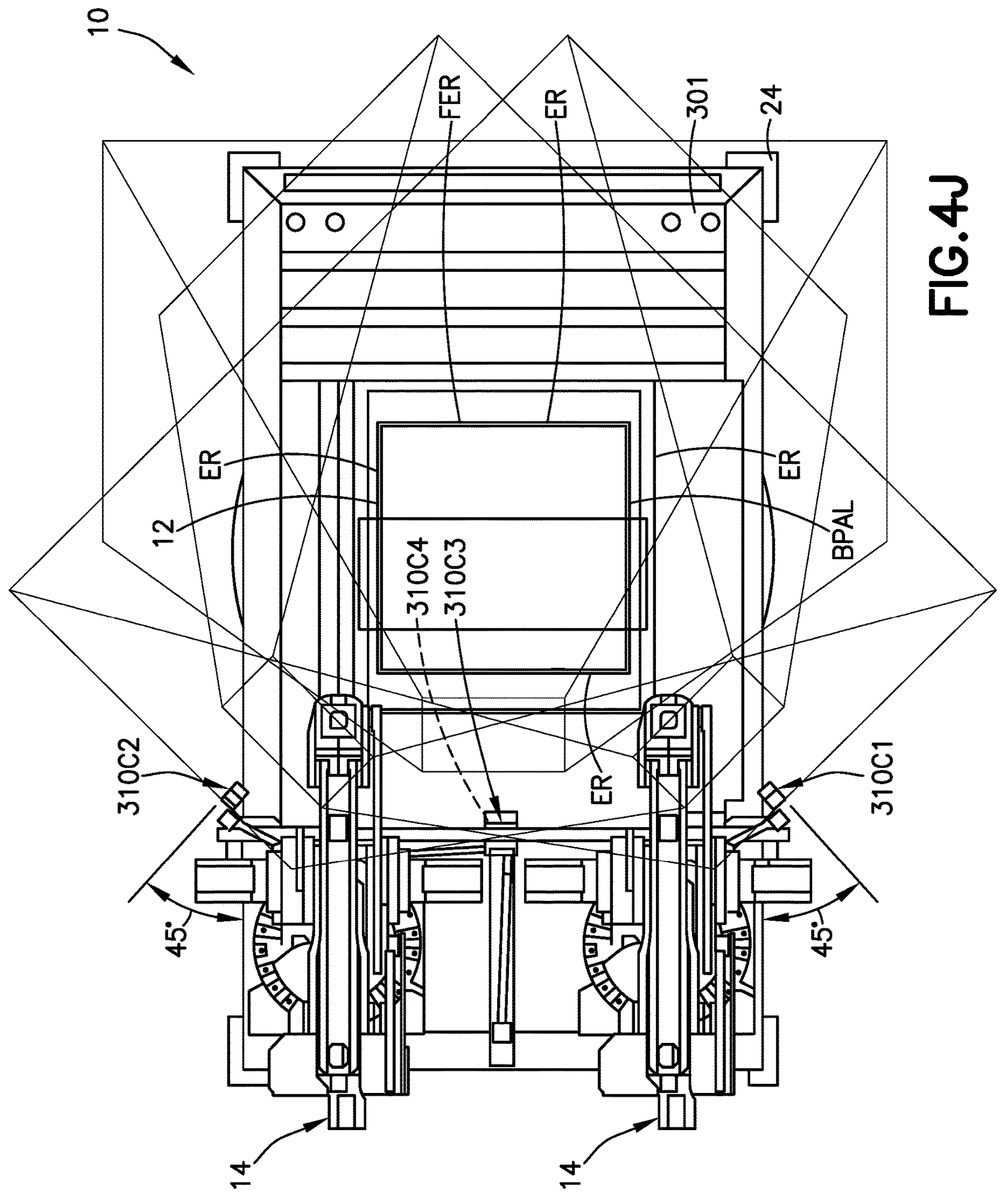
FIG. 4J is a schematic plan or top view of the palletizer cell of FIG. 4 in accordance with aspects of the disclosed embodiment.
Figure 4K:
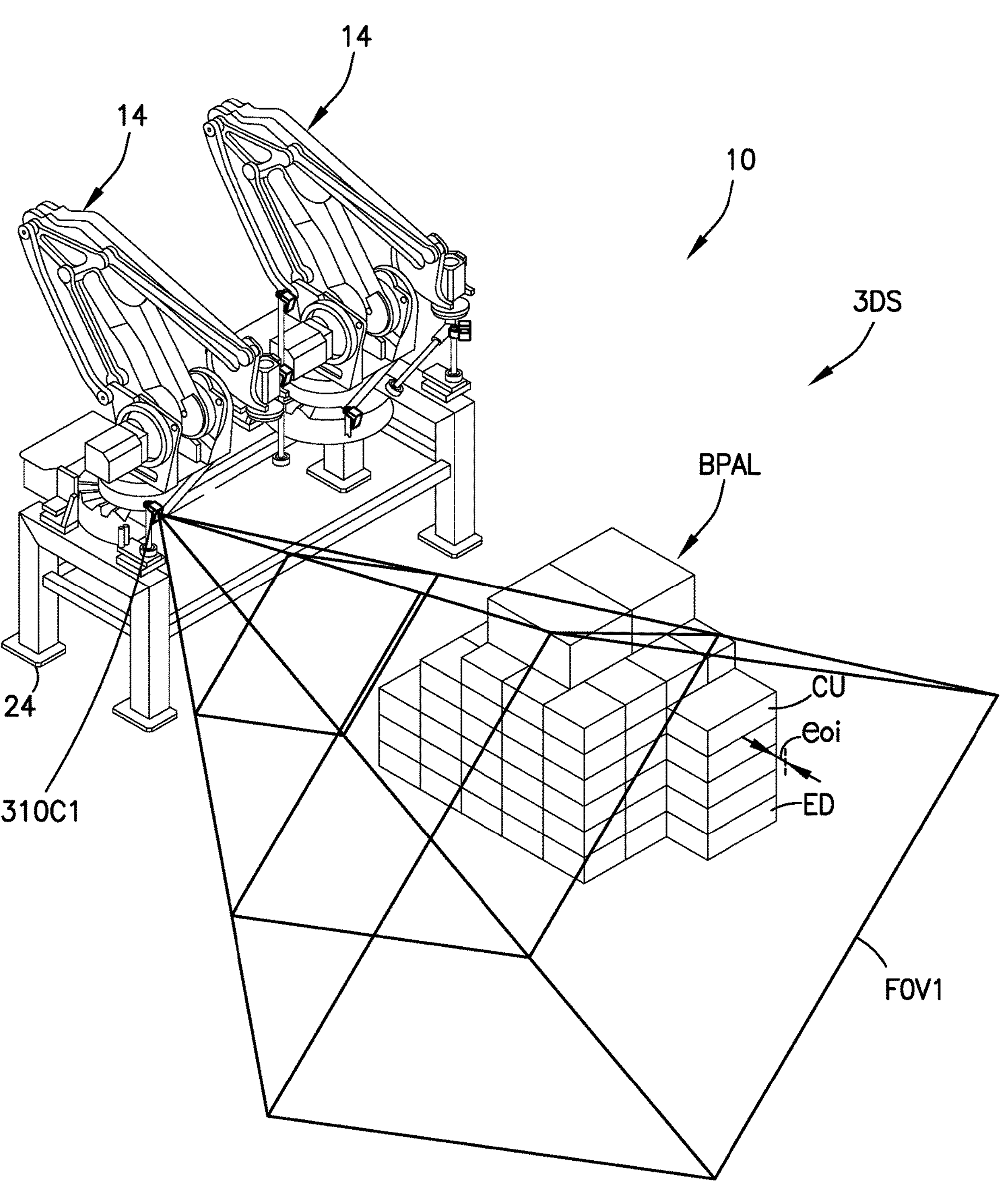
FIG. 4K is a schematic isometric view of the palletizer cell of FIG. 4 showing, with emphasis, the field of view of a camera of a vision system of the palletizer cell in accordance with aspects of the disclosed embodiment.
Figure 4L:
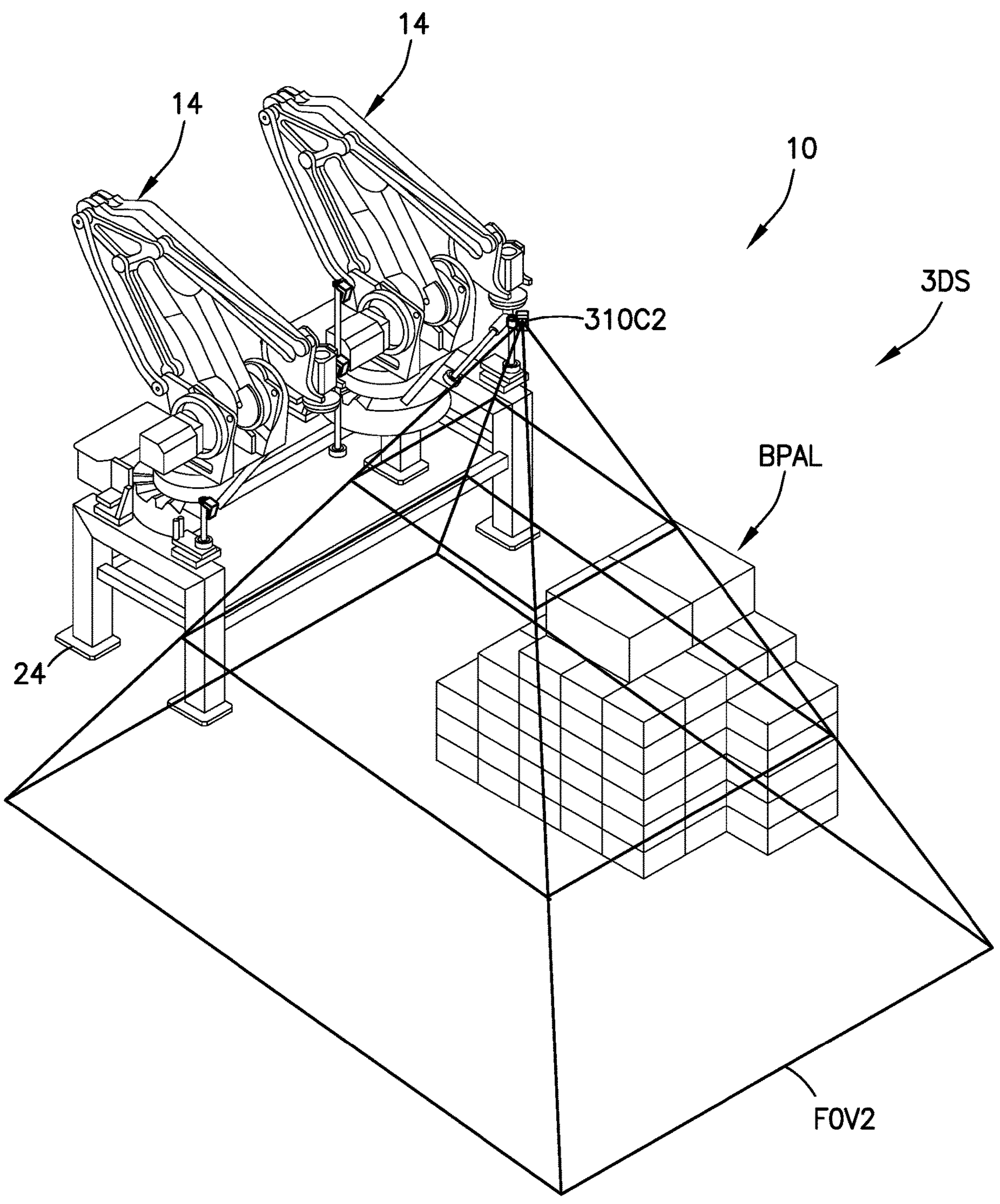
FIG. 4L is a schematic isometric view of the palletizer cell of FIG. 4 showing, with emphasis, the field of view of a camera of a vision system of the palletizer cell in accordance with aspects of the disclosed embodiment.
Figure 4M:
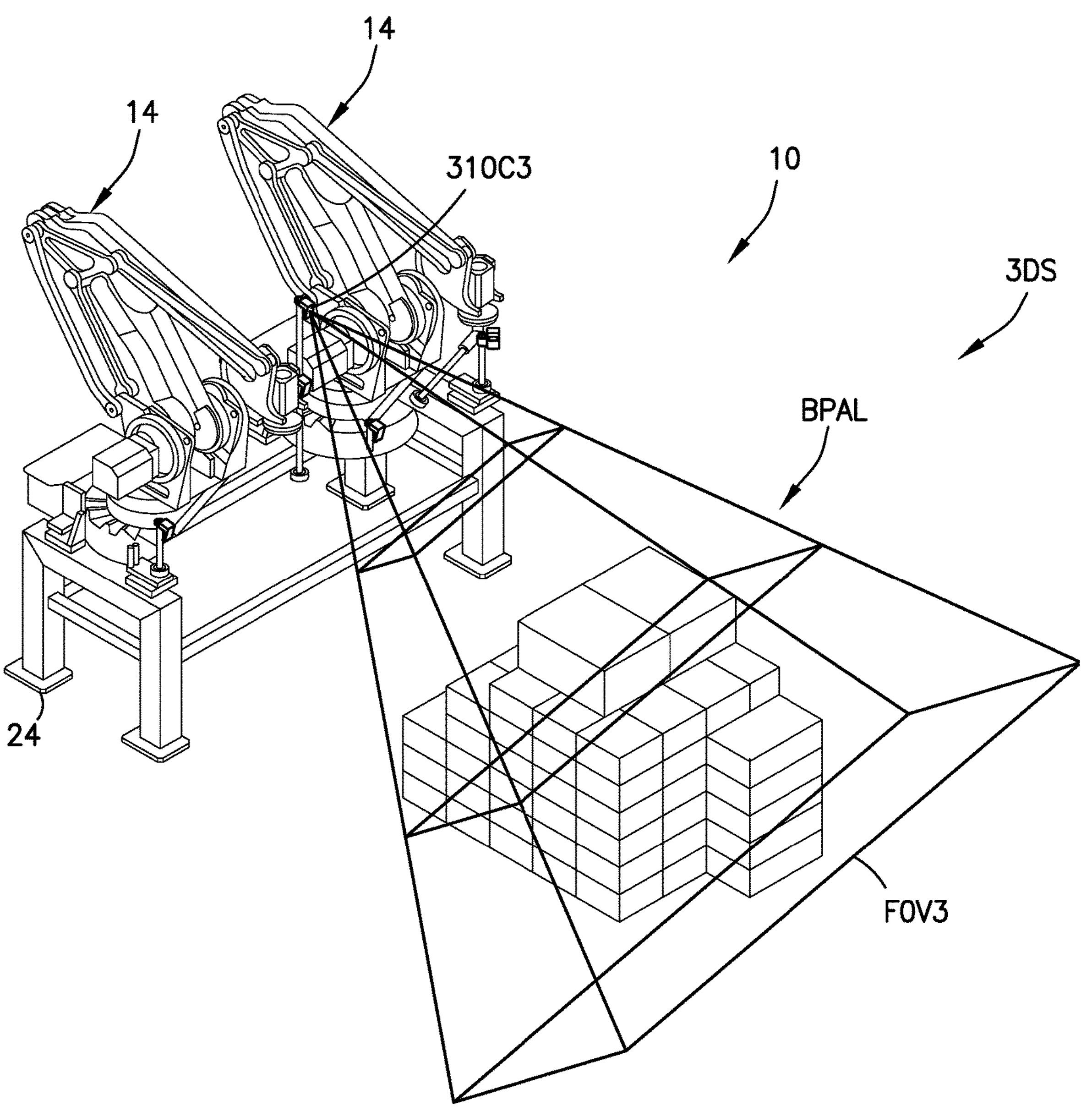
FIG. 4M is a schematic isometric view of the palletizer cell of FIG. 4 showing, with emphasis, the field of view of a camera of a vision system of the palletizer cell in accordance with aspects of the disclosed embodiment.
Figure 4N:
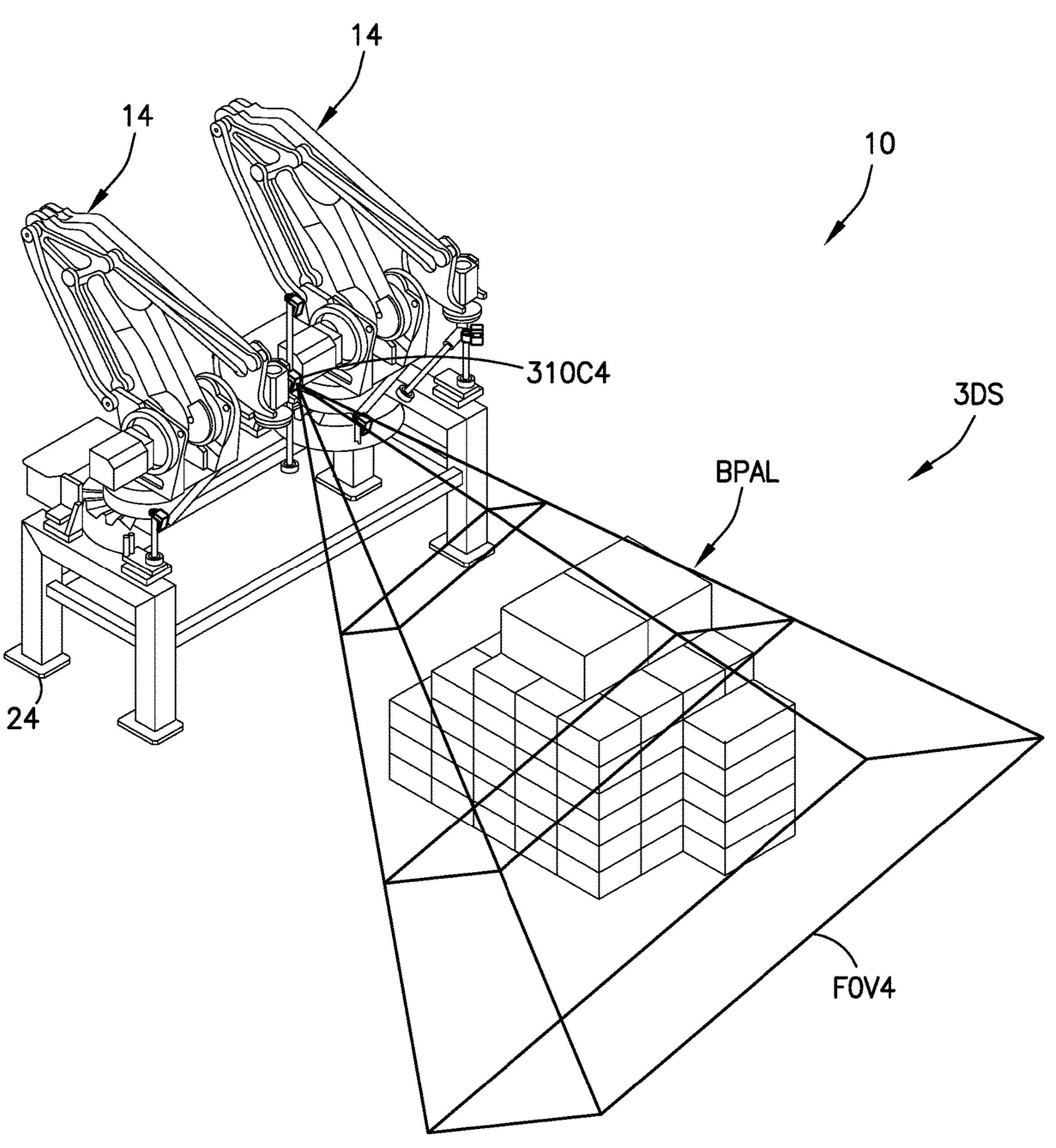
FIG. 4N is a schematic isometric view of the palletizer cell of FIG. 4 showing, with emphasis, the field of view of a camera of a vision system of the palletizer cell in accordance with aspects of the disclosed embodiment.

Referring now to FIGS. 1, 3A and 4, the palletizer cell(s) 10 (it is noted that the term "palletizer" is used for its convenience, and as noted above, the features of the palletizer may also be effected in a depalletizer as otherwise applicable) is coupled to the storage and retrieval system 100 so as to communicate case unit CU (see FIG. 2) flow (see the case output path(s) Op and the case input paths(s) Ip) with the storage retrieval system 100. The palletizer 10 is, in accordance with aspects of the disclosed embodiment, an adaptive palletizer system 300 that effects time optimal pallet load build and thus may compliment and leverage the storage and retrieval system 100 case order flow throughput (though in other aspects the adaptive palletizer 300 may be coupled to any suitable storage and retrieval system including conventional, manual, or semi-automated retrieval system with manually loaded feed station for the palletizer 10), in a manner similar to that described in U.S. Pat. No. 10,894,676 issued on Jan. 19, 2021, the disclosure of which is incorporated herein by reference in its entirety.

Referring also to FIG. 2, the palletizer cell(s) 10 are configured to build pallet loads PAL where the pallet loads PAL have a pallet load build structure RPAL (pallet build features may also be similarly applied to truck load) that is a three-dimensional array, structured in stacks S1-Sn and layers PL1-PL5, of mixed case(s) or pallet load article units CU including manufactured/constructed article units (pickfaces) each of multiple cases/articles placed onto the pallet/pallet support SPAL (case units/pallet load article units means case, tote, pack, shrink wrap, etc). The pallet load build structure RPAL is determined by control from ordered case unit(s) CU (e.g. case units CU output from the storage and retrieval system 100). For example, in one aspect, a palletizer controller 10C may be coupled to the controller 199C of the warehouse management system 199; while in other aspects, the palletizer controller 10C may form a module of an integrated warehouse management controller managing conveyance of the storage and retrieval system 100 components including palletizer/depalletizer cell(s) 10, so as to receive the information defining the pallet load build structure RPAL including corresponding datum reference bounds, case pose and variance threshold from references for the pallet load build effected by the palletizer 10. The case pose sequence, in which the robot(s) 14 of the palletizer 10 build the pallet load PAL may be effected by the storage and retrieval system 100 so cases output by the storage and retrieval system 10 feeding the bot pick station 350 of the palletizer 10 arrive (just in time or suitably buffered) in the predetermined pick sequence for building the pallet load PAL, enabling a higher pick/place rate of the robot(s) 14 (e.g., the output case flow from the storage and retrieval system 100 substantially eliminates or reduces case unit CU sortation with the robot(s) 14). Suitable examples of output case flow sortation from the storage and retrieval system 100 can be found in, for example, United States publication numbers US2016/0214808 published on Jul. 28, 2016; US2016/0207709 published on Jul. 21, 2016; US2016/0207711 published on Jul. 21, 2016; US2016/0214797 published on Jul. 28, 2016; US2016/0167880 published on Jun. 16, 2016; and US2016/0207710 published on Jul. 21, 2016, the disclosures of which are incorporated herein by reference in their entireties. Robot 14 pick/place rate for example has a pick/place cycle, from pick at the input station (e.g. the bot pick station 350) to place on pallet load build BPAL and return, of about 5 sec. (with 2 robots the pick/place cycle is about 2.5 secs), and an adaptive feedback loop FBL (see FIG. 3) of the vision system 310 is effected within the pick/place cycle of the robot(s) 14, in real time, so as to effect substantially continuous build of the pallet load build structure RPAL in the manner described in U.S. Pat. No. 10,894,676 issued on Jan. 19, 2021, the disclosure of which was previously incorporated herein by reference in its entirety.

Referring now to FIGS. 3A-D and 4, each palletizer cell 10 generally includes a frame 24, at least one robot 14 with an end of arm tool 410, a controller 10C, and a vision system 310 including at least one three-dimensional, time of flight, camera 310C. Suitable examples of the palletizer cell 10 can be found in U.S. Pat. No. 10,370,199 issued on Aug. 6, 2019, the disclosure of which is incorporated herein by reference in its entirety. The frame 24 defines a pallet building base 301 (see, e.g., FIG. 3) for the pallet support SPAL (FIG. 2). The at least one robot 14 is connected to the frame 24 and is configured so as to transport and place the pallet load article units CU (see also FIG. 2) serially onto the pallet support SPAL (see FIG. 2) so as to build the pallet load PAL (see FIG. 2) on the pallet building base 301. The controller 10C is operably connected to the at least one robot 14 and is configured (with any suitable hardware and non-transient computer program code) to control articulated robot motion, relative to the pallet building base 301, and effect therewith calibration of the robot 14 as described herein and a pallet load build BPAL of the pallet load PAL. The controller 10C is disposed to generate three-dimensional imaging of the pallet support (as described herein) on the pallet building base 301 and of the pallet load build BPAL on the pallet support SPAL.

The pallet building base 301 may be a palletizing elevator 12 as described herein or any other suitable pallet support. The palletizing elevator 12 gradually lowers a pallet from a second level 11 to a first level 13 as products are being moved thereon by, for example, two product picking apparatus or robots 14. Each robot 14 picks products from an adjacent infeed conveyor 16 for placement onto a pallet on the palletizing elevator 12. An empty pallet elevator 18 supplies empty pallets to the second level 11 and an empty pallet conveying mechanism 20 is disposed between the empty pallet elevator 18 and the palletizing elevator 12 for moving empty pallets 21 from the second level of the empty pallet elevator 18 to the palletizing elevator 12 in the manner described in U.S. Pat. No. 10,370,199 issued on Aug. 6, 2019, the disclosure of which was previously incorporated herein by reference in its entirety.

As an input to the palletizing cell 10, case units or products CU (see FIG. 2), that can be of various sizes, arrive at the palletizing cell 10 via the infeed conveyors 16 and are picked by one of the robots 14 and place at a palletizing area 23, which corresponds to the portion of the palletizing elevator 12 on the upper level 11. Substantially simultaneously to this palletizing operation, the empty pallet elevator 18 brings an empty pallet 21 to the empty pallet conveying mechanism 20. The mechanism 20 transfers the empty pallet 21 from the empty pallet elevator 18 to the palletizing area 23. The elevator 12 takes over the pallet 21 and lowers the pallet 21 as the products are being palletized. As an output from the palletizing cell, a full pallet (such as shown in FIG. 2) made from a variety of products is ready to be picked up by a forklift or other transport at the lower portion of the palletizing elevator 12.

As noted above, the palletizer cell 10 includes a lower level 13 and an upper level 11, that is defined by a raised platform 22. This platform 22 and the equipment thereon are supported on a frame 24. The frame 24 may be formed by integrated frame elements or by adjacent independent sub-platforms, each supporting one or more components of the palletizer cell 10. The robots 14 are in the form of, for example, standard industrial articulated robot arms 26 suitable for palletizing operation, each of which is operatively positioned adjacent to the infeed conveyor 16 and being equipped with an end of arm tool 410 to pick products from the infeed conveyor 16. Suitable examples of robots 14 include ABB's or IRB 460 or 4600, FANUC's M410 or R2000, or any similar robot arm offered by other manufacturers such as Kuka or Motoman. The robot arm 14 is coupled in any suitable manner to a controller 10C that controls operation of the robot arm 14A and end of arm tool 410.

The end of arm tool 410 includes frame 424 for mounting the end of arm tool 410 to a respective robot arm 14, a support assembly 450 for supporting case units CU thereon, a gripping assembly 26, and a pusher assembly 28, all of which are mounted to the frame 424. The frame 424 receives a robot-mounting bracket or wedge 30 that allows the tool 10A to be conventionally attached to a robot arm 14A flange 14F, where the robot-mounting bracket 30 is coupled to the frame 424 in any suitable manner, such as with mechanical and/or chemical fasteners. Suitable examples of the end of arm tool 410 can be found in U.S. Pat. No. 9,701,490 issued on Jul. 11, 2017 and U.S. provisional patent application No. 63/208,023 titled "Tool for Palletizing Mixed Load Products, Palletizing Robot Including the Tool, and Method Therefor" and filed on Jun. 8, 2021, the disclosures of which are incorporated herein by reference in their entireties. As will be described further herein, the end of arm tool also includes a distance sensor 411 that effects localization of robot pick position relative to the infeed conveyor 16 (see FIG. 4).

Figure 3B:
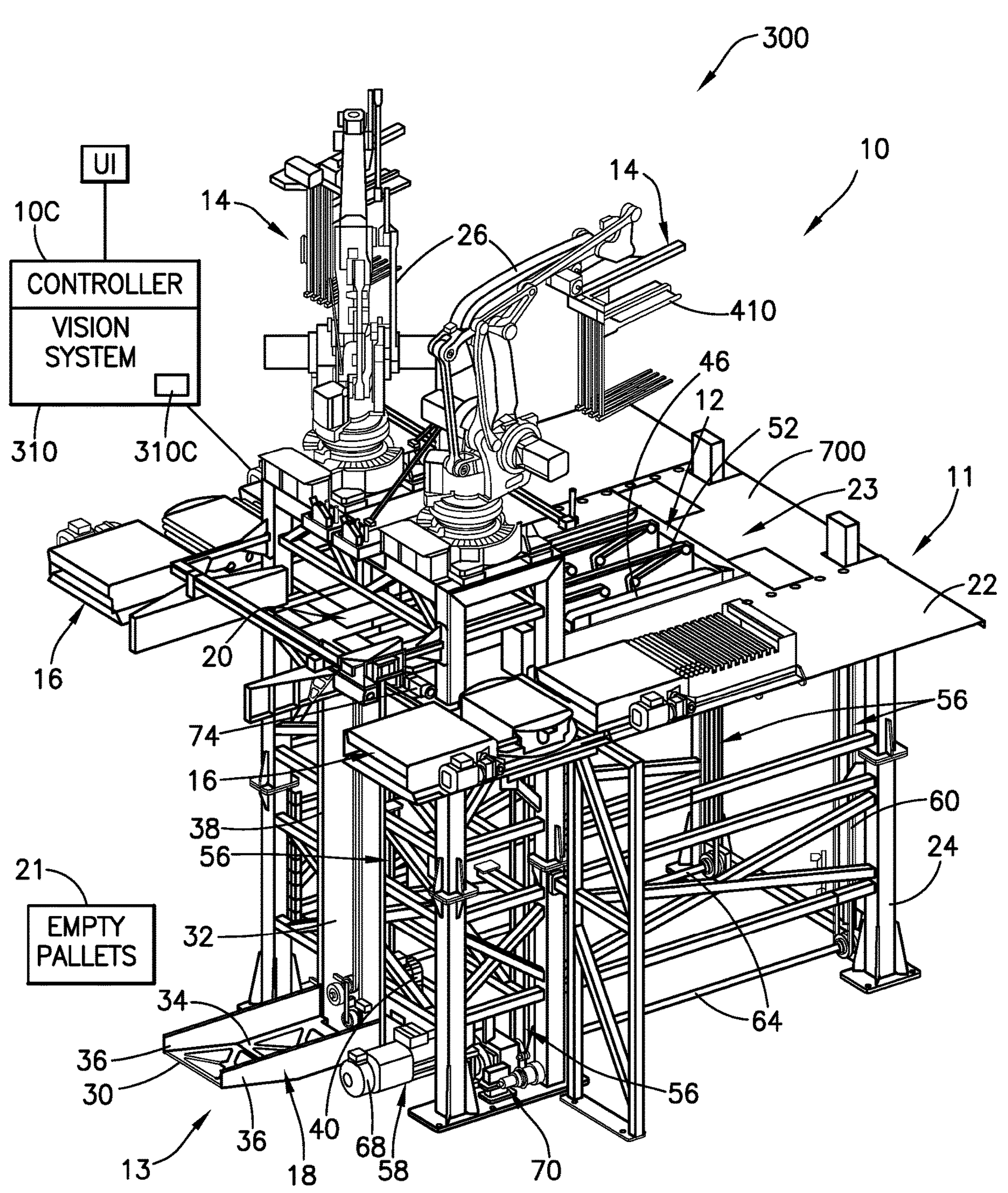
FIG. 3B is another top perspective illustration of the palletizer cell of FIG. 3A in accordance with aspects of the disclosed embodiment where, the system is shown with the empty pallet elevator at its lower position and the palletizing elevator at its upper position.
Figure 3C:
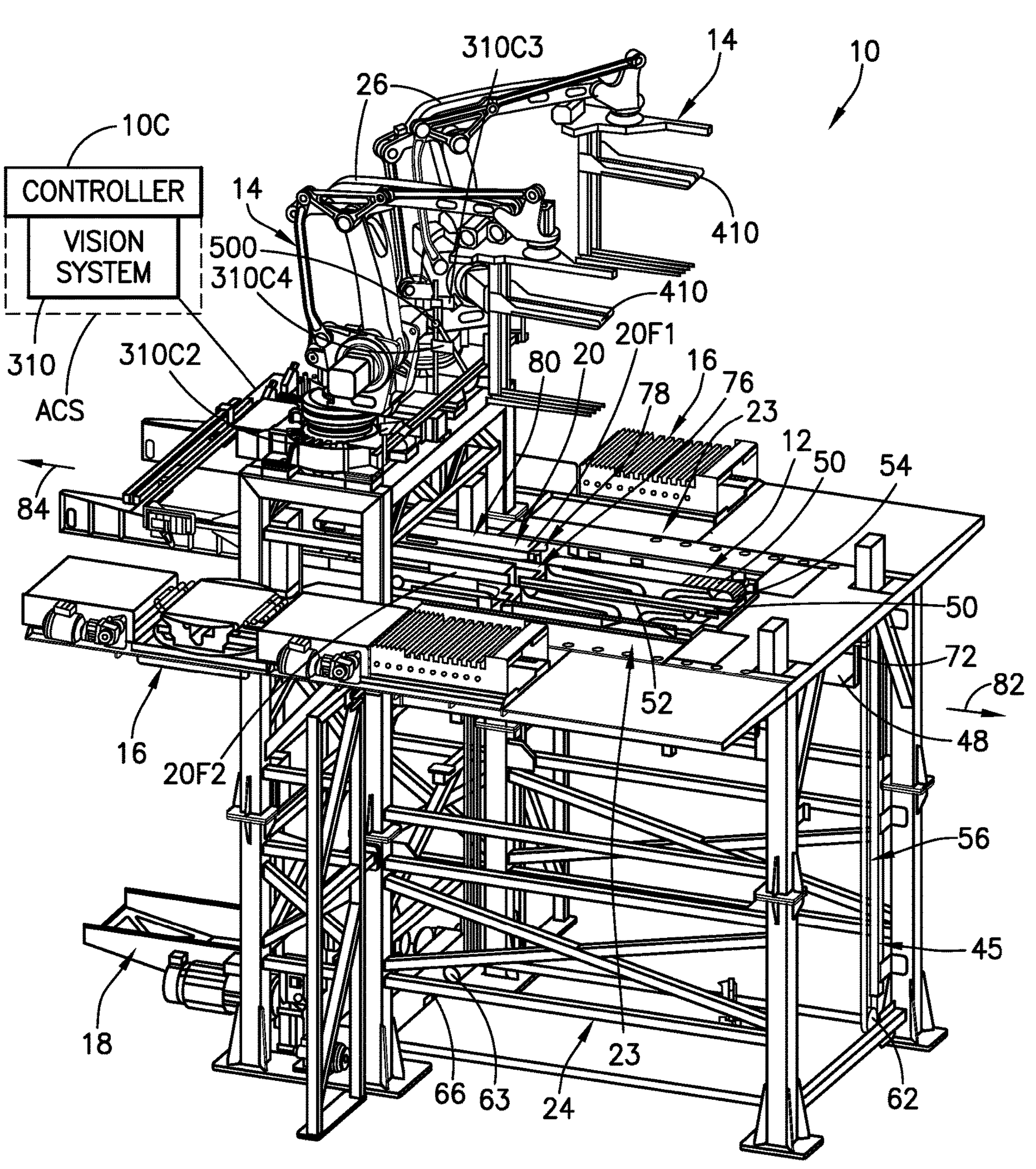
FIG. 3C is a side perspective illustration of the palletizer cell of FIG. 3A in accordance with aspects of the disclosed embodiment where, the system is shown with its telescopic forks extended towards the palletizing elevator.

Still referring to FIGS. 3A-3C, the elevator 18 comprises a pallet-receiving platform 30 that is mounted to a wall 32 for slidable movement therealong. The wall 32 extends from the first level 13 to the second level 11 and is secured to the frame 24 on a peripheral side thereof. The platform 30 includes a bottom 34 fixedly mounted between two side walls 36. The side walls 36 are slidably mounted to the wall 32 via sliding elements such as, without limitation, rollers (not shown) in tracks 38. The up and down movements of the platform 30 along the wall 32 is actuated by a drive 40, which is operatively coupled to the platform 30 via a belt assembly secured to the wall 32 and to the platform 30. The platform 30 is configured and sized for receiving a pallet 21 thereon and for slidingly receiving part of the empty pallet conveying mechanism 20 as shown in FIG. 3A. The platform 30 is not limited to any size and shape and is adapted for a predetermined size and configuration of pallet. According to another aspect (not shown), the platform 30 is defined by fork elements. The empty pallet elevator 18 is not limited to the illustrated embodiment and can be provided with any other mechanisms to selectively lower and raise the empty pallet receiving platform 30.

The palletizing elevator 12 is distanced from the empty pallet elevator 18 by the empty-pallet conveying mechanism 20 and extends between the first and second levels 13 and 11 similarly to the empty pallet elevator 18. The platform 22 includes a rectangular aperture 44 that allows passage to an empty pallet 21 from the empty pallet conveying mechanism 20 onto the elevator 12. The rectangular aperture 44 also provides for placement of products on the pallet 21 (transferred from the empty pallet elevator 18 to the elevator 12 by the empty pallet conveying mechanism 20) by the end of arm tool 28. The aperture 44 is located in the palletizing area 23 wherein the robots 14, which are on opposite sides of the aperture 44, bring products picked from the respective infeed conveyors 16.

As noted herein, the palletizing elevator 12 gradually lowers as products are put onto the pallet 21 (supported by the palletizing elevator 21) so that the top level of the highest product on the pallet 21 remains generally levelled with the platform 22. Still referring to FIGS. 3A-3C, the palletizing elevator 12 generally includes a rectangular pallet-receiving element 46 supported by a frame 48. The frame 48 is slidably mounted to the frame 24 via an actuating mechanism 45 for reciprocating movement of the frame 48 and pallet-receiving element 46 generally between the upper and lower level 11 and 13. The frame 48 includes two (2) first parallel beams 47 (only one shown) secured to two (2) second parallel beams 49 transversally thereto. The frame 48 receives three (3) transversal chain assemblies 50 thereon.

Each of the chain assemblies 50 comprises an endless chain 52 that is operatively mounted to the frame structure 48 via a sprocket assembly 54, for rotation along an axis defined by the conveying direction of a pallet on the empty pallet conveying mechanism 20. The chain assemblies 50 together define a movable pallet-receiving element 46. Since the configuration and operation of a chain assembly is believed to be well-known in the art, the assemblies 50 will not be described herein in more detail for concision purposes. The number and configuration of the chain assemblies 50 are also not limited to the illustrated embodiment. Also, the pallet-receiving element 46 is not limited to being movable and other mechanism can be provided to move a pallet 21 in or out of the palletizing elevator 12.

The actuating mechanism 45 comprises four (4) chain assemblies 56 that are secured to both frames 24 and 48 therebetween and that are drive 58. More specifically, each chain assembly 56 includes a chain 60 that is rotatably mounted to the frame 24 in an endless manner via two sprocket wheels 62 or 63 (only the lower ones shown). The chain 60 generally extends between the platform 22 and the lower level 13 along a direction generally perpendicular to the platform 22. The chain assemblies 56 are interconnected for rotation in unison, first by two shafts 64 coaxially mounted to each two facing pairs of sprockets 62 and 63, and second by a gear assembly 66 operatively linking two adjacent sprockets 63, one from each of the afore-mentioned pairs. The drive 58 includes a motor 68 that is coupled to the gear assembly 66. The motor 68 has a built-in brake system. Each of the adjacent sprockets 63 is coupled with a disk brake 70 to ensure a safe descent of the palletizing elevator.

The frame 48 is fixedly mounted to each of the four chains 60 for movement in unison therewith via four (4) brackets 72 (only two shown) that are secured to the frame 48. In operation of the palletizing elevator 12, the controlled actuation of the drive 58 causes the four lower sprocket wheels 62 and 63 to rotate in a same direction, causing the chains 60 to rotate in unison in an endless manner, causing the pallet-receiving element 46 to correspondingly lower or raise between the upper and lower levels 11 and 13 via the frame 48. The drive 58 operates in such a manner that the pallet-receiving element 46 lowers incrementally by step distances corresponding to the heights of each level of products added to the pallet 21. However, the raising movement of the pallet-receiving element 46 is continuous so as to bring back said element 46 to the upper level 11 ready to be filled with new products after a full pallet 21 has been removed thereon at the lower level 13.

The palletizing elevator 12 includes a further actuator (not shown) that is coupled to the chain assemblies 50 to cause the selective translation of the pallet-receiving element 46 to move a pallet filled with products out of the palletizing elevator 12 when the pallet-receiving element 46 is at the lower level 13. The palletizing elevator 12 is not limited to that illustrated herein and can be provided with any other mechanisms to lower and raise the palletizing element 46. The palletizing element 46 is also not limited to that described herein. For example, the chain assemblies 50 can be replaced by another pallet conveying mechanism or be omitted.

Still referring to FIGS. 3A-3C, the empty pallet conveying mechanism 20 will now be described. In one aspect, the mechanism 20 is in the form of a telescopic fork. The telescopic fork 20 comprises a drive 74, a first stage 76 that is fixedly mounted to the frame 24, a second stage 78 that is slidably mounted to the first stage 76 for relative translation between two opposite longitudinal directions, and a third stage 80 that is slidably mounted to the second stage 78 for relative translation along same two opposite directions (see arrows 82 and 84 in FIG. 3C). The mechanism of the telescopic fork 20 includes a three stage system using carriages and belts in order to extend the telescopic forks from one end to the other.

The position and reach of the telescopic fork 20 is such that the third stage 80 overlays the pallet-receiving platform 30 of the empty pallet elevator 18 (see FIG. 3A) when the fork 20 is fully extended in direction 84 and overlays the palletizing area 44 when the third stage 80 is fully extended in direction 82 for transferring a pallet from the third stage forks 20 to the endless chains 52 of the elevator 12.

Referring to FIGS. 4, 4A-4N, 5A, and 5B, the at least one three-dimensional, time of flight, camera 310C of the vision system 310 is disposed on one or more of the frame 24 and the robot(s) 14 so as to generate three-dimensional imaging (e.g., 3D images such as in FIGS. 7, 9, 11, 13, 15, etc.) of at least a portion of the palletizer cell 10 so as to effect calibration of the robot 14 as described herein. While the at least one three-dimensional camera 310C is descried herein as a time of flight camera, any suitable three-dimensional sensor/imager may be used including laser scanners, sonar or other suitable machine vision systems. As described herein, the at least one three-dimensional camera 310C is communicably coupled to the controller 10C so the controller 10C registers, from the at least one three-dimensional camera 310C, real time three-dimensional imaging data (such as the point clouds illustrated in for example, FIGS. 7, 9, 11, 13, 15, etc. and/or any suitable data obtained from the point clouds) embodying different corresponding three-dimensional images of the palletizer cell 10.

In one aspect, the at least one three-dimensional camera 310C is configured so as to effect three-dimensional imaging of the pallet support SPAL on the pallet building base 301, of the end of arm tool 410 at one or more predetermined locations of the palletizer cell 10, and of the pallet load build BPAL on the pallet support SPAL. In one aspect, the at least one three-dimensional camera 310C includes four (4) cameras 310C1, 310C2, 310C3, 310C4 (see. e.g. FIGS. 5A and 5B) coupled to the frame 24 in any suitable locations so that the cameras 310C1, 310C2, 310C3, 310C4 each have a respective field of view FOV1-FOV4 (see, e.g., FIGS. 4 and 4A-4N) for imaging at least two sides, e.g., a top (see FIG. 2) and one of a front side surface, a rear side surface and a vertical side surface (extending between the front and rear) (see FIG. 2) of the pallet support SPAL and pallet load build BPAL/pallet load build structure RPAL. The at least one camera 310C may be oriented so that the top and at least one side surface (e.g. front, rear or a vertical side) of the pallet support SPAL and of each case unit CU placed on the pallet support SPAL is visible within the field of view FOV1-FOV4 covering a corresponding portion of the pallet support SPAL/pallet load build structure RPAL. Referring also to FIGS. 4G-4J, in one aspect the cameras 310C1, 310C2, 310C3, 310C4 may have any suitable focal length for a predetermined image intensity and be placed at, for example, a 45° angle (see FIG. 4H) relative to the frame 24 (e.g. such as a horizontal plane of the frame 24 as defined by, for example, the pallet building base 301) and/or each other so that the at least two sides are imaged by the at least one camera; while in other aspects, the angle between the cameras 310C1, 310C2, 310C3, 310C4 and/or the frame 24 may be more or less than 45°. In one aspect, each field of view FOV1-FOV4 (generally referred to as field of view FOV (see FIG. 4H and FIGS. 4K-4N which illustrate each of the fields of view with emphasis relative to the other fields of view) of the cameras 310C1, 310C2, 310C3, 310C4 may be a 45° field of view; while in other aspects the field of view FOV may be more or less than 45° so long as at least two sides of the pallet support SPAL and of the pallet support SPAL and pallet load build BPAL/pallet load build structure RPAL are imaged.

In one aspect, the at least one camera 310C resolves three-dimensional definition of case unit features (e.g., edges of the case units) and calibration fixture features from two or more orthogonal planes so that a maximum certainty of feature pose (e.g., the X, Y, Z, θ, α, μ positions of the feature—see FIG. 3G) is obtained from a single image of items in the respective field(s) of view FOV1-FOV4 of the at least one camera 310C. Here the resolution of the three-dimensional definition of case unit and/or calibration fixture features is independent of camera 310C placement (so long as the top and one side of the feature are imaged) and is performed in real time (e.g. within the pick/place cycle of the at least one robot 14 or within a calibration procedure of the at least one robot 14).

While four (4) cameras 310C1-310C4 are described, it should be understood that more or less than four (4) cameras 310C may be used and placed so that the field of view of the camera(s) 310C of the vision system 310 cover(s) the pallet building base 301 of the frame 24, a pallet support SPAL seated on the pallet building base 301 and a whole (or at least a predetermined part) of the expected pallet load build structure RPAL, so as to capture, with any suitable desired resolution, three-dimensional time of flight images of object(s) desirably everywhere on the pallet support SPAL, and everywhere on the pallet load build structure RPAL. The combined field(s) of view FOV1-FOV4 result in substantially complete 360° coverage of the pallet load build structure RPAL with overlap of the field(s) of view FOV1-FOV4. For example, the combined field(s) of view FOV1-FOV4 may cover standard pallet supports SPAL (having dimensions of, e.g., 48 inches by 48 inches, 48 inches by 40 inches, and/or 36 inches by 36 inches), it should be understood that the camera(s) 30Ca-300C4 and associated field(s) of view FOV1-FOV4 may cover (e.g. image) larger fields (including, for example, truck beds or any desired field size) as appropriate. Further, the field(s) of view FOV1-FOV4 may cover any suitable pallet load build structure RPAL height PH (see FIG. 3H) such as, for example, heights of 60 inches, 70 inches and 80 inches; while in other aspects the field(s) of view FOV1-FOV4 may cover heights less than 60 inches or more than 80 inches.

In one aspect, each of the camera(s) 310C1-310C4 may have a 176 pixel×132 pixel resolution; while in other aspects each, or one or more, of the camera(s) 310C1-310C4 may have a higher resolution (e.g. a 320 pixel×240 pixel resolution or higher), as desired to provide a desired minimum depth map defining about 0.5 inches at the outermost bounds of the pallet build three-dimensional space 3DS (so that the depth map definition throughout the captured image of the whole, or predetermined part, of the pallet support/pallet build is not less than about 0.5 inches). As such, a sufficient resolution is provided by the vision system 300 to resolve lattice features of the pallet support SPAL to definition so that planarity across the pallet is determined and fully established for placing a stable first layer PL1 of case units CU on the pallet support SPAL as will be described herein. Sufficient resolution may also be provided to resolve case unit features (e.g., such as case edges) so that planarity across a top of each layer PL1-PL4 (see FIG. 3H) is determined and fully established for placing a stable layer PL2-PL5 on top of a previously placed layer PL1-PL4. The resolution of the camera(s) 310C1-310C4 may be such that minimal processing is required to resolve the case unit features (e.g. case unit edges) such that the case unit features are resolved in real time substantially from the images as received by the controller 10C.

As described herein, the vision system 310 also includes an electromagnetic sensor 500 configured to sense the calibration features (e.g., of different jig(s) or fixture(s) as described herein, such as of the calibration box 810 and/or integral features of the robot 14/end of arm tool 410). The controller 10C is communicably coupled to the electromagnetic sensor 500 and registers a sensor signal embodying the predetermined characteristics of the calibration features for a corresponding pose of the robot 14 (and a corresponding pose of the calibration features due to robot 14 motion) substantially coincident with the electromagnetic sensor 500 sensing the calibration features and generating the sensor signal.

Figure 12:
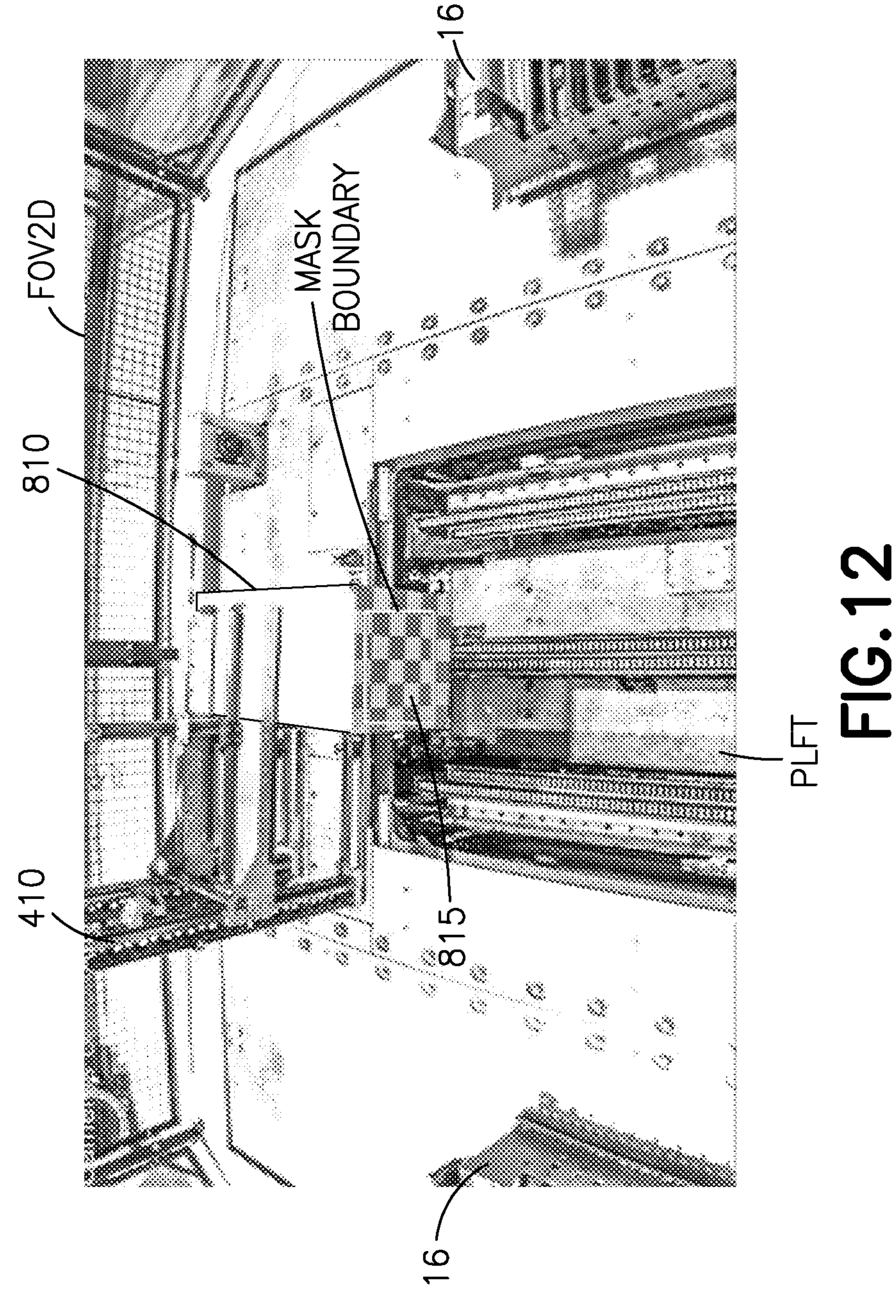
FIG. 12 is an exemplary image obtained with a vision system of the palletizer cell of FIG. 1 in accordance with aspects of the disclosed embodiment.

The electromagnetic sensor 500 is configured to as to be robust to variable lighting conditions. In one or more aspects, the electromagnetic sensor 500 is a two-dimensional (2D) color camera 500C (also referred to herein as the "2D camera") that is disposed on one or more of the frame 24 and the robot(s) 14 (see, e.g., FIGS. 3C, 4G, 5A, and 5B) so as to generate two-dimensional imaging (e.g., 2D images such as in FIGS. 8, 10, 12, 14, 16, etc.) of at least a portion of the palletizer cell 10 so as to effect calibration of the robot 14 as described herein. Here the two-dimensional camera 500C is a color camera that discriminates contrasting patterns (such as the grid patterns 800, 815) with a desired definition that is commensurate with the robot 14 motion accuracy (e.g., substantially the same as or less than the motion encoder error of the robot 14). The camera 500C may be any suitable two-dimensional camera such as those available from Basler, Inc. (located in Exton Pennsylvania USA) that has a field of view FOV2D (see FIG. 12) configured to image at least a pallet building area of the palletizer cell 10. The two-dimensional camera 500C may be a high resolution camera having a resolution of, for example, about 2.3 megapixels to about 24 megapixels (or higher). Any suitable lighting (such as ring light 500L or any other suitable illumination source) may be provided to illuminate objects being imaged by the two-dimensional camera 500C. The two-dimensional camera 500 is communicably coupled to the controller 10C so the controller 10C registers, from the two-dimensional camera 500C, real time two-dimensional imaging data embodying different corresponding two-dimensional images of the palletizer cell 10. In one aspect, the two-dimensional camera 500C is configured so as to effect two-dimensional imaging of the pallet support SPAL on the pallet building base 301, of the end of arm tool 410 at one or more predetermined locations of the palletizer cell 10, and of the pallet load build BPAL on the pallet support SPAL. In other aspects, the camera 500C may be any suitable imaging device such as any suitable electromagnetic sensor (i.e., a sensor for detecting the electromagnetic spectrum/frequency range of electromagnetic radiation of an object(s)) including but not limited to, cameras, laser scanners, etc. In other aspects, the camera 500C may be a three-dimensional camera having sufficient resolution to extract the data described herein, with respect to the two-dimensional camera, from three-dimensional images obtained thereby. In still other aspects, the electromagnetic sensor 500 may be a laser scanner/reader 500LSR configured to scan/read the features/characteristics of the target objects (e.g., such as a three-dimensional structure) that may be determinative of the target object (such as those described herein) pose.

It is noted that alignment of the fields of view of the three-dimensional cameras 310C1-310C4 and the two-dimensional camera 500C is performed by aligning images from each camera 310C1-310C4, 500C with images from each other camera 310C1-310C4, 500C by employing image overlay annotations. In other aspects, the cameras 310CA1-310C4, 500C of vision system 310 may be synchronized using a calibration fixture that is placed on the lift 12 in a manner substantially similar to that described in U.S. patent application Ser. No. 17/070,753 filed on Oct. 14, 2020 and titled "Vision-Assisted Robotized Depalletizer," the disclosure of which is incorporated herein by reference in its entirety.

With reference to FIGS. 3A-3D, 5A and 5B, palletizer cell referentials will be described, where these referentials are employed by the controller 10C to effect the fully automatic calibration of the palletizer cell 10 from an uncalibrated state of the palletizer cell. The referentials described herein are defined herein for exemplary purposes (i.e., are exemplary in nature) and for convenience of description. In other aspects of the disclosed embodiment, any suitable referentials may be selected and/or defined in any suitable manner, such as described herein, where the referentials are located at any suitable positions of the palletizer cell and/or of the palletizer cell components.

It is noted that the three-dimensional cameras 310C1-310C4 and the two-dimensional camera 500C are pre-calibrated so that each of the cameras 310C1-310C4, 500C have a respective origin referential COR (see FIG. 5A—i.e., a coordinate system (X, Y, Z) origin) located at the center of the camera lens. The three-dimensional cameras 310C1-310C4 are configured to provide three-dimensional point clouds of portions of the palletizer cell 10 where positions of imaged objects are made with reference to the respective origin referentials. The two-dimensional camera 500C may also be configured for three-dimensional vision due to intrinsic parameters in the two-dimensional camera 500C calibration (i.e., given a plane in the palletizer cell 10 3D world, the pixel in pixel coordinates of the two-dimensional camera 500C can be converted into world coordinates of the palletizer cell 10). The calibration of the two-dimensional camera 500 is performed in a manner similar to that described in Z. Zhang, *A flexible new technique for camera calibration, IEEE Transactions on Pattern Analysis and Machine Intelligence,* 22(11):1330-1334, 2000, the disclosure of which is incorporated herein by reference in its entirety.

Each of the robots 14 has a base 14B and arm or manipulator 14A. The end of arm tool 410 is coupled to the arm 14A at flange 14F. Each of the robots 14 includes at least a base referential RBR, a flange referential RFR, and a tool referential RTR. As illustrated in, for example, FIGS. 3A-3C, the two robots 14 are placed on the frame 24 juxtaposed one another. The bases 14B are located substantially on a same (or common) plane CP (see FIG. 3A) defined by the frame 24 of the palletizer cell 10. The base referential RBR is located at the center of the base 14B of the respective robot 14 with the X axis extending in the direction of case flow on the pick conveyor 16 and the origin of the Z axis located on the plane CP. It is again noted that the referentials described herein are defined herein for exemplary purposes (i.e., are exemplary in nature) and for convenience of description. In other aspects of the disclosed embodiment, any suitable referentials may be selected and/or defined in any suitable manner, such as described herein, where the referentials are located at any suitable positions of the palletizer cell and/or of the palletizer cell components.

The robot flange referential RFR is located at the center of the flange 14F (see also FIG. 4C) with the Z axis pointing downwards (and having an origin at an end of arm tool coupling face of the flange) and the X axis extending in the direction of the end of arm tool 410 fingers 450F (of the support assembly 450). Here, the robot flange rotates about the Z axis of the flange referential RFR (e.g., such that the flange referential RFR rotates with the end of arm tool orientation keeping the X axis aligned with the fingers 450F), but in other aspects the flange 14F may not rotate.

The tool referential RTR (also referred to as the tool center point or TCP) describes the reference frame of the tool, from which picks and places are calculated. The tool referential RTR has an origin located at the tip of the farthest finger from the cameras 310C1-310C4, 500C during picks from the respective pick conveyor 16 (see FIGS. 3A and 3D and also FIG. 16), with the Z axis pointing downwards (and having its origin at the intersection of a top surface of the finger 450F and a tip surface of the finger) and the X axis extending in the direction of the fingers 450F.

Referring to FIGS. 3A-3C and 17, the empty pallet conveying mechanism 20 (e.g., telescopic fork) has a telescopic fork origin referential TFRP, which in one or more aspects is located substantially at a centerline CL of the aperture 44 of the elevator 12. The location of the telescopic fork origin referential (e.g., datum) TFRP may be defined by nominal dimensions of the palletizing cell 10 (e.g., from computer aided drafting (CAD) files) or in any other suitable manner. The telescopic fork origin referential TFRP is common to each of the robots 14 and effects synchronizing or otherwise connecting the workspaces of the robots 14. The origin of the telescopic fork origin referential TFRP is located a predetermined distance from the robot base referentials RBR in the X direction and the Y origin is located at the midpoint between the robot base referentials RBR. The telescopic fork origin referential TFRP is projected onto the plane of the empty pallet conveying mechanism 20 (see FIG. 17—so that the Z axis origin is at the top surface of the empty pallet conveying mechanism 20). The telescopic fork origin referential TFRP is employed for pallet building and locating the pallet support SPAL in the palletizer cell 10 workspace.

Figure 18A:
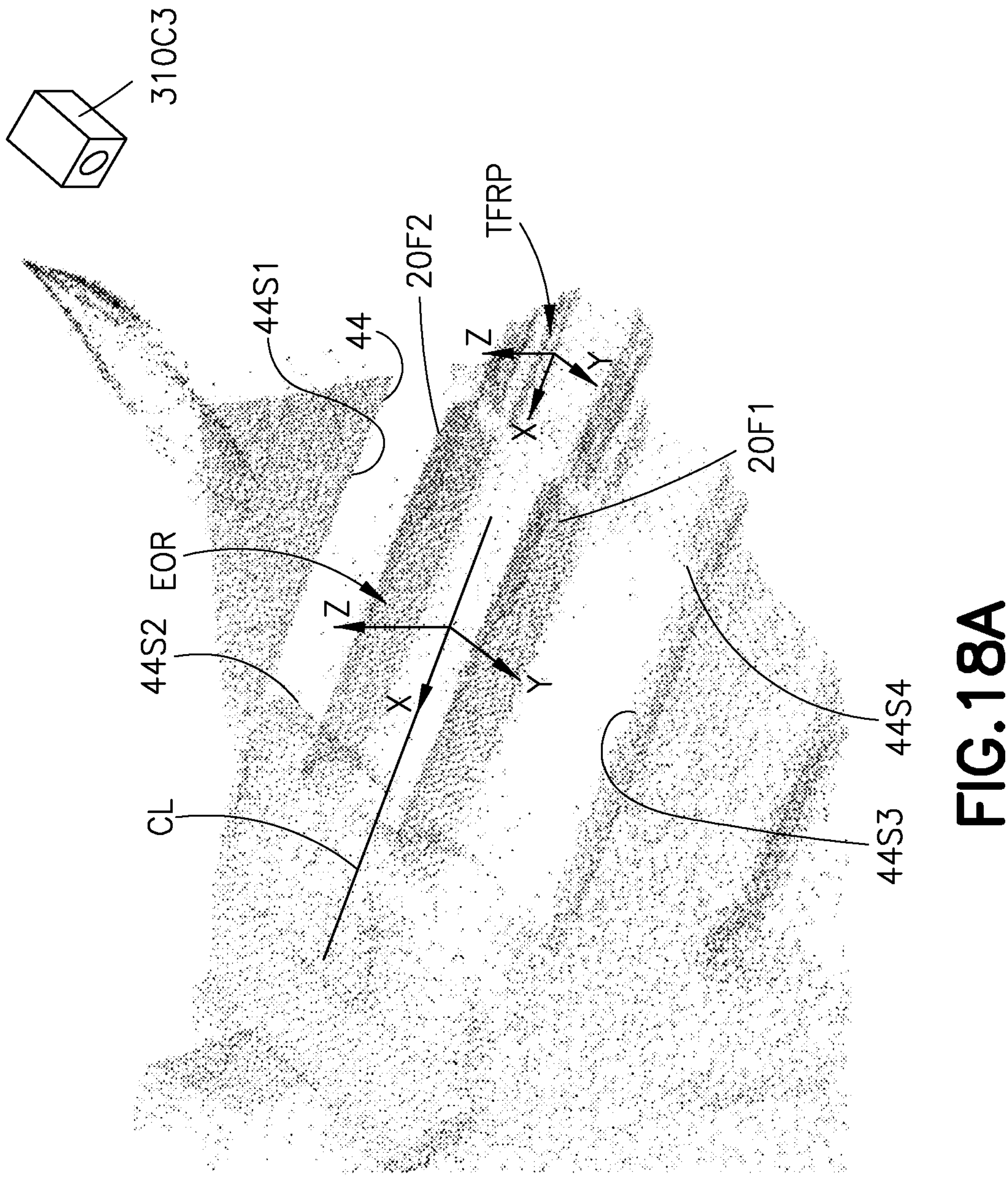
FIG. 18A is an exemplary point cloud obtained with a vision system of the palletizer of FIG. 1 in accordance with aspects of the disclosed embodiment.
Figure 18B:
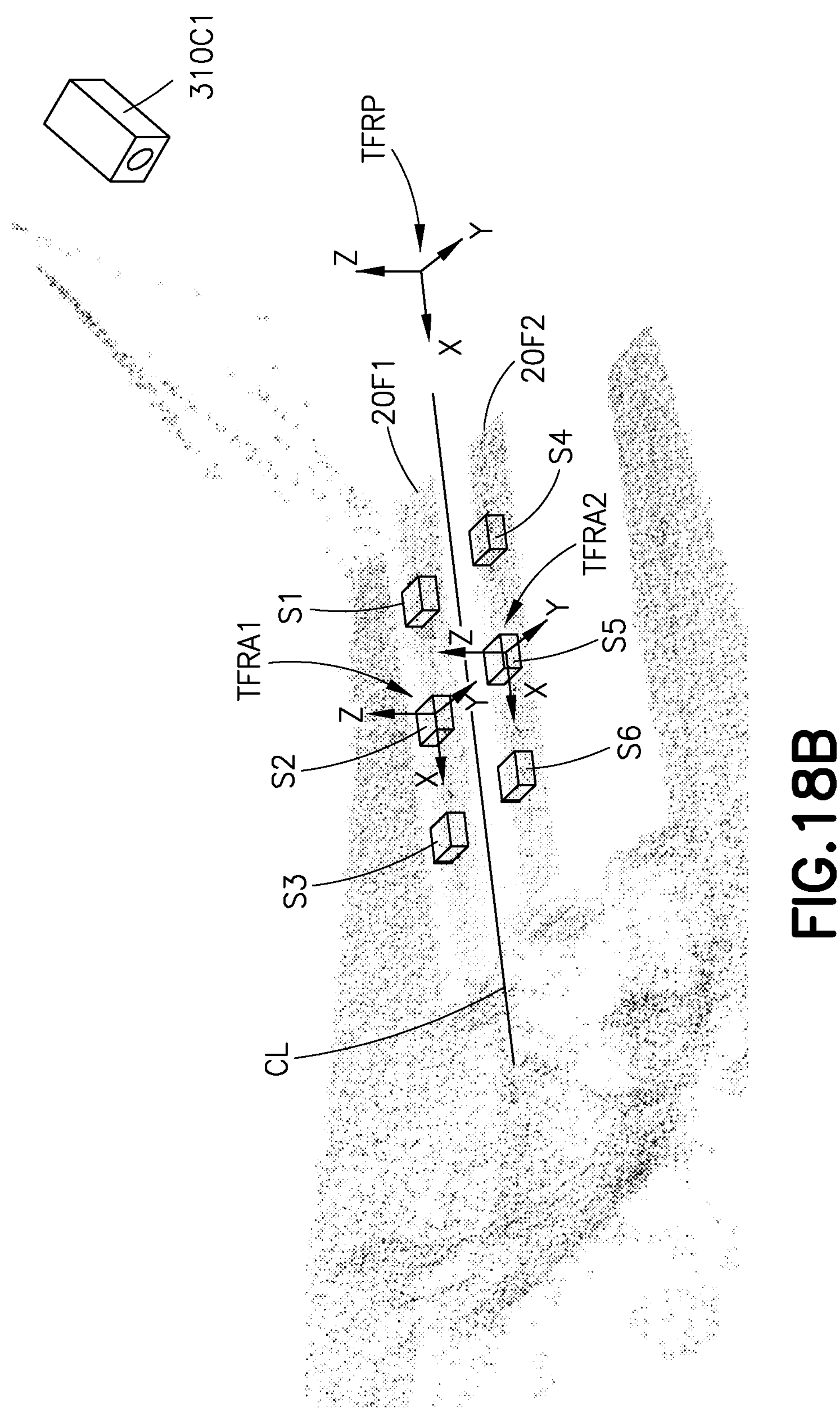
FIG. 18B is an exemplary point cloud obtained with a vision system of the palletizer of FIG. 1 in accordance with aspects of the disclosed embodiment.

Referring also to FIGS. 18A and 18B a fork referential (e.g., datum) TFR is also defined in each of the three-dimensional cameras 310C1-310C4. The fork referential TFR is employed by the controller 10C to segment points clouds of the respective three-dimensional cameras 310C1-310C4. Here, the fork referential TFR locates the transfer forks 20F1, 20F2 of the empty pallet conveying mechanism 20 in the palletizer cell 10 workspace with respect to each of the three-dimensional cameras 310C1-310C4. The fork referential TFR is defined with the with the Z axis pointing upwards from a plane defined by the top surface of the forks 20F1, 20F2 and the x axis in line with the centerline between the forks 20F1, 20F2 (see FIGS. 18A and 18B) pointing away from the three-dimensional cameras 310C1-310C4. The origin of the fork referential TFR for each respective three-dimensional camera 310C1-310C4 is at the root point of the plane in X and Z, where the camera 310C1-310C4 projects to the plane. The Y origin is then in line with the centerline CL of the forks 20F1, 20F2. Exemplary images from, for example, three-dimensional camera 310C1 and 310C3 are illustrated in FIGS. 18A and 18B showing a point cloud of the forks 20F1, 20F2 detected by the respective cameras and the fork referential TFR for the respective cameras. Here, selection of a discrete common referential (such as the fork referential TFR) for each of the three-dimensional cameras may serve, in some aspects, for calibration of the three-dimensional cameras to each other by resolving the pose of the referential and the characteristics from detection of the pose, given the predetermined location and known characteristics of the three-dimensional cameras. In such a case, the three-dimensional camera calibration is commensurate with the robot 14/end effector 410 placement accuracy.

Additional referentials (e.g., datums) TFRA1, TFRA2 may be determined for each individual fork 20F1, 20F2 for one or more of the three-dimensional cameras 310C1-310C4. These additional referentials TFRA1, TFRA2 effect detection of anomalies such as bent/twisted forks and differences in height between the forks 20F1, 20F2 along the longitudinal length of the forks 20F1, 20F2. Here, the controller 10C effects image sampling (see sampling boxes S1-S6), with for example, three-dimensional camera 310C1 (see FIG. 18B), of portions of each fork 20F1, 20F2 to generate individual fork referentials TFRA1 (for fork 20F1), TFRA2 (for fork 20F2) based on a plane fit of the respective fork surface with the respective sampling box S1-S6. The origin of the individual fork referentials TFRA1, TFRA2 are placed on the respective fork 20F1, 20F2 with the Z axis being normal to the plane of the respective fork 20F1, 20F2 (as established by sampling boxes S1-S6) where the Z axis points upwards, the X axis points away from the camera (in this example camera 310CA) imaging the forks. Anomalies are registered, in one aspect, from fork features identified based on imaging of but one three-dimensional camera 310C1-310C4. In other aspects, different indications of anomalies are detected by comparison of images of the forks captured from more than one of the three-dimensional cameras 310C1-310C4 (where the cameras are calibrated, with the common electromagnetic sensor 500, relative to each other).

Figure 3D:
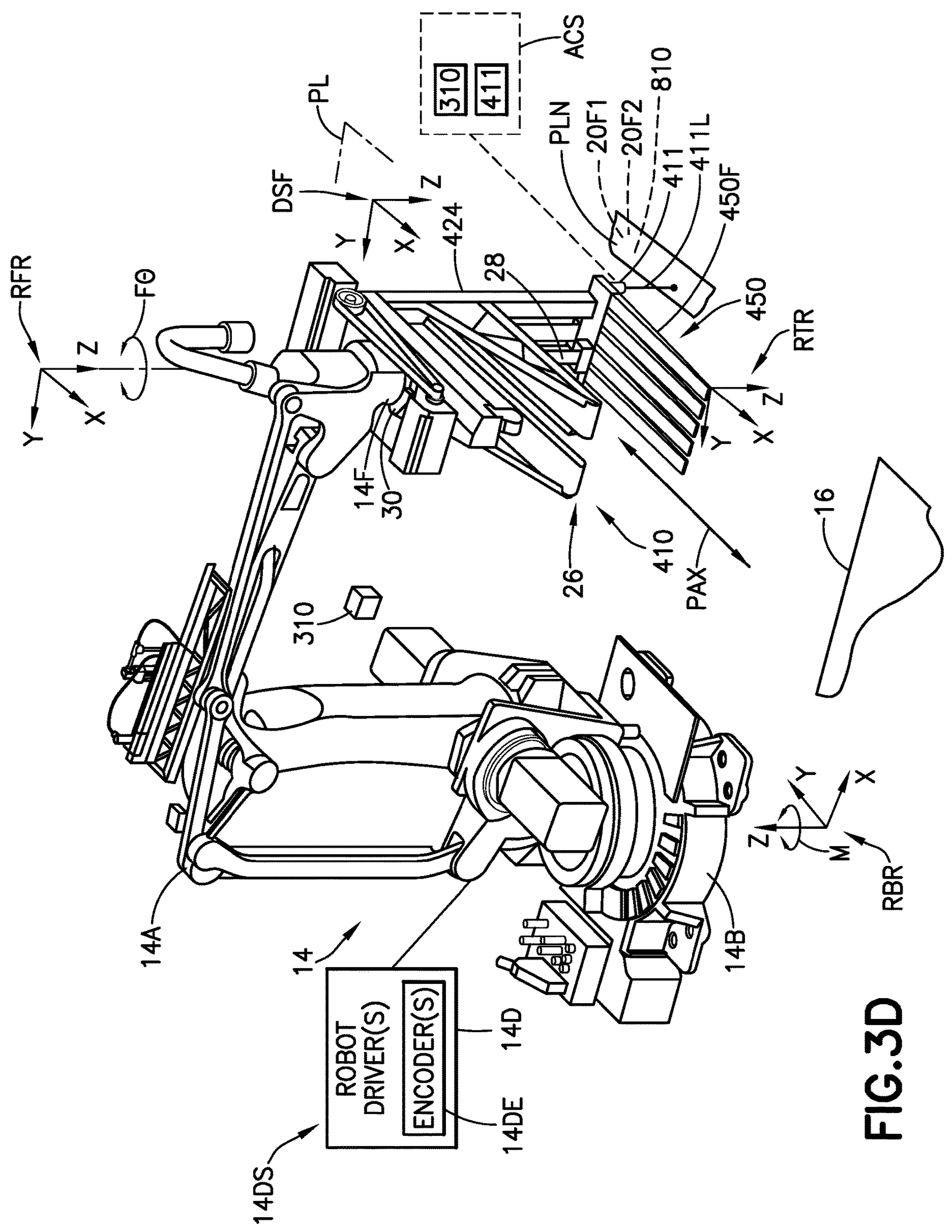
FIG. 3D is a perspective illustration of a palletizing robot of the palletizing system of FIG. 3A in accordance with aspects of the disclosed embodiment.

Referring also to FIG. 3D, the distance sensor 411 may also include a referential (e.g., datum) DSF. The distance sensor referential DSF is defined as the intersection between the laser line and a plane PL located in the flange referential (e.g., datum) RFR (e.g., such as for example, a height of about 1000 mm in the flange referential RFR, however the height of the plane PL may be any suitable height). The laser line is imaged by one or more of the cameras (such as two-dimensional camera 500C) and the controller 10C is configured to determine, based on the camera images the location of the distance sensor 411 on the end of arm tool 410 and determine the location of the distance sensor referential.

Figure 8:
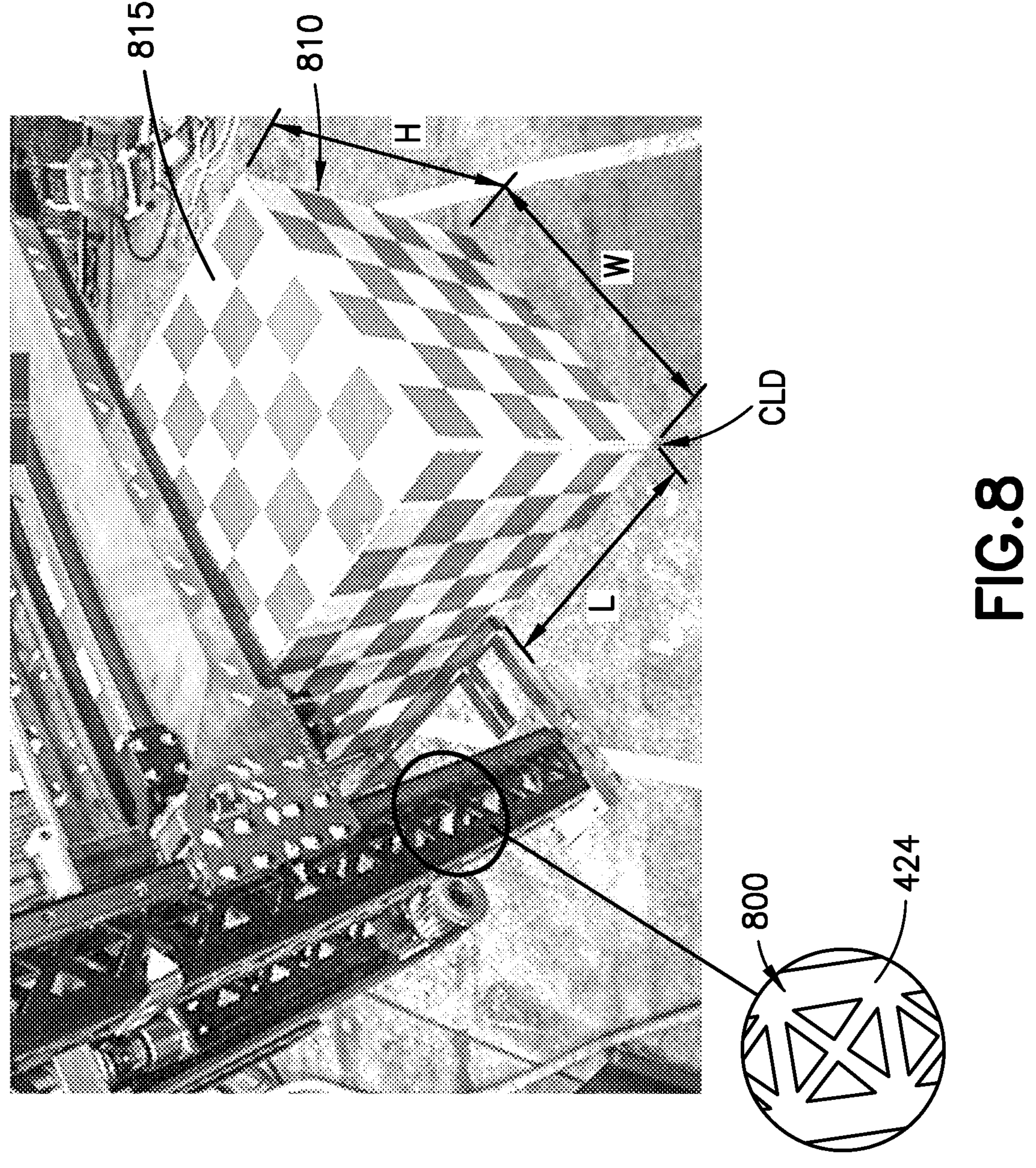
FIG. 8 is an exemplary image obtained with a vision system of the palletizer cell of FIG. 1 in accordance with aspects of the disclosed embodiment.

Referring to FIG. 8, in accordance with the aspects of the disclosed embodiment, the automatic calibration system ACS includes structure and/or indicia with calibration features connected to the end of arm tool 410 (or end effector), where the features having a predetermined characteristic describing a predetermined or known shape or pattern. For example, the fully automatic calibration is effected by the controller 10C and automatic calibration system ACS with reference to a target object held on or integral with the end of arm tool 410 or may be disposed in a predetermined geometric relation to the end of arm tool 410 and features of the end of arm tool 410. The target object may be one or more target objects (e.g., one or more jigs, fixture, or other suitable structure/objects), where the one or more target objects include suitable structure and/or indicia, where the structure and/or indicia has a predetermined characteristic that is deterministic for target object three-dimensional orientation/localization. For example, the predetermined characteristic of the structure and/or indicia of the target object may have four non-collinear but coplanar edges where the distances and/or locations between the edges are known so as to effect homography between images of the different cameras 310C1-310C4, 500C of the vision system 310.

Different and distinct target objects may be employed for robot 14/end effector 410 localization/calibration in the palletizing cell workspace and for setting of the referentials (e.g., datums). In one aspect the calibration features of the (e.g., each of the one or more) target object are dependent from the end of arm tool 410, or the calibration features and end of arm tool 410 are commonly dependent from a common member of the robot 410 (e.g., such as flange 14F), and the calibration features and end of arm tool 410 move as a unit relative to the frame 24 with each articulation of the robot 14. For example, one of the one or more target objects is grid pattern 800 of known characteristics (such as the four non-collinear but coplanar edge described above) integrally formed in the frame 424 of the end of arm tool 410 (see FIG. 8) where the grid pattern 800 has four edges in a known relationship with each other. Here, the grid pattern 800 may be integrated with any suitable portion of a respective robotic case manipulator 14 structure and/or any suitable portion of the end of arm tool 410 structure for effecting localization of the respective robot 14. The one or more of the target objects may also include jig(s) or fixture(s) that are different and distinct from the integrally formed characteristics of the end of arm tool 410 (and robot 14), where the jig(s) or fixture(s) are employed for setting the referentials described herein. The jig(s) or fixture(s) may be a calibration box 810 (or other suitable object) carried by the end of arm tool 410, where the fixture includes a grid pattern 815 of known characteristics such as the four non-collinear but coplanar edge described above. In one or more aspects, the jig(s) or fixture(s) may be employed for both robot 14/end effector 410 localization and setting of the referentials.

For exemplary purposes only, the calibration box 810 has a width W of about 12 inches, a height H of about 12 inches, and a length L of about 24 inches, although in other aspects the calibration box 810 may have any suitable dimensions, including but not limited to dimensions corresponding to the case units expected to be handled by the end of arm tool 410. The grid pattern 815 if formed by a number of quadrilaterals arranged in a two-dimensional array (i.e., on at least two planar surfaces of the calibration box 810). For exemplary purposes, the two-dimensional array of quadrilaterals on a respective side of the calibration box 810 form a checkerboard pattern having squares that are about 2 inches by 2 inches in dimension, although in other aspects the quadrilaterals on the respective side of the calibration box may have any suitable dimensions for forming the two-dimensional array.

The calibration box 810 (or other target object) is optimized to leverage the imaging characteristics of both the three-dimensional cameras 310C1-310C4 and the two-dimensional camera 500C. For example, the squares of the checkerboard pattern are such that the colors of the squares have a similar luminance value with very distant hue values that facilitate imaging of the two-dimensional array with the two-dimensional camera 500C while rendering the two-dimensional array undetectable by the three-dimensional cameras 310C1-310C2 (e.g., so that the checkerboard pattern does not appear in the three-dimensional images and to effect location determination of the planes formed by the calibration box sides). Suitable examples of contrasting colors of the two-dimensional array include, but are not limited to, green and tan.

With reference to FIGS. 3A-3D, 5A-15, and 19A-25, the automatic calibration system ACS, with the controller 10C, is configured to image the calibration box 810 and other portions of the palletizer cell to effect fully automatic calibration (including localization) of each of the robots 14 within the palletizer cell reference frame and automatic teaching of each station (e.g., conveyor, pallet load surface, forks, etc.) of the palletizer cell as will be described further herein. In order to facilitate the calibration procedures for each degree of freedom of the robot 14 drive(s), the position of each robot 14 is constrained relative to the palletizer cell reference frame so that measurements obtained by the vision (in other words the automatic calibration and teach) system 310 do not affect (i.e., are rectified to) a relative location of the robots 14 in a mathematical model of the palletizer cell 10 generated from the calibration procedure. In particular, one or more boundary/rectification constraints (referred to herein as constraints) are set for the location of the robots 14 so that the robot bases 14B lay on a common plane (e.g. defined by the frame 24). It is also noted that the robots 14 are "zeroed" or moved to their home position to reset the encoders 14DE (FIG. 3D) of the robots 14 prior to the automatic calibration procedure so that the location of the robot flange 14F is known relative to the base 14B.

The calibration procedure for calibrating the robots 14 is initiated (FIG. 14, Block 1400) in any suitable manner such as by operator interface with a user interface UI of the controller 10C (or of the controller 199C).

Figure 14:
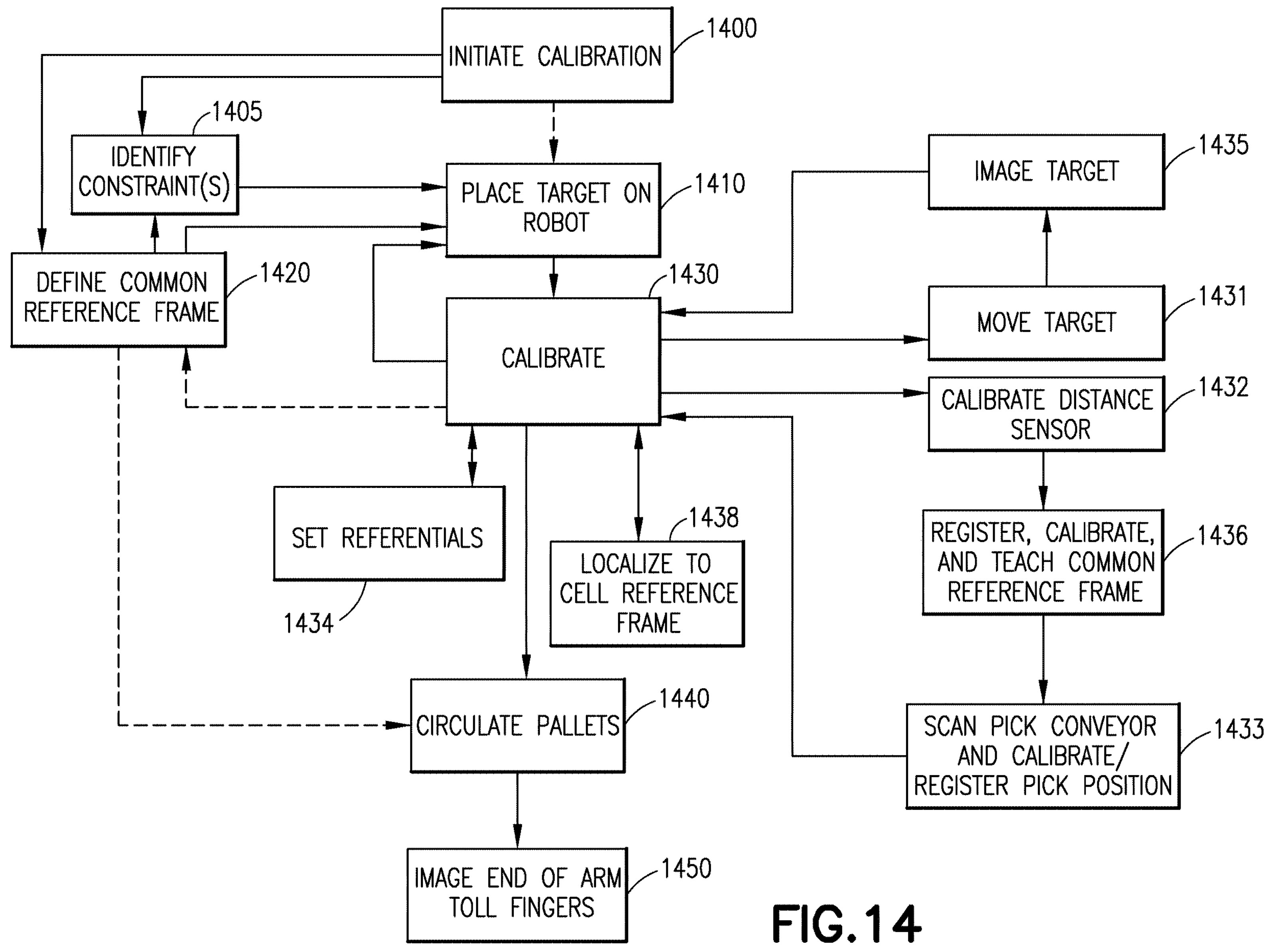
FIG. 14 is an exemplary flow diagram of a method in accordance with aspects of the disclosed embodiment.

As noted above, for each robot 14, one or more constraints are identified (FIG. 14, Block 1405). The constraints may be predetermined/known from palletizer cell design; with one non-limiting example of a boundary/rectification constraint is the plane CP (noted above—see FIG. 3A), formed by the frame 24, on which the robots are disposed. The plane CP may at least in part be determinative of the robot 14 base 14B origin (with respect to, at least, the electromagnetic sensor 500 and/or three-dimensional cameras 310C1-310C4) and pose. The plane CP may define an orientation/inclination (e.g., in the Z direction) of each robot 14 in the X axis and the Y axis with respect to, at least the electromagnetic sensor 500 and/or three-dimensional camera 310C1-310C4 reference frame(s).

The controller 10C effects determination of the common fork origin referential TFRP (FIG. 14, Block 1420) in the manner described herein for each of the three-dimensional cameras 310C1-310C4. As previously described, the forks 20F1, 20F2 form the base of the pallet support, upon which the pallet load is built by each of the robots 14, cooperatively or alone. The pallet support (and hence the forks 20F1, 20F2) are a palletizer cell station and the fork origin reference position or referential (also the bounds of the pallet support) are location(s) with respect to which the robot(s) 14 are calibrated and taught. Determination of the common fork reference frame/referential TFRP may be effected at any step throughout the calibration/teach process, though described here first. Order of process is not constrained unless specifically stated.

Figure 16:
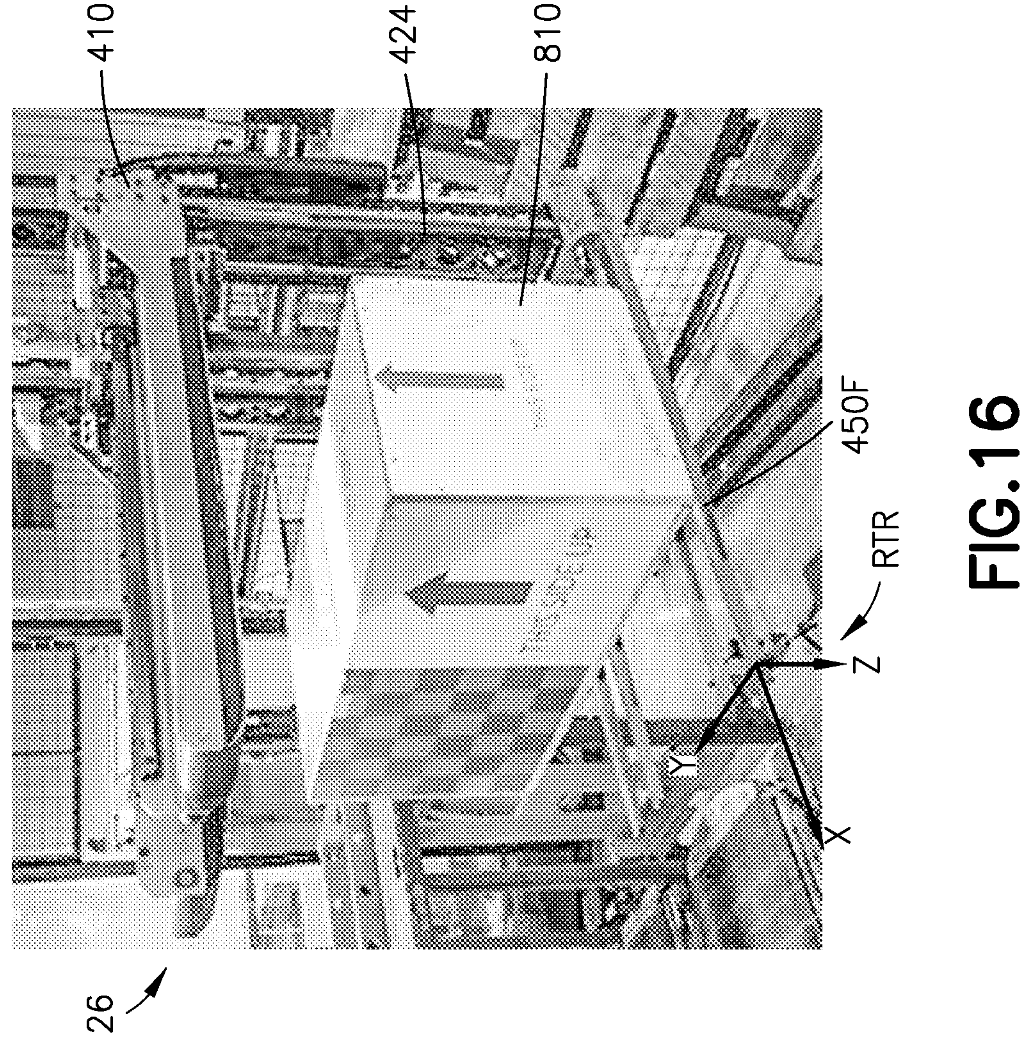
FIG. 16 is an exemplary image obtained with a vision system of the palletizer cell of FIG. 1 in accordance with aspects of the disclosed embodiment.
Figure 17:
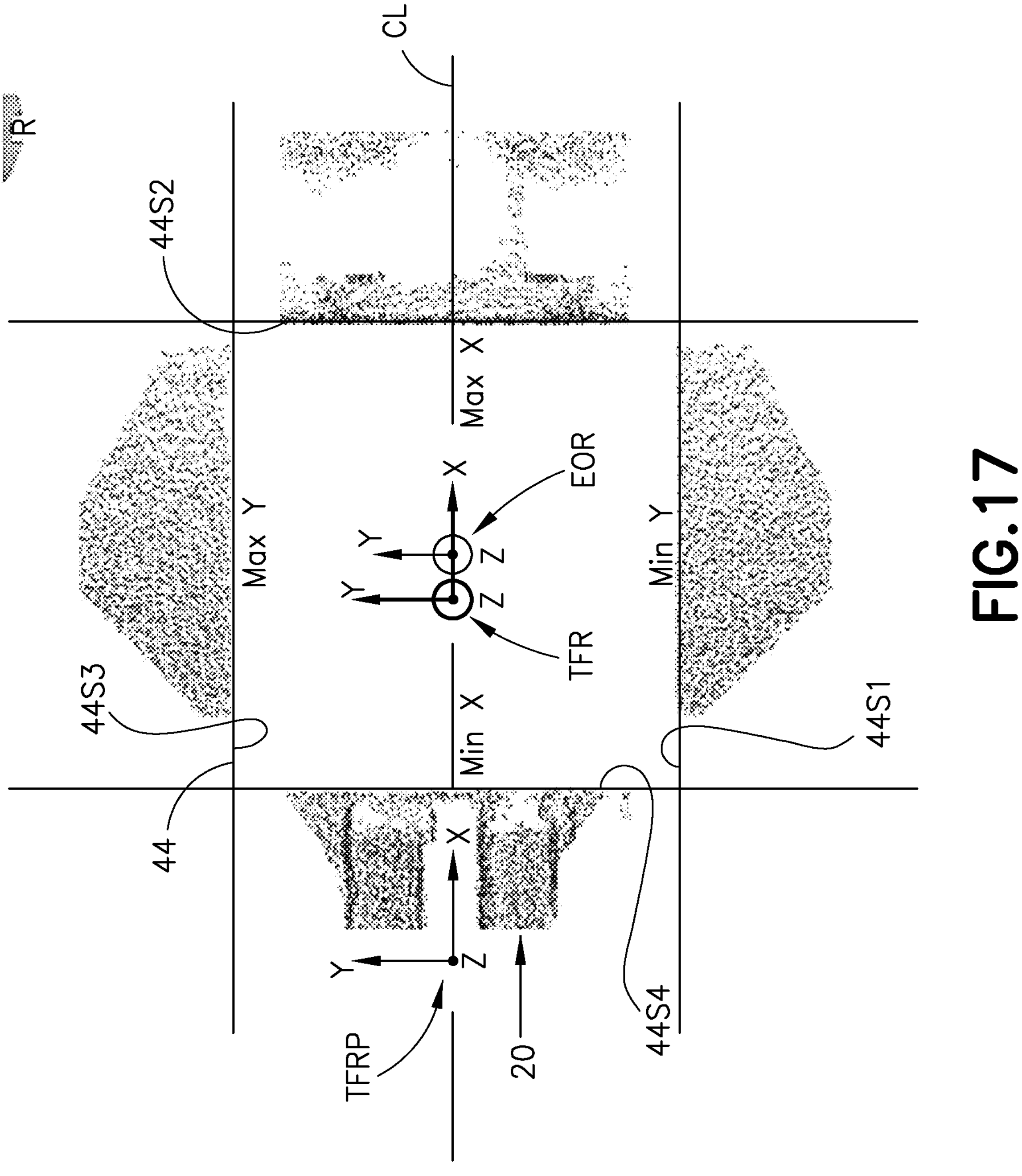
FIG. 17 is an exemplary point cloud obtained with a vision system of the palletizer of FIG. 1 in accordance with aspects of the disclosed embodiment.

One of the robots 14 is commanded by the controller 10C to position the end of arm tool 410 such that an operator can place the calibration box 810 in the end of arm tool 410 (FIG. 14, Block 1410) such as illustrated in FIGS. 8 and 16. In other aspects, as described herein, the target may be integral to the end of arm tool 410 in which case the calibration box 810 may not be placed on the end of arm tool 410. Placement of the calibration box 810 on the end of arm tool 410 may be a random placement so long as the end of arm tool 410 is able to grip the calibration box 810. With the calibration box 810 gripped by the end of arm tool 410 the position of the calibration box 810 relative to the end of arm tool 410 of robot 14 does not change (i.e., is invariant) throughout the calibration procedure. Here, the calibration features (e.g., of the calibration box 810) are disposed with respect to the robot 14 so that the predetermined characteristic of the calibration features are dispositive of a predetermined relation between calibration features and the bot reference frame (such as the flange referential RFR and/or base referential RBR).

Here, the calibration box is gripped by the end of arm tool 410 for the calibration procedure (FIG. 14, Block 1430), so that a camera synchronization is performed in the calibration process. Here, the robot 14 is moved via drive(s) 14D (see FIG. 3D) of the robot 14 (as commanded by the controller 10C) so the calibration box 810 is moved to a series of, for example four, known locations (there may be more or less than four known locations to which the robot is moved). The locations are known in the robot reference frame from encoder data of the robot drive(s) 14D (i.e., of a robot drive section 14DS—see FIG. 3D). Each of the locations, in the series of locations, positions the target object so that the calibration system/cameras image (e.g., sense, with the definition identified herein, the predetermined characteristic determinative of pose) the target object. In each location of the series of locations, at least one different one of the three-dimensional cameras 310C1-310C4 and the electromagnetic sensor 500 (such as the two-dimensional camera 500C) image the target object. For example, each camera 310C1-310C4 and the electromagnetic sensor 500 images the robot end of arm tool 410 in each of the four locations. The robot position as determined by the robot encoders 14DE (FIG. 3D) is associated with the robot position in each of the four images of each of the cameras 310C1-310C4 and the electromagnetic sensor 500. In the camera synchronization the controller 10C employs three-dimensional localization of the calibration box 810 and then two-dimensional localization of the calibration box 810, where the box is placed in positions within the palletization volume that are known to be "easy" (e.g., few features in the image other than the calibration box) for a camera pre-synchronization algorithm of the controller 10C to detect.

With the robot 14 positions located (e.g., approximately) relative to the camera locations (e.g., a robot location to camera reference frame transport is approximated) the robot 14 is automatically calibrated/synchronized with the cameras 310C1-310C4 and the electromagnetic sensor 500. The algorithm employed by the controller 10C for the automatic calibration/localization of the robot 14 detects the calibration box 810 in both three-dimensions and two-dimensions at the various locations in the series of locations and the respective poses of each location (for optimizing the transform between the robot referentials and the camera referentials) and outputs, for example, detected box corners, planes, and inliers. The robot 14 calibration/localization provides for three-dimensional calibration box 810 detection (e.g., box corners) and two-dimensional calibration box 810 detection (e.g., corners and grid 815) in the respective worlds (i.e., reference frames) of each camera 310C1-310C4 and the electromagnetic sensor 500 for each of the locations in the series of locations, so as to tie together (or synchronize) all the referentials into a cohesive space.

As described herein, the controller 10C is configured to move the robot 14 (by commanding actuation of the degree(s) of freedom of the robot drive(s)) and position the calibration features of, for example, the calibration box 810 and/or the integral features of the end of arm tool 410 to an initial position (that is a known or predetermined position in the robot reference frame defined by the degrees of freedom AX, AY, AZ, Au (see, e.g., FIGS. 3D and 4G) from an initial/home position of the robot 14) in which the electromagnetic sensor (two-dimensional camera) 500 senses the calibration features, the controller 10C being configured to resolve a pose of the calibration features with respect to the sensor reference frame (e.g., origin referential COR), and from the pose resolved determine a transformation between the electromagnetic sensor 500 (here the two-dimensional camera 500C) origin referential COR frame and a selected three-dimensional camera reference frame (e.g., origin reference frame COR of one or more of the three-dimensional cameras 310C1-310C4) so as to calibrate the three-dimensional camera 310C1-310C4. As may be realized, calibration (resolution of the pose of the origin reference frame COR) of the electromagnetic sensor 500 and of the selected three-dimensional camera 310C1-310C4 are hence effected substantially coincident. Moreover, localization and teaching of the robot 14 and end of arm tool 410 in the palletizer cell space is also initiated and effected substantially coincident with the calibration of the electromagnetic sensor 500 and the three-dimensional cameras 310C1-310C4 as will be described further herein. For example, the algorithm employed by the controller 10C for the automatic calibration of the robot 14, in one aspect, employs three-dimensional calibration box 810 detection from the three-dimensional cameras 310C1-310C4 followed by two-dimensional calibration box 810 detection by the electromagnetic sensor 500, where the three-dimensional detection, here, facilitates segmentation of the two-dimensional images as described herein and expediting pose resolution via the electromagnetic sensor 500 (here the two-dimensional camera 500C). The three-dimensional detection provides for ready detection of the calibration box 810 for ease of resolution of the two-dimensional image based on the corners of, for example the front and top faces of the calibration box 810 (side faces may also be detected), which are found by the controller 10C based on the front and top face planes.

Accordingly, two-dimensional localization of the calibration box 810 is performed based on the corners found in the three-dimensional camera calibration box 810 detection (where a mask is generated and applied by the controller 10C to the two-dimensional image to blank superfluous features in the two-dimensional image) to facilitate segmentation of the two-dimensional images of the calibration box 810. In other aspects, where the electromagnetic sensor 500 is other than an imaging sensor or camera (e.g., raster scanner, etc.) three-dimensional camera 310C1-310C4 visualization of the calibration box 810 compliments pose calibration of the electromagnetic sensor 500 SO that calibration of the electromagnetic sensor 500 and three-dimensional camera 310C1-310C4 is effected substantially coincident, but three-dimensional detection from the three-dimensional camera 310C1-310C4 may not be used to aid the electromagnetic sensor 500 calibration and pose determination (and in some aspects the three-dimensional visualization/detection by the three-dimensional camera 310C1-310C4 may not aid pose determination of the electromagnetic sensor 500 where the electromagnetic sensor 500 is a two-dimensional camera 500C and other suitable image processing of the controller 10C may be employed to segment the two-dimensional image).

In the calibration procedure, the referentials of the robot 14, cameras 310C1-310C4, and electromagnetic sensor 500 are set (FIG. 14, Block 1434). As an example, a referential of the electromagnetic sensor 500 (also referred to as a calibration sensor, which in this example is the two-dimensional camera 500C) that defines the pose of the electromagnetic sensor 500 is calibrated with respect to a pose of the target object (in this example the calibration box 810), where the pose of the target object is substantially unconstrained within the sensor acuity). Here, predetermined positioning of the target object with respect to the field of view of the electromagnetic sensor 500 and vice versa is not required. As described herein, the target object includes predetermined characteristics that are deterministic of target object pose resolution, where the calibration of the electromagnetic sensor 500 (and the three-dimensional cameras 310C1-310C4) resolve the pose of the target object and the respective electromagnetic sensor 500/three-dimensional camera 310C1, 310C4 with respect to each of (or one or more of) the robot 14 and the end of arm tool 410. For example, the grid 815 of the calibration box 810 is determined by the controller 10C, from which the corners of the calibration box 810 are defined in the electromagnetic sensor 500 (here for exemplary purposes the two-dimensional camera 500C) world. The controller 10C determines pose of the calibration box 810 in the electromagnetic sensor 500 world, calibration of the electromagnetic sensor 500 via the transform between the electromagnetic sensor 500 and a selected three-dimensional camera 310C1-310C4 calibration of respective three-dimensional camera(s) 310C1-310C4.

In the automatic calibration of the robot 14, the robot 14 moves, with one or more degrees of freedom of the robot drive section (so that each pose is informed by at least one degree of freedom of the drive, e.g., by respective drive position sensors of the degree of freedom(s)), the calibration box 810 to multiple predetermined/known positions and angles within the palletization volume (so that the positions and angles are described by action in each degree of freedom of the drive section and informs all stations in the palletizer cell space) (FIG. 14, Block 1431) (e.g., within the fields of view of the cameras 310C1-310C2 and the electromagnetic sensor 500) so that each of the three-dimensional cameras 310C1-310C4 (and the electromagnetic sensor 500) image at least the calibration box 810 (FIG. 14, Block 1432), and each three-dimensional camera image being coincident with the electromagnetic sensor 500 resolution of the calibration box. Here, movement of the calibration box 810 by the robot 14 resolves pose of the calibration box 810 (and location of the robot 14) with respect to each degree of freedom (X, Y, Z, μ, and in some aspects rotation of the end of arm tool about axis θ) such that, for each robot, a substantially simultaneous electromagnetic sensor 500 and three-dimensional camera 310C1-310C4 calibration is performed (as described herein) by the controller 10C; a substantially simultaneous bot localization determination (as described herein) is made by the controller 10C; and a substantially simultaneous teaching of the palletizer cell stations to the robot 14 (as described herein) is performed by the controller 10C.

The movement of the calibration box 810 (or other target object as described herein) by the robot 14 provides for a showing a discrete position/pose of the calibration box 810 to each of the electromagnetic sensor 500 and three-dimensional cameras 310C1-310C4 along a known path due to, for example, flange 14F movement along the known path (e.g., as determined by positions sensors of the robot 14 drive section). As described herein, the calibration box 810 is moved along any suitable number of predetermined/known paths (to any suitable number of predetermined/known locations) to resolve bot pose parameters with respect to the referentials described herein. Given the known boundary/rectification constraints, the known path in the robot reference frame, and the pose of the calibration box 810, the controller 10C determines, each robot/sensor (the term sensor being inclusive of the three-dimensional cameras 310C-310C4 and the electromagnetic sensor 500) pose parameter in the sensor reference frame and the palletizer cell reference frame in the manner described herein.

In one or more aspects, the imaging of the calibration box 810 (e.g., at each location/pose of the calibration box 810) by each the three-dimensional cameras 310C1-310C4 and the electromagnetic sensor 500 is substantially coincident (but in other aspects imaging of the calibration box 810 by the three-dimensional cameras 310C1-310C4 and the electromagnetic sensor 500 may occur at different times) to resolve the calibration of the three-dimensional cameras 310C1-310C4 to the electromagnetic sensor 500 pose, and with respect to each (or one or more) other three-dimensional camera 310C1-310C4 (FIG. 14, Block 1435).

Figure 15:
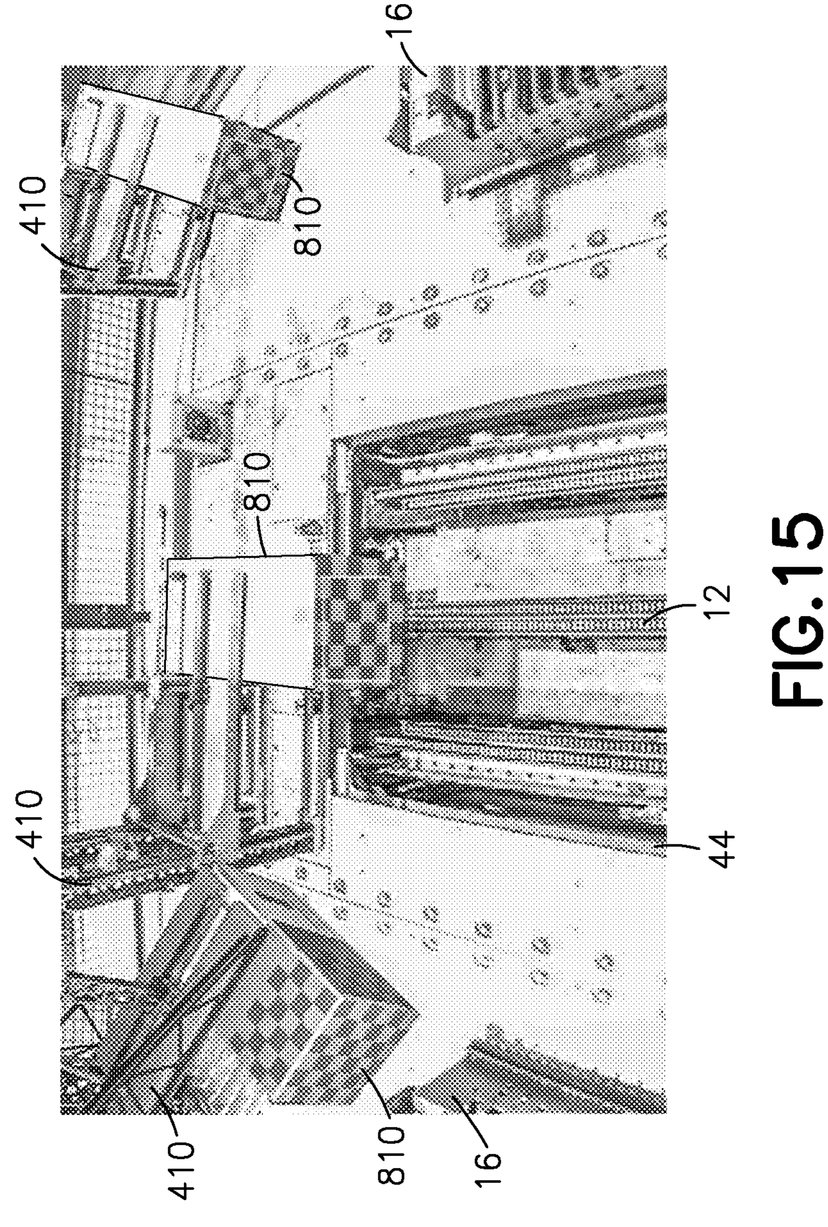
FIG. 15 is an exemplary image obtained with a vision system of the palletizer cell of FIG. 1 in accordance with aspects of the disclosed embodiment.

Examples of calibration box 810 locations and angles are illustrated in FIG. 15, noting that while three locations/angles are illustrated, the robot 14 may move the calibration box 810 to any suitable number of locations/angles so that placement of the calibration box 810 on the end of arm tool 410 is automatically resolved and sufficient data is obtained by the vision system 310 to locate the end of arm tool in the palletizer cell 10 reference frame/referential.

It is noted that placement of the calibration box 810 on the end of arm tool 410 is not preset to any datum or referent position on the end of arm tool 410, other than the calibration box 810 being seated on the fingers 450F of the end of arm tool 410. Here, the placement of the calibration box 810 on the end of arm tool 410 (and robot 14) is common/constant through all images such that the relative pose of the calibration box 810 to the robot 14 is cancelled from the controller 10C algorithm determinative of pose and robot 14 location as the position of the calibration box 810 relative to the robot 14/end of ram tool 410 is consistent/constant throughout the calibration process and may be neglected. As an example, the placement of the calibration box 810 on the end of arm tool 410 may be resolved and sufficient data for localizing the robot 14 may be obtained by moving the calibration box 810 to as few as three locations (each location having a different box angle/pose, where an image is generated by each camera 310C1-310C4, 500C at each of the three locations). In one aspect, 16 images are captured by each camera at 16 different calibration box locations/poses. In still other aspects, the robot 14 may move the calibration box 810 to more than 16 locations/poses for image capture. It is noted that with movement of the calibration box 810 to the various positions, the controller 10C monitors the robot 14 kinematics for consistency and where the kinematics are not consistent (such as due to abnormal robot encoders), the controller 10C alerts an operator through user interface GUI that the robot 14 may be in need of attention.

Figure 11:
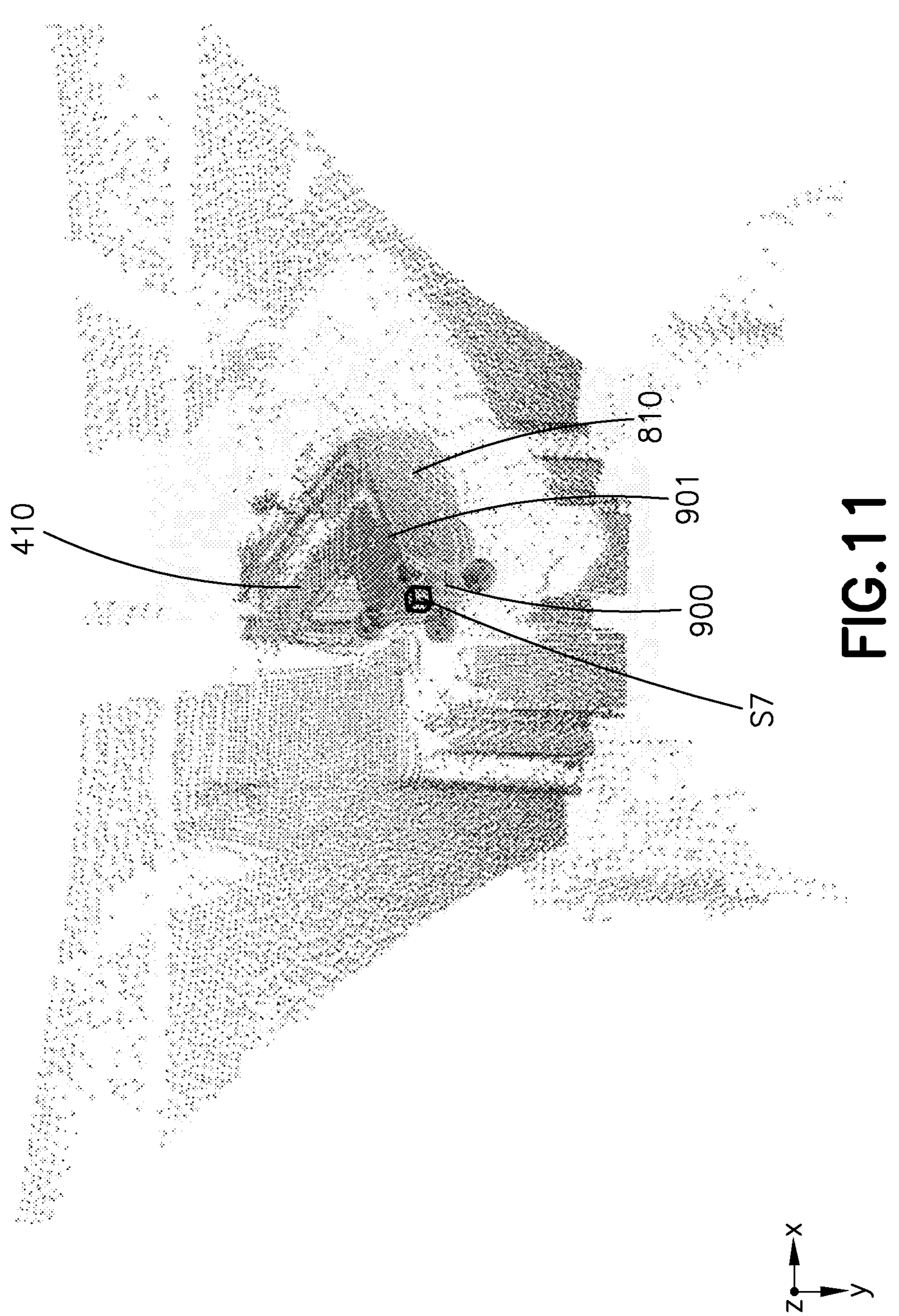
FIG. 11 is an exemplary point cloud obtained with a vision system of the palletizer of FIG. 1 in accordance with aspects of the disclosed embodiment.
Figure 13:
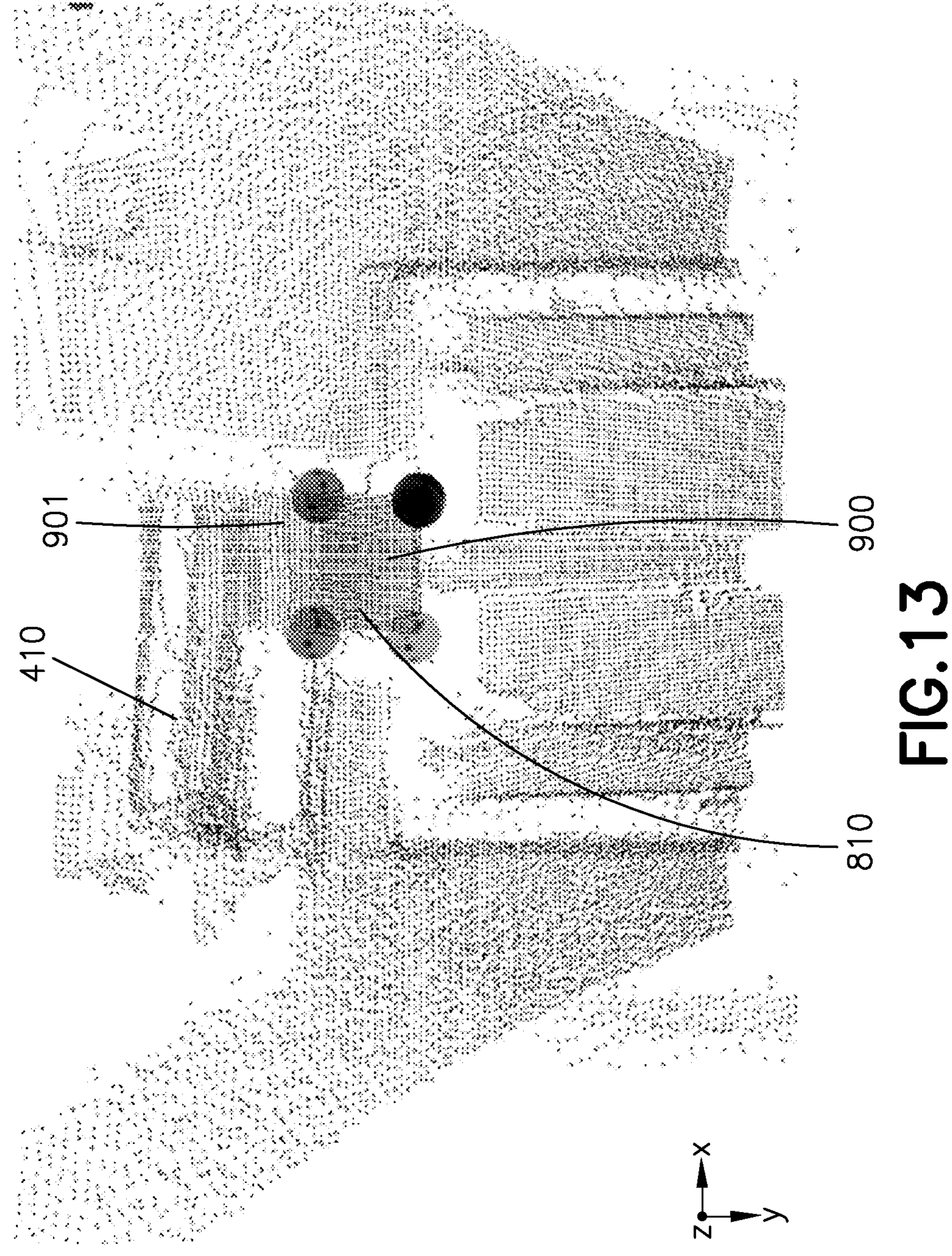
FIG. 13 an is exemplary point cloud obtained with a vision system of the palletizer of FIG. 1 in accordance with aspects of the disclosed embodiment.

At each location/pose of the calibration box 810 each of the three-dimensional cameras 310CA-310C4 detects the calibration box 810 for defining box face referentials. As described above, and as can be seen in FIGS. 8 and 9 (see also FIGS. 10 and 11 and FIGS. 12 and 13), data from the three-dimensional cameras 310Ca1-310C4 is in the form of respective point clouds (FIG. 9 is a point cloud representation of the two-dimensional image of FIG. 8; FIG. 11 is a point cloud representation of FIG. 10; and FIG. 13 is a point cloud representation of FIG. 12). Similar to the three-dimensional box referential, the fork referential TFRP is in one aspect, by the controller 10C to “mask” employed, superfluous areas of the point cloud that are not of the calibration box 810 or end of arm tool 410, nor otherwise determinative of robot 14 calibration. For example, points in the point cloud that are below the fork referential TFRP are removed, points in the point cloud to the left and right of the lift zone (i.e., are in which the lift operates) are removed, and points that are further away (i.e., from the imaging camera) than the farthest edge (i.e., from the imaging camera) of the lift aperture 44 are removed. The result of the masking is a point cloud that includes substantially only the calibration box 810 and the end of arm tool 410.

Figure 9:
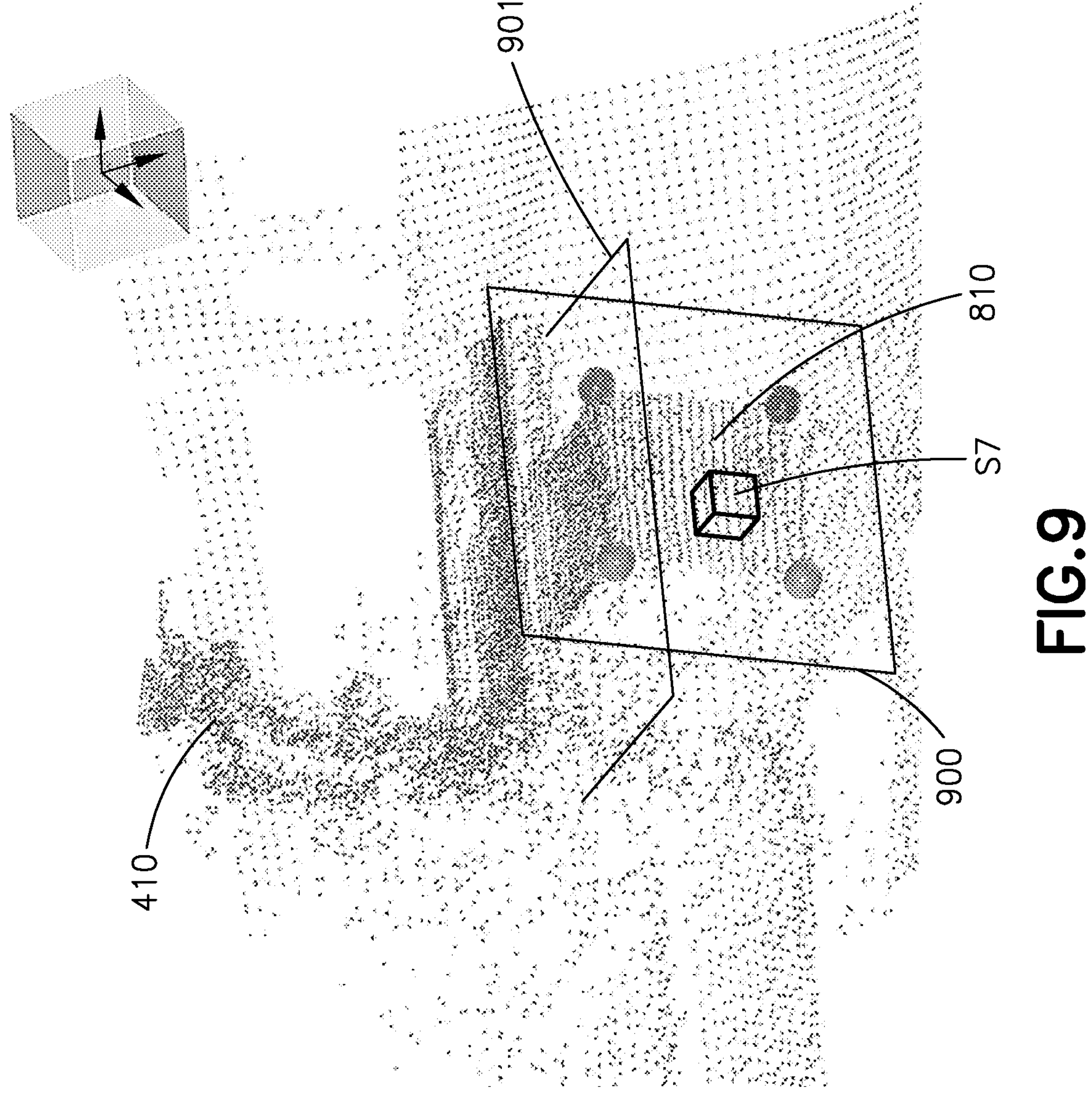
FIG. 9 is an exemplary point cloud obtained with a vision system of the palletizer of FIG. 1 in accordance with aspects of the disclosed embodiment.
Figure 10:
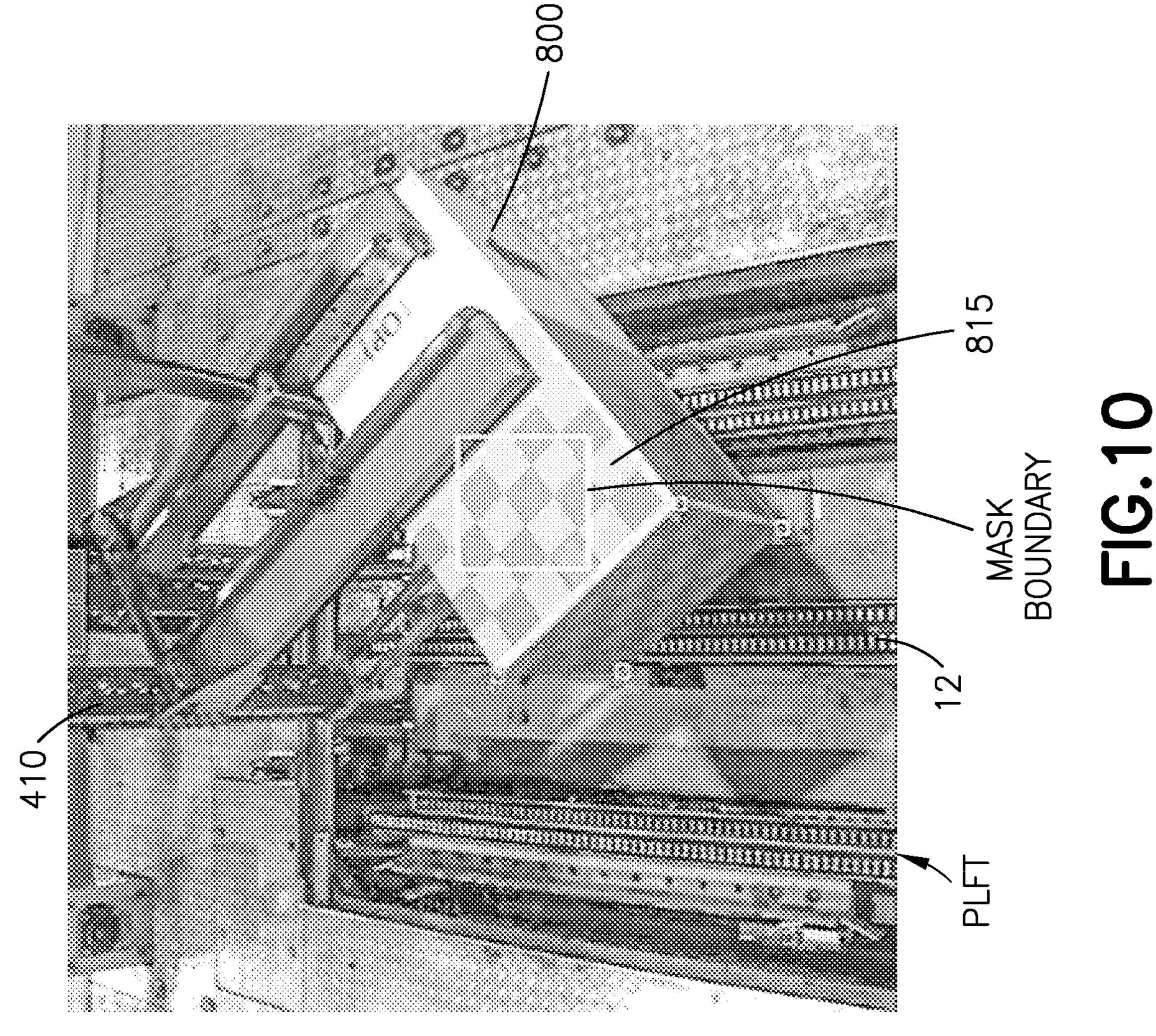
FIG. 10 is an exemplary image obtained with a vision system of the palletizer cell of FIG. 1 in accordance with aspects of the disclosed embodiment.
Figure 19A:
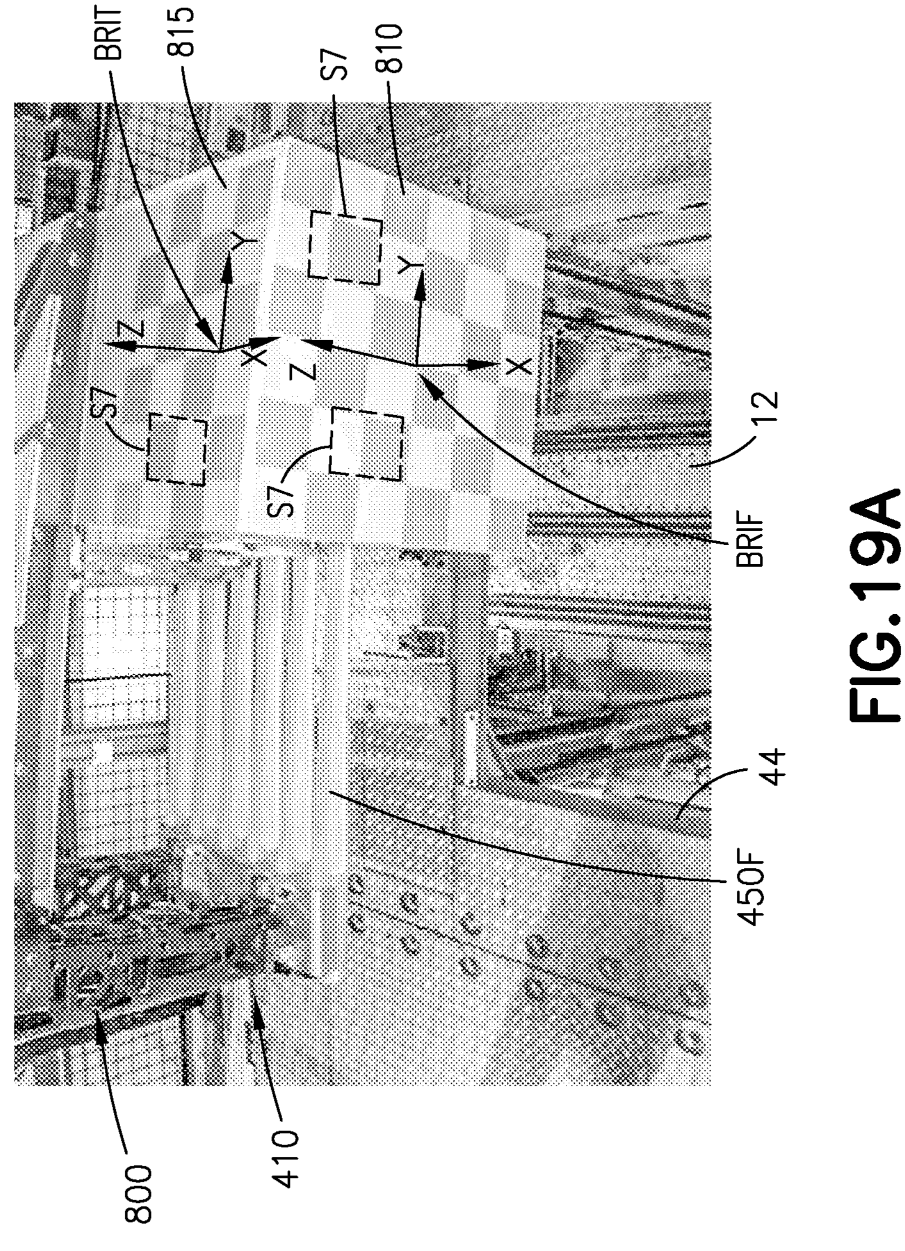
FIG. 19A is an exemplary image obtained with a vision system of the palletizer cell of FIG. 1 in accordance with aspects of the disclosed embodiment.
Figure 19B:
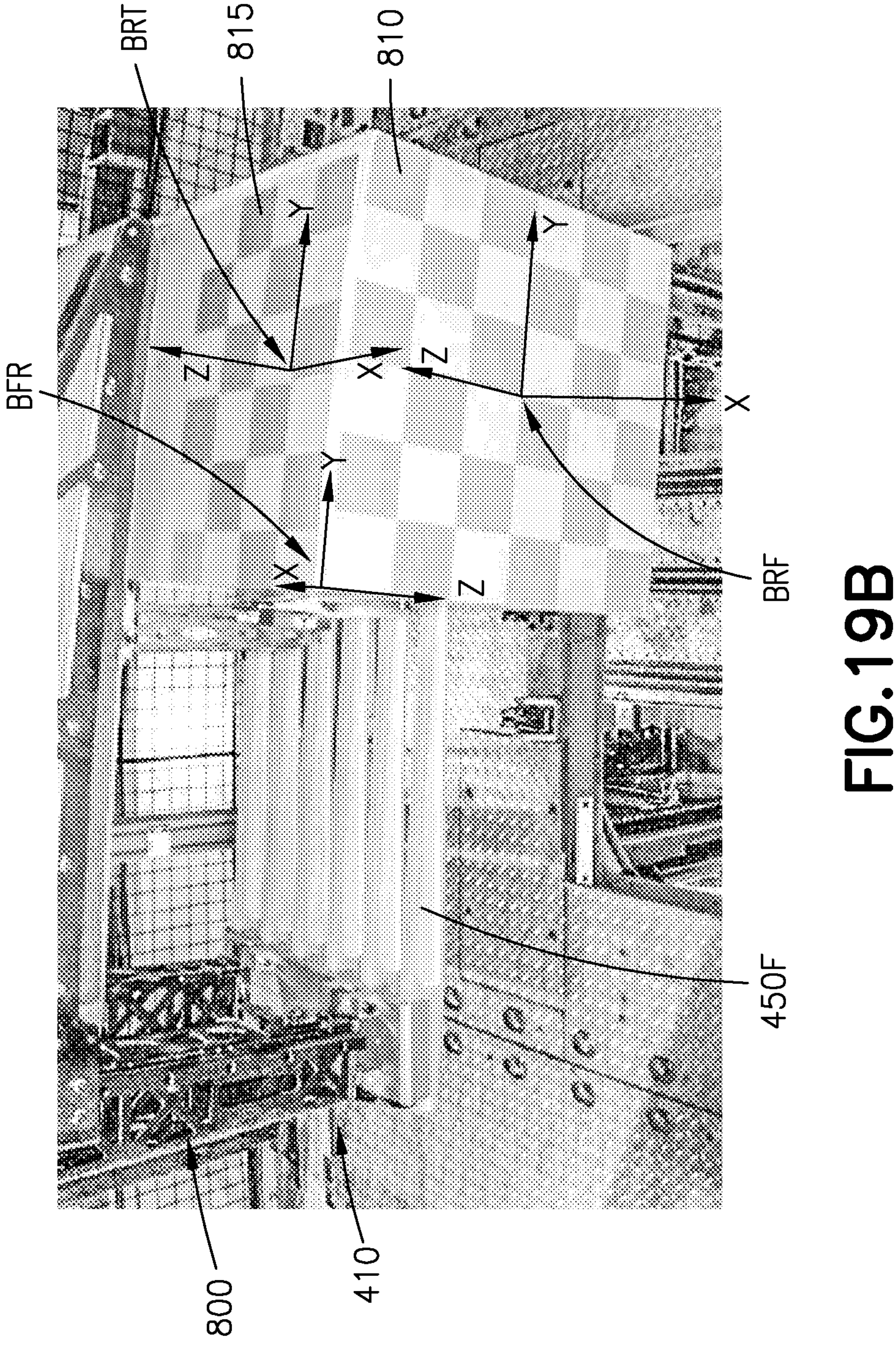
FIG. 19B is an exemplary image obtained with a vision system of the palletizer cell of FIG. 1 in accordance with aspects of the disclosed embodiment.
Figure 20:
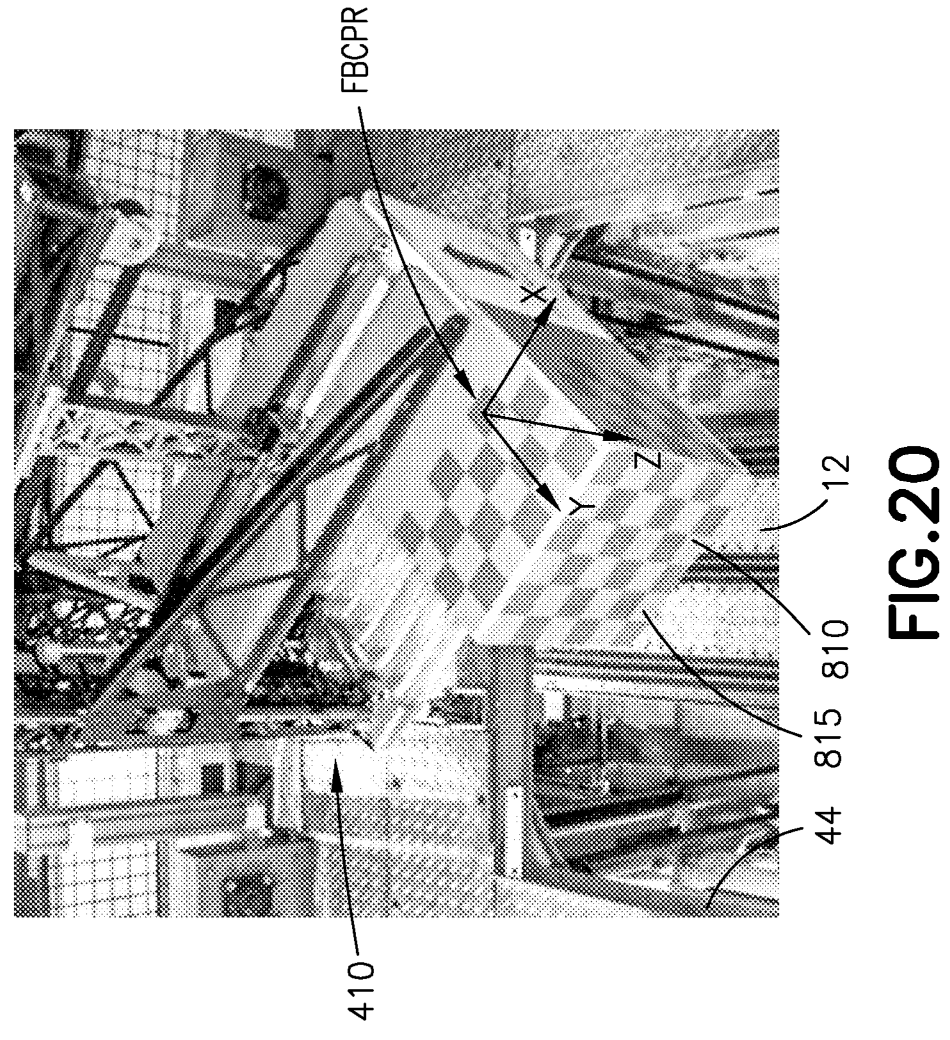
FIG. 20 is an exemplary image obtained with a vision system of the palletizer cell of FIG. 1 in accordance with aspects of the disclosed embodiment.

One box referential is defined on the front and top face of the calibration box 810 and is employed to create sampling boxes (similar to those described herein with respect to FIG. 18B) on the faces of the calibration box 810, which are employed to refine the corner locations of the calibration box 810 as described herein. Referring to FIGS. 8, 9, 19B, and 19B, the box referentials BRI, BRF, BRT defined on the faces of the calibration box 810 uses a direction of interest, based on the direction of the Y axis of the robot flange 14F, to define the X axis of the box referentials BRI, BRF, BRT. The Z axis of the box referentials BRI, BRF, BRT extends in the same direction as the Z axis of the fork origin referential TFRP (see FIGS. 18A and 18B) (noting that the convention of directions described here and throughout the description is used for convenience, and in other aspects any suitable directions may be used). The (initial) box referential BRIF, BRIT (FIG. 19A) is determined from a location of a respective plane 900, 901 of the front and top face as determined by the point cloud data (See FIG. 9). The controller 10C is configured to refine the initial box referentials BRIF, BRIT with any suitable corner detection algorithm where, sampling boxes S7 are employed (as described herein with respect to FIG. 18B, where the sampling box locations are determined in areas of a face that have a consistent normal orientation) to position/fit the plane 900, 901 on the respective calibration box 810 surfaces to define the refined box referentials BRF, BRT (see FIG. 19B). It is noted that the origin of the box referentials BRF, BRT may not be updated from the initial box referentials BRIF, BRIT, and the origin may not be at the center of the box face of interest. Here, it is the rotation of the referential axes X, Y, Z that is fixed in a precise manner (e.g., so as to define a calibration accuracy that is less than the accuracy of the robot (e.g., the robot having an accuracy of between about 1 mm or about 2 mm) as described herein).

With the refined box face referentials BRF, BRT defined, the box face referential BFR (see FIG. 19B) is determined where the front face normal defines the Z axis of the box face referential BFR, the intersection between the top and front planes defines the Y axis of the box face referential BFR, and the cross product of the Y and Z axes defines the X axis. The X and Z origin of the box face referential BFR is located on the intersection line between the front and top planes and the Y origin is aligned with the side of the top or front plane (the one for which the camera has the best point of view for the face).

Figure 22:
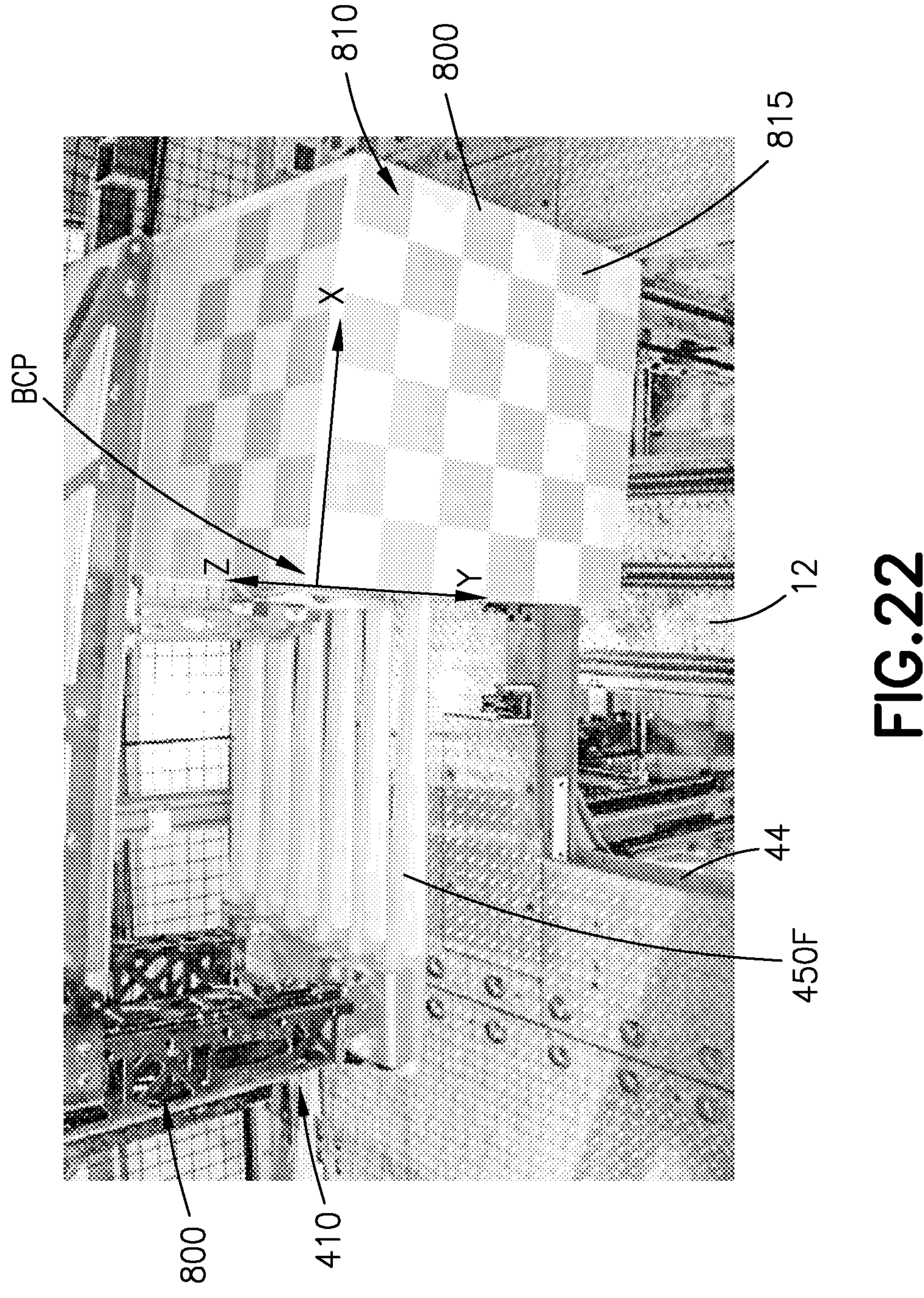
FIG. 22 is an exemplary image obtained with a vision system of the palletizer cell of FIG. 1 in accordance with aspects of the disclosed embodiment.

With the box face referential BFR defined for each of the three-dimensional cameras 310C1-310C4, the box face referential BFR2D is determined for the electromagnetic sensor 500 (e.g., two-dimensional camera 500C). It is noted that the box face referential BFR2D may be computed prior to the box face referential BFR. With reference to FIG. 22, edges of the calibration box 810 are extracted in the two-dimensional image by the controller 10C with any suitable edge detection algorithm. For example, the edges are split by the controller 10C on sharp curvature points and on polarity change so that each split edge segment represents a single side of a square on the grid pattern 800. For each edge segment extremity (e.g., one side of a square in the grid pattern 800), the controller 10C is configured to find 3 other local edge extremities in a local area to form a quartet (i.e., one square of the grid pattern 800). For the controller 10C to determine existence of a quartet, the four edge extremities are to have two pair of parallel facing segments within a predetermined tolerance, the two pair of parallel segments intersect perpendicularly within a predetermined tolerance, each pair of facing segments have a reverse polarity, and the color/hue of the square surrounding the edge segments must be close to, for example, green and close to, for example, yellow in opposite diagonal directions (noting that yellow and green are the exemplary colors for the grid pattern described herein).

In one or more aspects, the point cloud(s) of one or more of the three-dimensional cameras 310Ca1-310C4 are employed to minimize affects of variable image intensity, non-uniform lighting, shadows, complex scenery, perspective projection and distortion (and other variations) on the segmentation of the two-dimensional images obtained by the electromagnetic sensor 500 (e.g., two-dimensional camera 500C). Here, an image of the calibration box 810 is positioned in front of and close to the electromagnetic sensor 500 (e.g., two-dimensional camera 500C) so that there is no perspective of the calibration box 810 in the two-dimensional image of the calibration box taken by the electromagnetic sensor 500 (e.g., two-dimensional camera 500C). The box referentials BFR, BFR2D are determined in the manners described herein. An approximate transform between the three-dimensional camera 310Ca1-310C4 and the electromagnetic sensor 500 (e.g., two-dimensional camera 500C) is found by the cross product of the referentials BFR, BFR2D (e.g., camera3D_to_Camera2D transform=BFR×BFR2D) (it is noted that the aforementioned transform is provided for exemplary purposes only and there are ways in which the three-dimensional to two-dimensional transform may be determined). The face of the calibration box 810 is found in the point cloud for each of the images taken by the three-dimensional cameras 310C1-310C4 and is then mapped in the two-dimensional image for a given calibration box position and pose (such as those described herein) using the approximate transform and the intrinsic parameters of the electromagnetic sensor 500 (e.g., two-dimensional camera 500C) to project the face of the calibration box 810 in the two-dimensional image plane. This projection of the face from the point cloud to the two-dimensional image plane creates a two-dimensional image mask that is employed to identify the location of the box face in the two-dimensional image (substantially removing all the rest of the image complexity found in the two-dimensional image—e.g., with reference to FIGS. 10 and 12 the portions of the two-dimensional image outside the mask boundary is masked for the segmentation of the two-dimensional image). Accordingly, the electromagnetic sensor 500 and the three-dimensional camera 310C1-310C4 calibrations are effected substantially coincident or simultaneous with each other. Robot 14 location and teaching is also effected automatically substantially coincident with calibration of the electromagnetic sensor 500 and there-dimensional cameras 410C1-410C4.

With respect to the box face referential BFR2D, the intersections (described above) are ordered by the controller 10C from, for example, top to bottom and left to right (or in any other suitable order). The ordered intersections are associated to their corresponding coordinate in the world calibration grid (the origin of the world calibration grid being the box face referential BFR of the three-dimensional point clouds for the respective cameras 310C1-310C4). The pose defined for the box front face is such that the X axis extends from the top left corner to the top right corner of the front face, the Y axis extends from the top left corner to the bottom left corner of the front face, and the Z axis is the cross product of the X and Y axes. The box face referential BFR2D is defined in the same manner for each robot 14. The pose of the two-dimensional camera 500C relative to the box face referential BFR2D is determined by the controller 10C with, for example, a homography fit between the intersections found in the two-dimensional image(s) and their corresponding world coordinates. The homography fit is performed by the controller 10C in a manner substantially similar to that described in Z. Zhang, *A flexible new technique for camera calibration*, IEEE Transactions on Pattern Analysis and Machine Intelligence, 22(11):1330-1334, 2000, the disclosure of which is incorporated herein by reference in its entirety.

With the calibration box 810 detected in all of the two-dimensional images obtained with the electromagnetic sensor (e.g., two-dimensional camera 500C), the robot base 14B referential RBR to electromagnetic sensor and the calibration box 810 to flange 14F pose are optimized. Here, referring also to FIG. 20, a flange to box center pose referential FBCPR is defined at the center of the calibration box 810 in the flange referential RFR. The rotation axis is in the same general disposition as the flange axis Fθ (see FIG. 3D) but is optimized independently. To define the flange to box center pose referential FBCPR the pose of the calibration box 810 is defined nominally, then refined during optimization. As described herein, the calibration box 810 is invariant with respect to the robot 14 holding the calibration box 810, with the Y axis always pointing towards the front face of the calibration box 810, the Z axis pointing downwards, and the X axis pointing towards the right face (as viewed in the two-dimensional image) of the calibration box 810. The X, Y, Z axes are in line with the edges of the calibration box 810 and, as such, are not in the same orientation as the flange referential RFR that the flange to box center pose referential FBCPR is defined in.

Figure 21A:
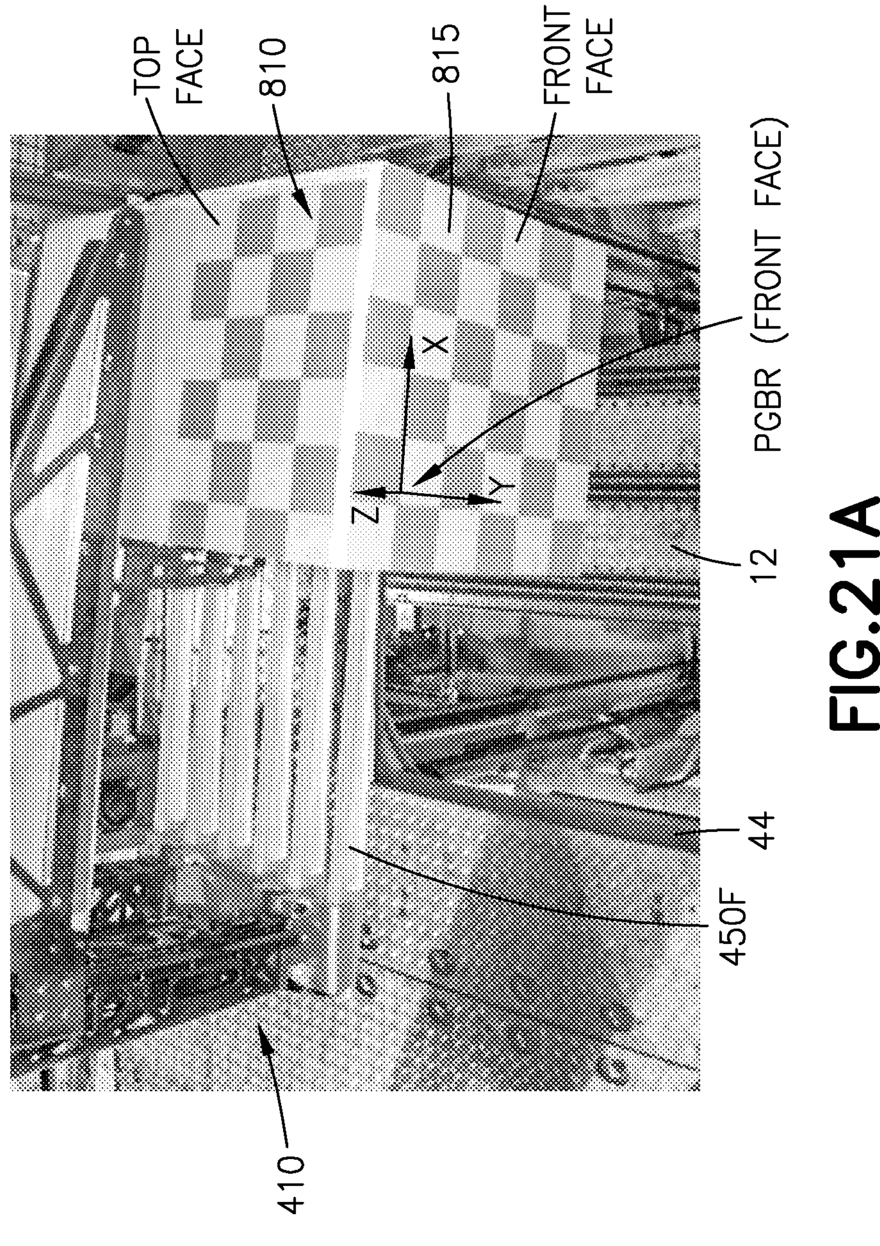
FIG. 21A is an exemplary image obtained with a vision system of the palletizer cell of FIG. 1 in accordance with aspects of the disclosed embodiment.
Figure 21B:
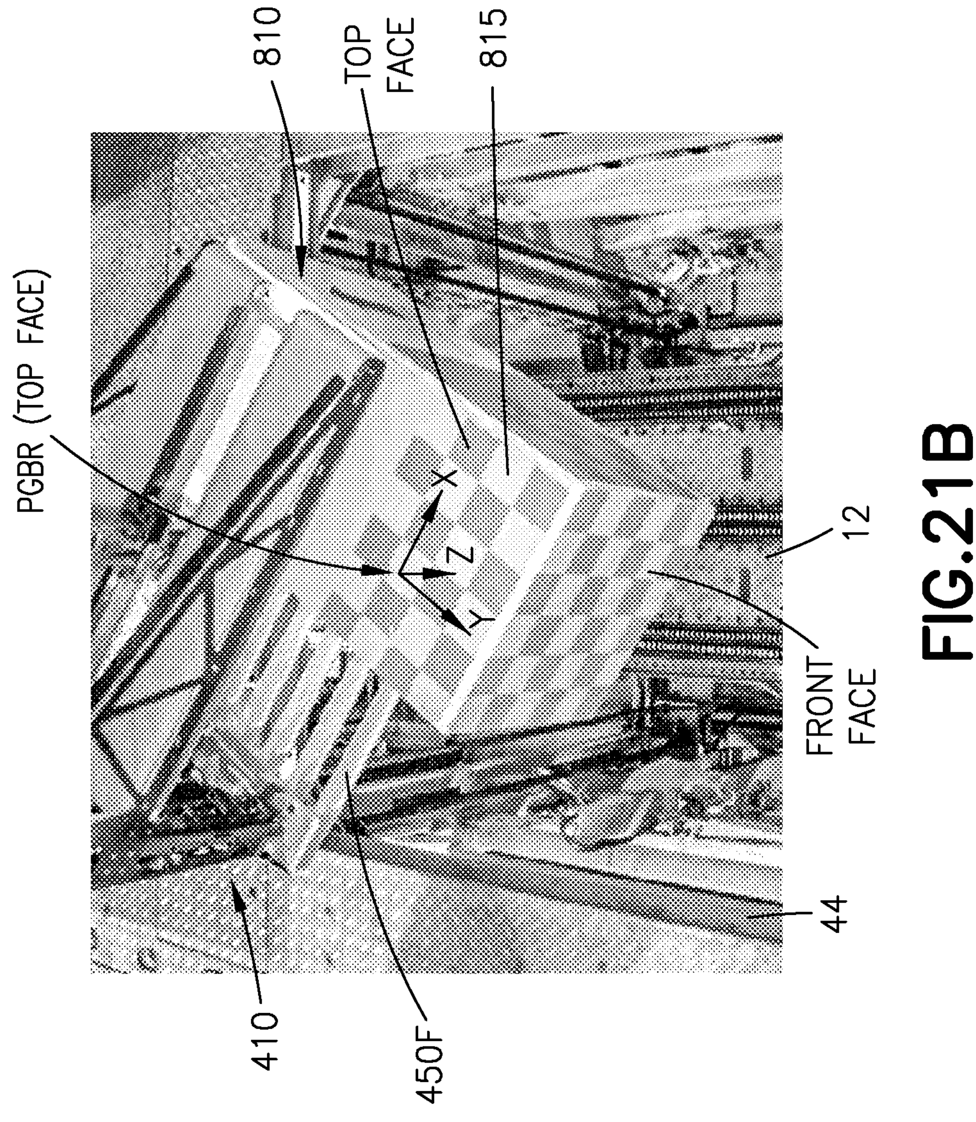
FIG. 21B is an exemplary image obtained with a vision system of the palletizer cell of FIG. 1 in accordance with aspects of the disclosed embodiment.

Referring to FIGS. 21A and 21B, a relationship (e.g., pose grid to box referential PGBR) between a pose of the grid 815 to the flange to box center pose referential FBCPR is established for at least the top and front faces of the calibration box 810. In some aspects, the relationship may also be established for the side faces of calibration box 810. Referring to FIG. 21A, as an example, for the front face the pose grid to box referential PGBR (front face) is defined at the first top left (as seen in the two-dimensional image) intersection of the grid 815 (see FIG. 21A), where the X axis points towards the right face of the calibration box 810, the Y axis points downwards, and the Z axis points into the calibration box 810 as shown in FIG. 21A. Referring to FIG. 21B, for the top face the pose grid to box referential PGBR (top face) is defined at the intersection of the top grid 815 closest to the box center and the left face of the calibration box 810. The rotation of the axes of the pose grid to box referential PGBR (top face) is the same as the flange to box center pose referential FBCPR where the Z axis points downwards, the X axis points towards the right face of the calibration box 810, and the Y axis points towards the front face.

Referring to FIG. 22, in the fully automatic calibration of the robot(s) 14, a box to two-dimensional camera pose or referential BCP is also defined. The box to two-dimensional camera referential BCP is defined so that the X axis extends from the top left corner to the top right corner of the calibration box (as seen in the two-dimensional images), the Y axis extends from the top left corner to the bottom left corner of the calibration box 810, and the Z axis points as the cross product between the X and Y axes. The box to two-dimensional camera pose or referential BCP is defined in the same manner for each robot 14 gripping the calibration box 810.

As may be realized, the fully automatic robot calibration (i.e., localization and teaching) is performed (substantially coincident with calibration of the electromagnetic sensor 500 and three-dimensional cameras 310C1-310C4) so that the controller 10C (and the robot 14 which it controls) "know" or are precisely taught the features of the palletizer cell 10. Here, the resolution of the two-dimensional camera 500C is greater than that of the three-dimensional cameras 310C1-310C4 and it is desired to know the positions of the physical items in the two-dimensional s in the three-dimensional world and the transform images therebetween. With the above-noted referentials determined the controller 10C (or as noted above, any suitable controller such as controller 199C) is configured to refine one or more of the above-described referentials. As an example, the referential optimization algorithm of the controller 10C utilizes, for example, the Levenberg-Marquadt algorithm (or any other suitable optimization algorithm) to create an optimized solution. In the optimization process, the position of the robot 14 is optimized (i.e., localized) in the electromagnetic sensor 500 world and coincidentally in the palletizer cell space with respect to each palletizer cell station using gathered information (from the above referential determinations) including but not limited to, for example, box face on which the grid 815 is located, grid intersections in pixels, grid intersections in grid world, and the position of the robot flange in the base referential RBR.

The location of the Z axis of the robot base origin may also be optimized. Where, for example, the robot 14 is a four degree of freedom (e.g., 4-axis—X, Y, Z, μ—see FIG. 3D) robot the calibration box 810 cannot be rotated about the X (e.g., roll) and Y (e.g., pitch) axes such that the origin of the Z axis of the robot base is not locked in a particular position. The robot base 14B is not within the fields of view of the cameras 310C1-310C4, 500C, but the flange 14F is within the fields of view and can be detected thereby. Here, the flange 14F is detected by the cameras 310C1-310C4 and/or electromagnetic sensor 500, and the height of the flange 14F at the flange referential RFR (as determined by the controller 10C from the images obtained by the cameras 310C1-310C4 and/or electromagnetic sensor 500) is compared with a nominal CAD value to fix the origin of the robot base Z axis. As described herein, in some aspects the flange 14F may form a part of the calibration fixture/jig (also referred to herein as the target object).

The above description with respect to FIG. 14, Block 1431 automatically calibrates the robot 14 and synchronizes the robot 14 axes with the cameras 310C1-310C4 and is repeated for each robot 14 of the palletizer cell 10.

Still referring to FIG. 14 and also to FIG. 3D, as described herein, each robot 14 includes a distance sensor 411. The distance sensor 411 is calibrated (FIG. 14, Block 1432) so that the distance sensor 411 may be employed to scan and calibrate a pick position of the conveyor 16. Here, as described herein, the fork referential TFRP is common to the robots 14 and the three-dimensional cameras 310C1-310C4. The controller 10C registers and calibrates (e.g., employing images of the conveying mechanism 20 obtained by one or more of the three-dimensional cameras 310C1-310C4) the fork referential TFRP to the palletizer cell space, the three-dimensional camera 310Ca-310C4 space, and the electromagnetic sensor 500 space. The controller 10C teaches the robots 14 the referential TFRP location and the location of the pallet support SPAL (see FIG. 14, Block 1436). The pose and location of the distance sensor 411 is registered and calibrated via a calibration movement of the respective robot 14 that moves the distance sensor 411 to a pick location. For example, the end of arm tool 410 is moved to a position so that light 411L emitted from the distance sensor 411 is projected on a flat surface (e.g., as a "spot" of light), such as the top surface of the calibration box 810 with the calibration box 810 seated on one or more of the transfer forks 20F1, 20F2 (see also FIG. 5B) or the top surface of the transfer forks 20F1, 20F2 (providing the definition of the feature surface plane is predetermined or may be determined, such as by homography via the electromagnetic sensor 500, for accurate positioning of the spot of light projected by an emitter of the distance sensor 411 on the calibration box 810 or forks 20F1, 20F2 commensurate with robot flange 14F positioning accuracy afforded by the drive section encoders). As may be realized, the calibration box 810 (or forks 20F1, 20F2) offers/defines a flat surface plane PLN (on which the light 411L is projected) that may be determined via homography with the electromagnetic sensor 500. The location of the flat plane PLN is determined and the distance (e.g., AZ) from the plane PLN to the flange referential RFR (or from the plane PLN to the fork referential TFR) is determined. The distance AZ of the plane PLN to the flange referential RFR (or fork referential TFR) as determined from the distance sensor 411 is compared with the determined (e.g., via homography) distance between the plane PLN and the flange referential RFR (or fork referential TFR) for rectifying the distance sensor 411 with respect to the robot flange referential RFR/robot flange 14F (or fork referential TFR). With the light 411L projected on the calibration box 810, the end of arm tool 410 is rotated about the flange axis Fθ and the end of arm tool 410 is moved to different heights relative to the transfer forks 20F1, 20F2. The two-dimensional camera 500C images the light 411L projection on the calibration box 810 to find (e.g., based on varying position of the light 411L projection on the calibration box 810) the location of the distance sensor 411 on the end of arm tool 410 relative to the flange 14F and relate the distance measured by the distance sensor 411 with a height of the flange 14F so as to calibrate the distance sensor 411 relative to the flange 14F (and the tool referential RTR). This distance sensor 411 calibration is performed for each robot 14 of the palletizer cell 10. The rectified (to, e.g., the flange referential RFR) distance sensor 411 may then be employed to scan the forks 20F1, 20F2 to calibrate the distance of the forks 20F1, 20F2 seating surface(s) to the flange referential RFR to refine the fork 20F1, 20F2 (Z axis) pose with respect to the robot(s) 14. Multiple scans of the forks 20F1, 20F2 with the distance sensor 411 at different heights and different orientations (e.g., rotation of the end of arm tool±90°) may be employed to resolve bias in the robot 14 pose.

Figure 6:
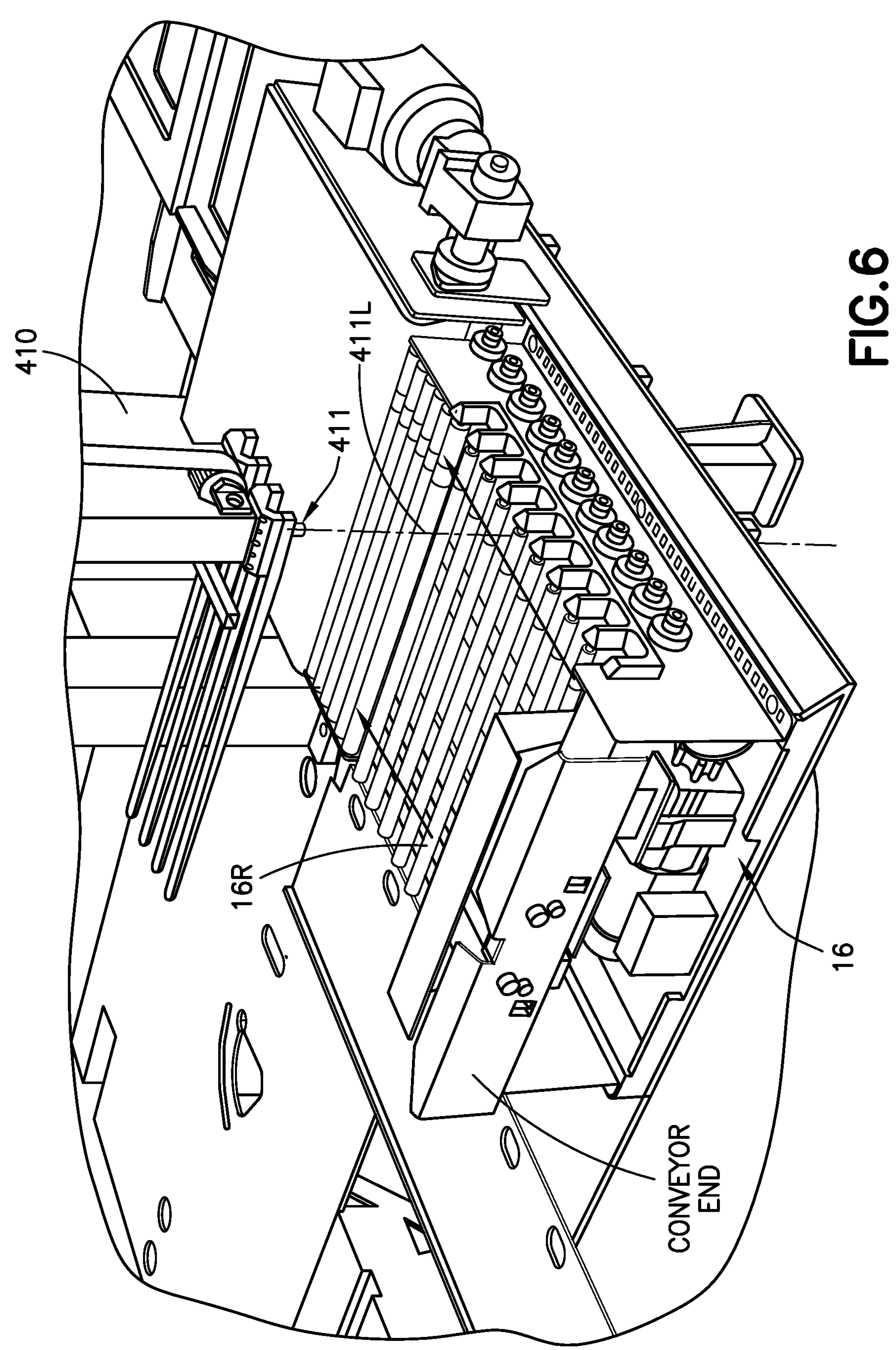
FIG. 6 is a schematic perspective illustration of a portion of the palletizer cell of FIG. 1 in accordance with aspects of the disclosed embodiment.
Figure 25:
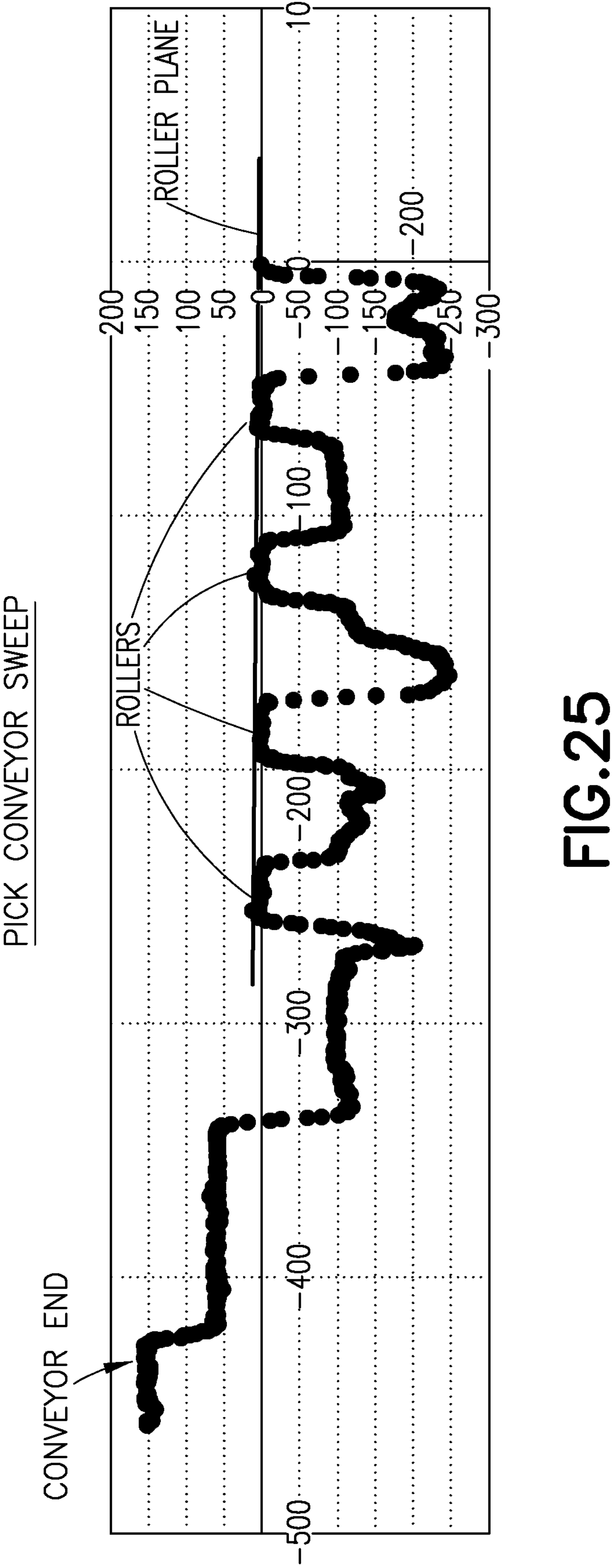
FIG. 25 is exemplary sensor data obtained with the palletizer cell of FIG. 1 in accordance with aspects of the disclosed embodiment.

Referring also to FIGS. 6 and 25, the distance sensor 411 is employed to scan the respective pick conveyor 16 and calibrate a pick position of the pick conveyor 16 (FIG. 14, Block 1433). The controller 10C commands movement of the robot 14 to place the end of arm tool 410 above the pick conveyor 16 so that the distance sensor 411 scans, for example, the rollers 16R of the pick conveyor 16 along a longitudinal axis of the pick conveyor 16. Here, the distance sensor 411 determines the location of the rollers 16R (see FIG. 25). The squareness of the conveyor 16 may also be determined by scanning the rollers 16R at two or more locations along the length of the rollers 16R (such as scanning (as indicated by the arrow in FIG. 6) the ends of the rollers 16R adjacent the lateral sides of the conveyor 16). The multiple scans of the rollers 16R may be compared and related to the robot base 14B so as to determine the angle of the rollers 16R, and hence the conveyor 16, relative to the robot base referential RBR. The multiple scans of the rollers 16R may be performed with the distance sensor 411 at different heights and different orientations (e.g., rotation of the end of arm tool±90°) to resolve bias in the robot 14 pose.

With the locations (and angle) of the rollers 16R known, the calibration box 810 is placed on the conveyor 16 and the robot 14 is commanded to move the end of arm tool 410 so that the distance sensor 411 scans the top surface of the calibration box. The data from the distance sensor 411 obtained from scanning the top surface of the calibration box 810 on the conveyor is communicated to the vision system 310 so that a plane is fit to the distance sensor data. Knowing the dimensions of the calibration box 810, the location of the determined plane is used to determine the plane of the rollers 16R (and to verify the plane of rollers as may be determined from the scanning of the rollers with the distance sensor 411—see FIG. 25). With the plane of the conveyor 16 known, and the position of the rollers, the controller 10C determines the pick locations of the conveyor 16. The calibration of the conveyor 16 pick locations is performed for each robot 14 of the palletizer cell 10.

In the above-described calibration, the robots 14 are localized to the palletizer cell space or reference frame (see FIG. 3A and FIG. 14, Block 1438). Here, for each robot 14, the controller 10C maps the paths of the robot 14 to the bounds of the palletizer cell space (as determined from the known design configuration of the palletizer cell). The controller 10C calibrates the robot 14 coordinates based on the pose of the palletizer cell stations and the teaching of the palletizer cell space to the robot 14 as described herein.

Figure 5A:
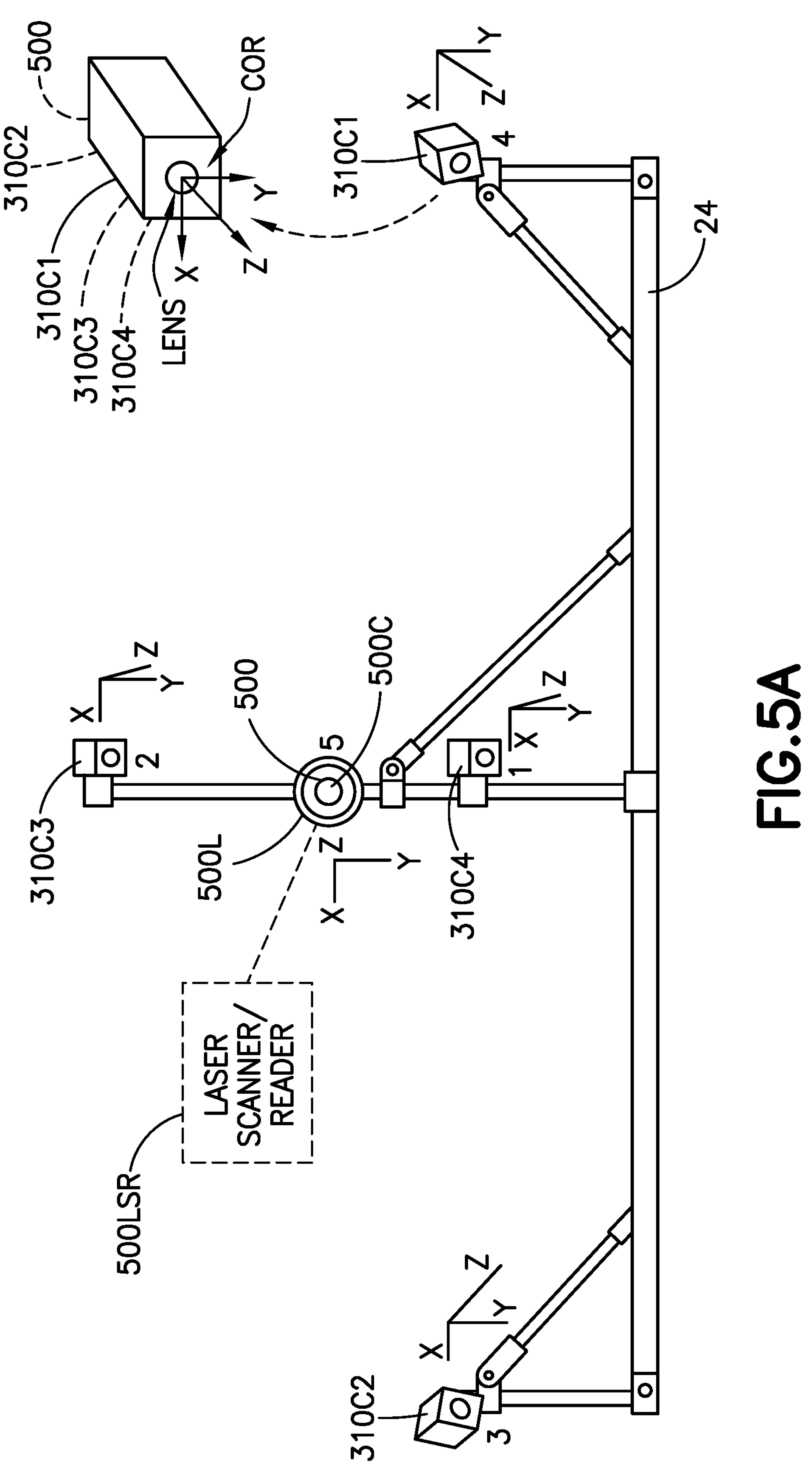
FIG. 5A is a schematic illustration of a portion of the palletizer cell of FIG. 1 in accordance with aspects of the disclosed embodiment.
Figure 5B:
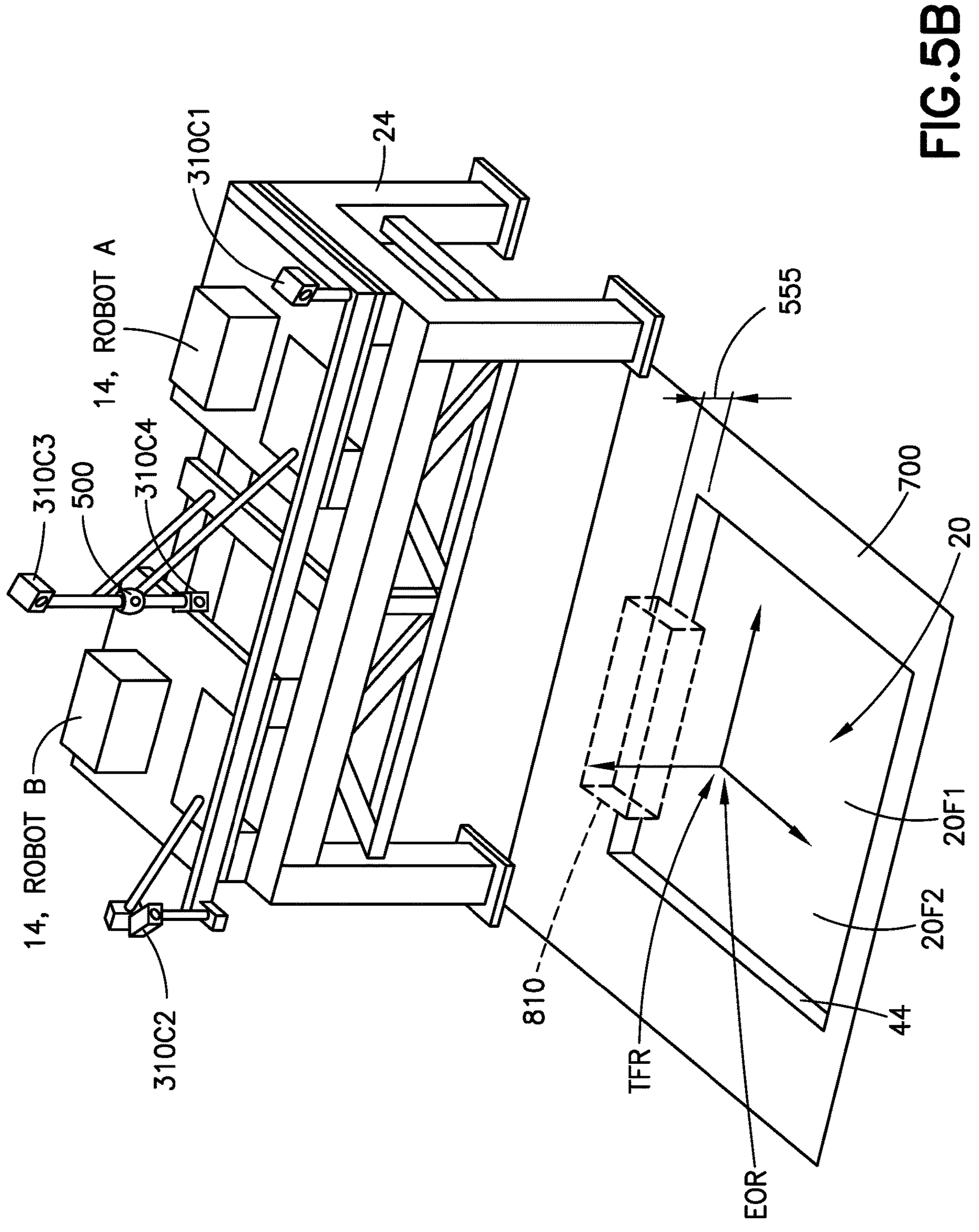
FIG. 5B is a schematic perspective illustration of a portion of the palletizer cell of FIG. 1 and vision system point cloud in accordance with aspects of the disclosed embodiment.
Figure 7:
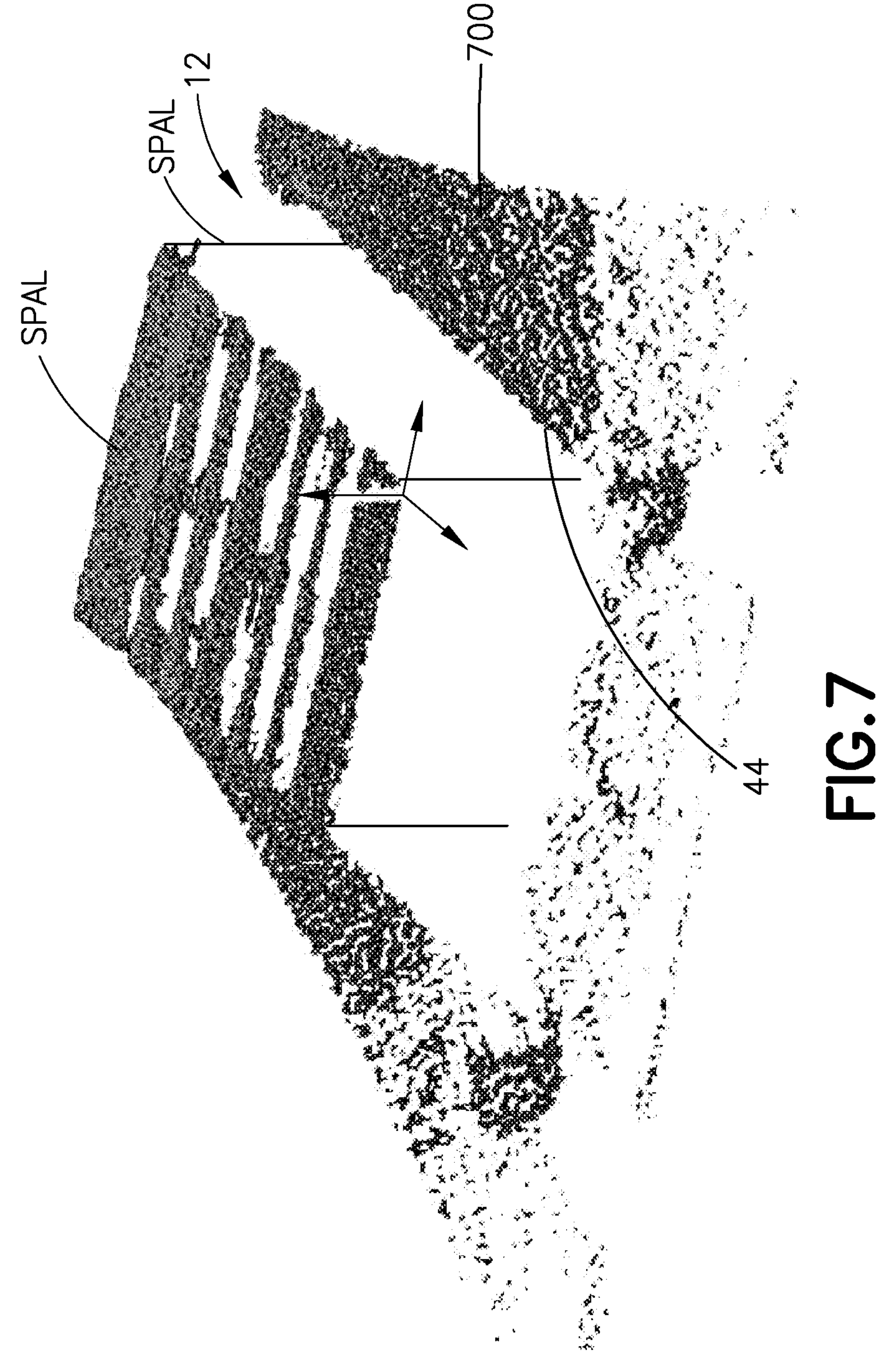
FIG. 7 is an exemplary point cloud obtained with a vision system of the palletizer of FIG. 1 in accordance with aspects of the disclosed embodiment.

Still referring to FIG. 14 and also to FIGS. 2, 5B, and 7, in the fully automatic calibration of the palletizer cell 10, a pallet referential may be determined so that the location of pallet supports SPAL on the transfer forks 20F1, 20F2 of the empty pallet conveying mechanism 20 and elevator 12 are known. Here, pallet supports SPAL are circulated through the palletizer cell 10 to the elevator 12 by forks 20F1, 20F2 of the empty pallet conveying mechanism 20. As an example, 3 to 5 pallets are circulated however in other aspects fewer than 3 or more than 5 may be circulated. The pallet supports SPAL are imaged by the vision system 310 with each pallet support SPAL located on the forks 20F1, 20F2 and with the pallet supports SPAL located on the elevator 12. The vision system 310 determines from the images (e.g., three-dimensional and/or two-dimensional images) of the pallet supports SPAL a zero position of the lift 12 and offsets of the pallet supports SPAL to effect placement of case units CU on the pallet supports SPAL for building pallet loads PAL.

A distance 555 between the transfer forks 20F1, 20F2 and floor (see also FIG. 3A) of the palletizer cell 10 may also be determined from the images of the transfer forks 20F1, 20F2 and the floor 700 obtained the vision system 310. For example, a plane may be fit to the point cloud data points corresponding to the floor 700 and to the forks 20F1, 20F2 (as described herein) and the distance 555 may be determined from the two planes.

Referring to FIG. 14, Block 1450, and also to FIGS. 23A-24C, the fingers 450F of the end of arm tool 410 are imaged to, for example, optimize the tool center point or tool referential RTR and account for finger 450F flex under load of the tool such as may result from gripping of a calibration load/jig CLD (see FIG. 8—e.g., in one aspect defined during calibration of the vision system by the calibration box 810) and to validate the tool referential RTR under a no load condition (i.e., an empty end of arm tool 410, a gripped box in a fully retracted position on the fingers (See FIG. 23A), or an ungripped box held by the end of arm tool 410). FIG. 14, Block 1450 may be included in the calibration of the robot 14 (e.g., FIG. 14, Block 1430) and/or may be performed before the circulation of pallets (e.g., FIG. 14, Block 1440). To optimize the tool referential RTR a set/series of images that dispose the calibration load CLD in a series of positions that best describe, within the electromagnetic sensor field of view, the flex caused by the end of arm tool 410 grip of the calibration jig CLD, and enabling optimization of the tool referential RTR in the non-load condition. Here, the series of images are obtained by the electromagnetic sensor 500 (e.g., two-dimensional images obtained by two-dimensional camera 500C) and include, but not limited to, a sideways (side view) image of a retracted calibration box 810 (see FIG. 23A), a sideways (side view) image of a pushed calibration box 810 (see FIG. 23B where the calibration box 810 is pushed by pusher assembly 28 of the end of arm tool 410 to the tips of the fingers 450F), and a front facing image of the fingers 450F, such that only the top of the fingers 450F is visible in the image, where the directional indicators (e.g., side view, front facing, etc.) of the aforementioned images are relative to the field of view of the electromagnetic sensor 500.

Figure 23A:
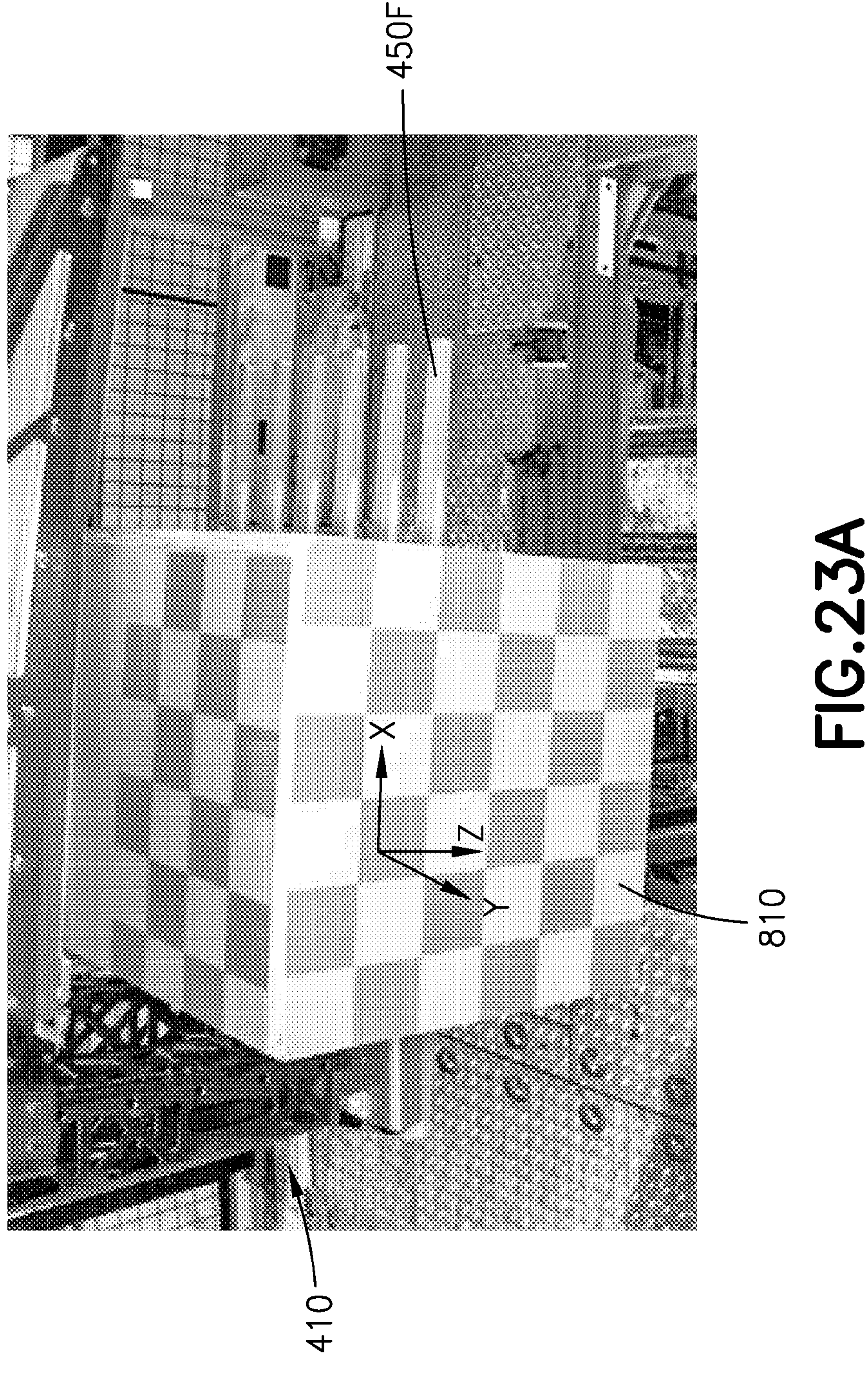
FIG. 23A is an exemplary image obtained with a vision system of the palletizer cell of FIG. 1 in accordance with aspects of the disclosed embodiment.
Figure 23B:
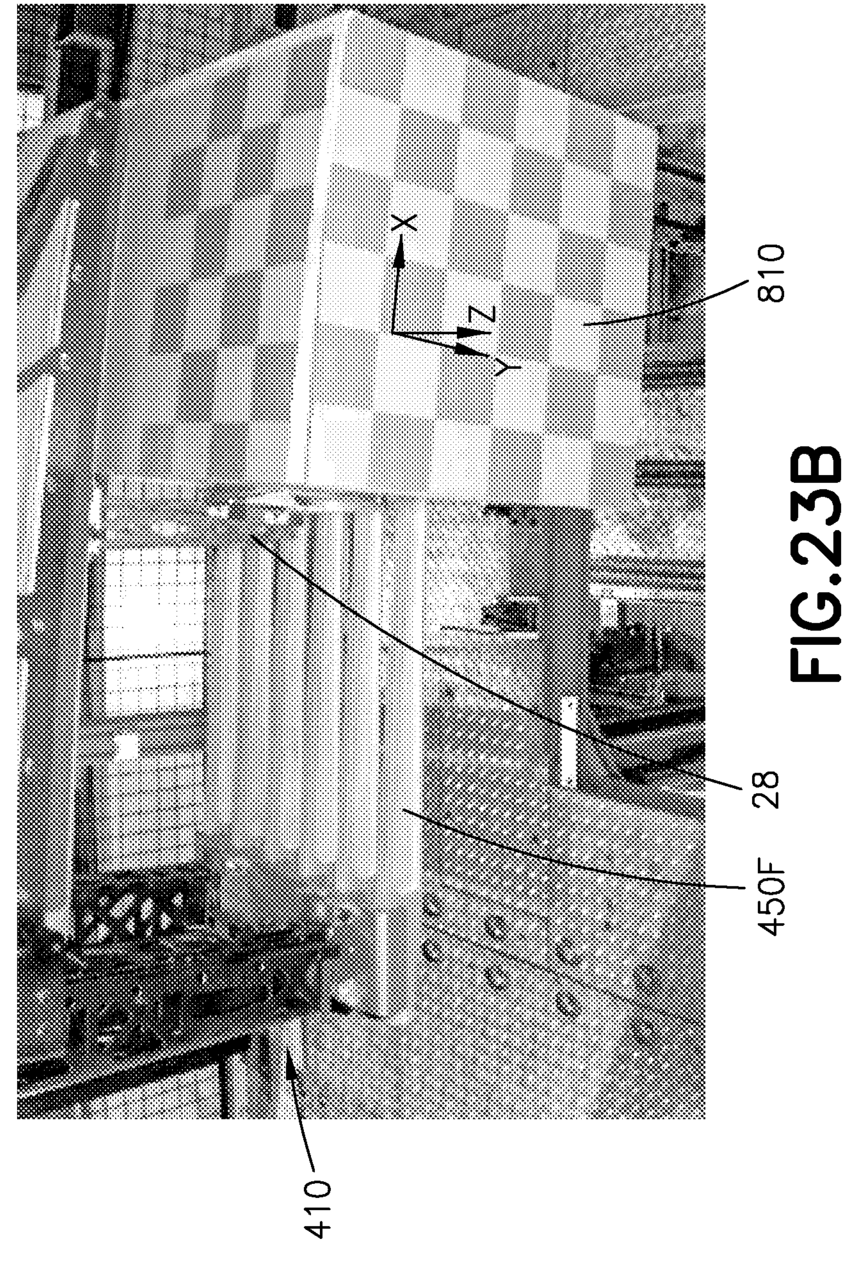
FIG. 23B is an exemplary image obtained with a vision system of the palletizer cell of FIG. 1 in accordance with aspects of the disclosed embodiment.

The flexion algorithm of the controller 10C employed to optimize the tool referential RTR computes a pose transform between a box 810 held on the seating surface of the end of arm tool 410 "unflexed" load support member(s) (here fingers 450F, see FIG. 23A) and a box 810 held on the seating surface of the end of arm tool 410 "flexed" load support members (here again fingers 450F, see FIG. 23B). As may be realized, the "unflexed" fingers may not be truly unflexed, such as where the calibration box 810 is gripped in a fully retract position (see FIG. 23A) and the fingers 450F are minimally flexed (e.g., the tips of the fingers are about 2 mm or less lower than the base of the fingers). This minimal flexion of the fingers is within the error of robot 14 positioning (e.g., positioning error between about 1 mm and about 2 mm) and may be ignored in the computation of the "unflexed" tool referential RTR. Here, the controller 10C, with the flexion algorithm, detects (with images taken by the cameras 310C1-310C4, 500C) the calibration box 810 in three-dimensions and in the imaged space of the electromagnetic c sensor 500 (e.g., two-dimensions of the two-dimensional camera 500C, in a manner substantially similar to that described herein) and assigns the calibration box 810 referentials in the three-dimensional world of the two-dimensional camera 500C in the un-flexed and flexed images, where these referentials are the finger flex box center to electromagnetic sensor referential and the finger not flexed box center to electromagnetic sensor referential respectively. The pose of the finger flex box center to electromagnetic referential and the finger not flexed box center to electromagnetic sensor referential are such that the Y axis points towards the front face of the calibration box 810, the X axis points towards the right face of the calibration box 810, and the Z axis points downwards with an origin located at the center of the calibration box 810 (see FIGS. 23A and 23B respectively). A box center flex to box center not flex pose referential is computed from the finger flex box center to electromagnetic sensor referential and the finger not flexed box center to electromagnetic sensor referential, such that a transformation pose linking the two calibration box locations is obtained.

With the finger flex box center to electromagnetic sensor referential and the finger not flexed box center to electromagnetic sensor referential assigned, the tool referential RTR is detected in another image with the calibration box 810 located as shown in FIG. 23A, however end of arm tool 410 is moved so that the fingers 450F are positioned allowing for easy (as noted herein) image segmentation and detection so that the tool referential RTR is detected in pixels of the two-dimensional image and the tool referential RTR is projected to the plane Box not flex to electromagnetic sensor where:

Box not flex to electromagnetic sensor=robot base referential RBR to electromagnetic sensor*robot flange to robot base*box center flex to robot flange*box center flex to box center not flex With the Box not flex to electromagnetic sensor pose the pixel point is projected to the plane under the finger 450F, becoming known in the three-dimensional world of the electromagnetic sensor 500 (e.g., two-dimensional camera). The pixel point is then re-projected to the top of the finger 450F, then described in terms of flange coordinates before being sent to the robot 14. The flexion algorithm may also recalculate the X axis of the tool referential RTR, to measure the squared-ness of the tool referential RTR with respect to the flange referential RFR. Pitch of the end of arm tool 410 grip to flange 14F may thus be resolved.

Figure 24A:
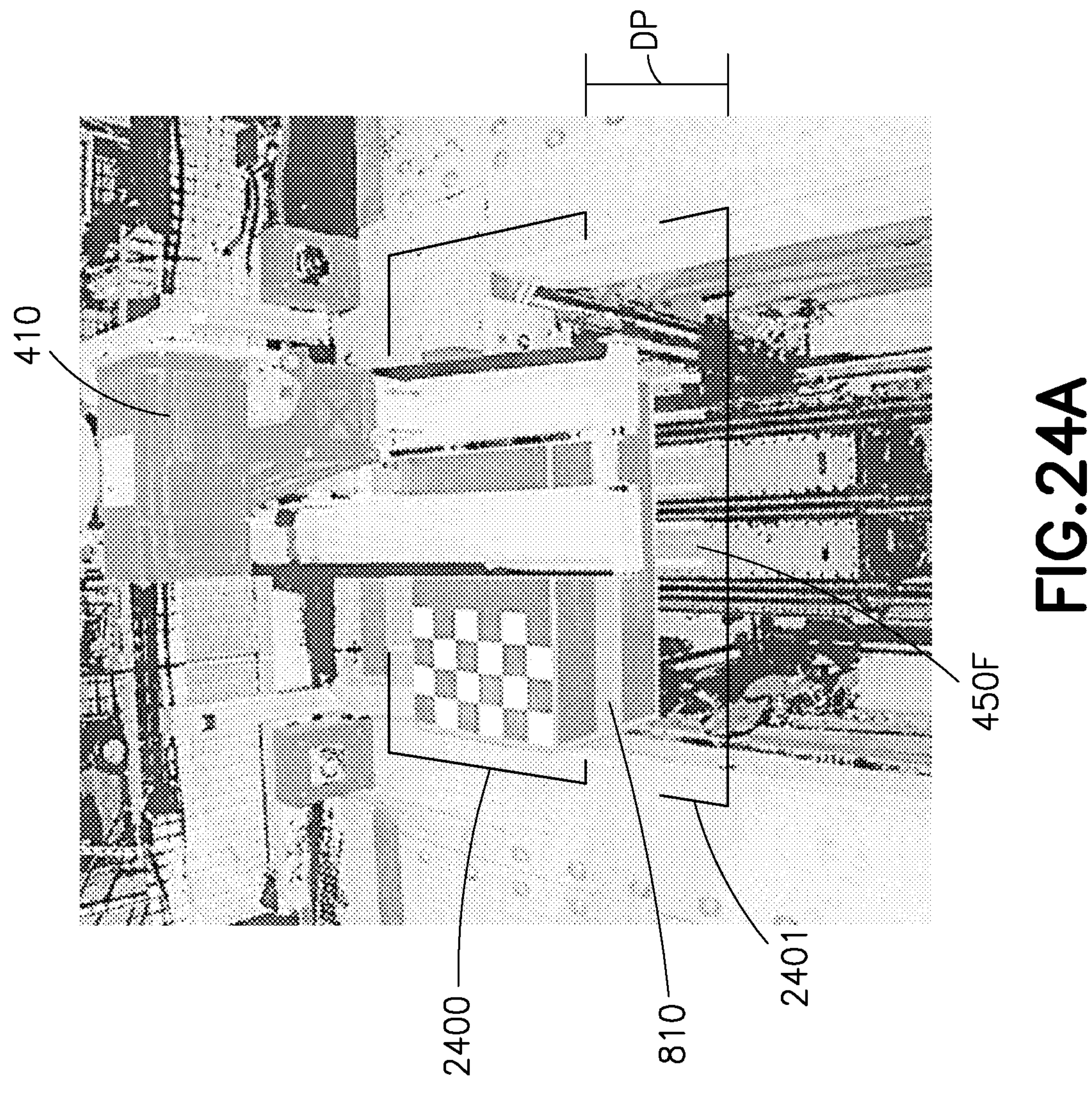
FIG. 24A is an exemplary image obtained with a vision system of the palletizer cell of FIG. 1 in accordance with aspects of the disclosed embodiment.
Figure 24C:
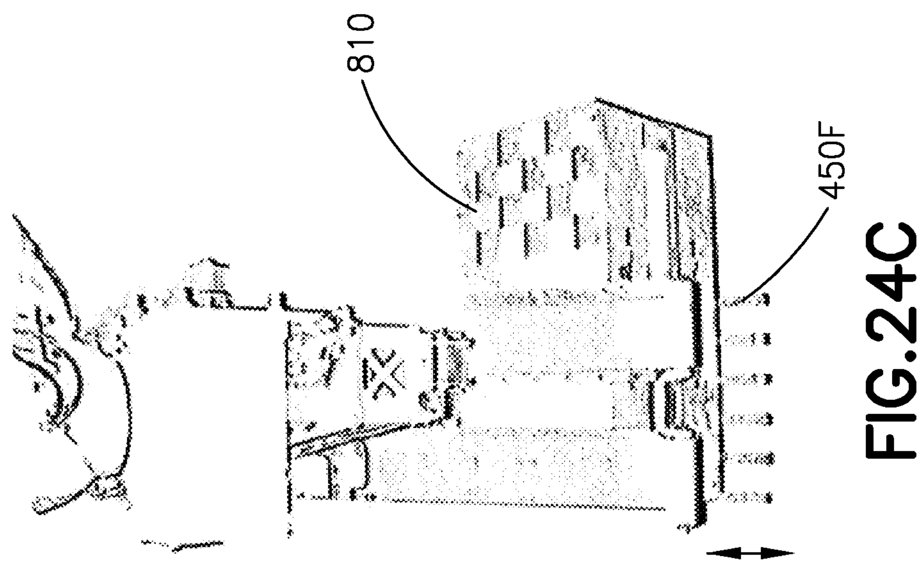
FIG. 24C is an exemplary image obtained with a vision system of the palletizer cell of FIG. 1 in accordance with aspects of the disclosed embodiment.
Figure 24B:
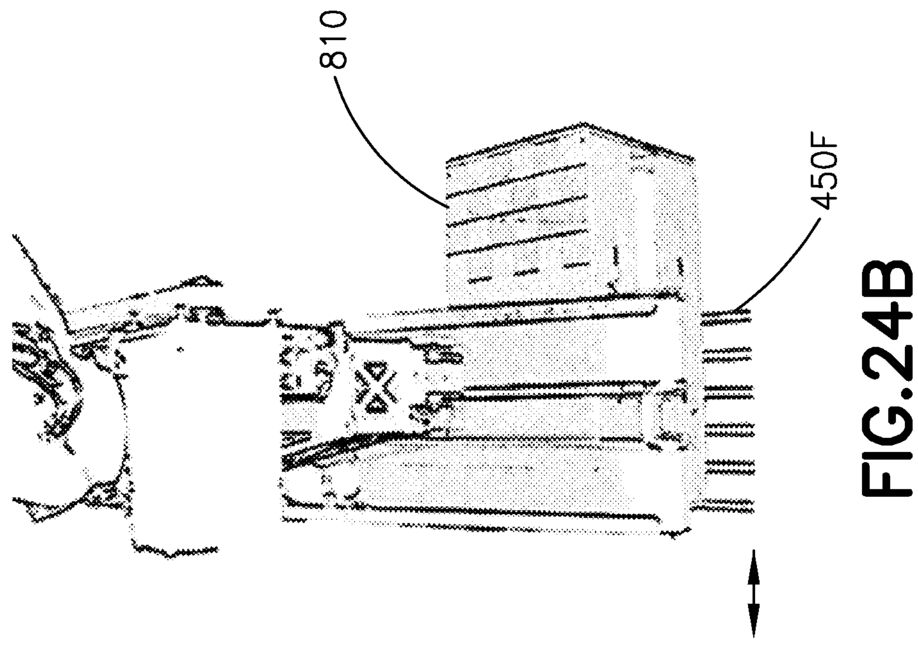
FIG. 24B is an exemplary image obtained with a vision system of the palletizer cell of FIG. 1 in accordance with aspects of the disclosed embodiment.

With reference to FIGS. 24A-24C, to calibrate the tool referential RTR a TCP calibration algorithm of the controller 10C commands movement of the robot 14 to a suitable detection position with the calibration box 810 held thereon. The detection position is at a position and distance from cameras 310C1-310C4, 500C and at a height within the workspace that represents a working height of the tool load (and hence the load support surface/members) during pallet building (see FIG. 24A). At this position the top of the calibration box 810 is detected so as to create a plane 2400 in the electromagnetic sensor 500 world. Using the created plane 2400, a parallel plane 2401 a predetermined distance DP (e.g., corresponding to the disposition of the load support surface of the end of arm tool 410 relative to the tool load, here, about 12 inches or in other aspects the distance may be more or less than about 12 inches) below the created plane, which corresponds to the load support (here, fingers 450F) plane (noting that the calibration box 810 has an exemplary height of about 12 inches). From this image (such as the image in FIG. 24A of the two-dimensional camera 500C) difference images are obtained by moving the calibration box 810 to the left/right (FIG. 24B) and/or up/down (FIG. 24C), where the difference images are employed by the controller 10C to detect the edges of the fingers 450F. In FIG. 24B the calibration box 810 (and the fingers 450F) are moved left/right a distance of about 1 mm (in other aspects the distance may be more or less than about 1 mm) to obtain difference images. In FIG. 24C the calibration box 810 (and the fingers 450F) are moved up/down a distance of about 2 mm (in other aspects the distance may be more or less than about 2 mm) to obtain difference images.

The controller 10C analyzes the difference images, with any suitable image analysis algorithm, to detect the tips of the fingers 450F as well as the finger orientation. For example, the left/right difference image is analyzed to find the finger through geometry (e.g., the fingers are the first object encountered in the image depending on the robot, with the image being analyzed from the bottom up. With the fingers identified, both edges of each finger 450F are found so that the centerlines of each finder are determined. Using the centerlines, a projection region is set up in the up/down different image, where the edge of each finger is found and projected to the centerline. With the pixels of the finger edge found, the pixels are projected to the plane 2401 to obtain the point in the three-dimensional world of the electromagnetic sensor 500 (here, e.g., two-dimensional camera 500C), where the point of reference is transformed through the chain:

TCPInFlangeRef=PoseRobotBaseToFlange*
PoseCam2DToRobotBase*TCPInCam2DRef

Once the tool referential RIR is described in the flange referential RFR the tool referential RIR is valid for the entire work area. The axes for the tool referential RTR are obtained in a similar manner. For example, the finger centerline is projected onto the plane 2401 and serves as the X axis for the end of arm tool 410. The Z axis is the normal of the plane of the fingers 2401, except pointing down and the Y axis is perpendicular to both the X and Z axes.

Referring to FIGS. 3A-3C, 5B, 7, and 17, the elevator 12 has an elevator origin referential EOR located substantially at the center of the aperture 44 of the elevator 12. The location of the elevator origin referential EOR may be defined by nominal dimensions of the palletizing cell 10 (e.g., from computer aided drafting (CAD) files) or in any other suitable manner. The elevator origin referential EOR is common to each of the robots 14 and effects (in addition to or in lieu of the telescopic fork origin referential TFRP) synchronizing or otherwise connecting the workspaces of the robots 14. The origin of the elevator origin referential EPR is located a predetermined distance from the robot base referentials RBR in the X direction and the Y origin is located substantially at the midpoint between the robot base referentials RBR. The elevator origin referential EOR is projected onto the plane of the empty pallet conveying mechanism 20 (see FIG. 17—so that the Z axis origin is at the top surface of the empty pallet conveying mechanism 20). The elevator origin referential EOR is employed for mapping the palletizer cell 10 workspace.

Referring also to FIGS. 18A and 18B, the elevator origin referential EOR is also defined in each of the three-dimensional cameras 310C1-310C4. The elevator origin referential EOR is employed by the controller 10C to segment points clouds of the respective three-dimensional cameras 310C1-310C4. Here, the elevator origin referential EOR locates the aperture 44 (and the sides 44S1-44S4/bounds thereof) of the elevator 12 in the palletizer cell 10 workspace with respect to each of the three-dimensional cameras 310C1-310C4. As noted above, the elevator origin referential EOR is defined with the with the Z axis pointing upwards from a plane defined by the top surface of the forks 20F1, 20F2 and the x axis in line with the centerline of the aperture 44 (see FIGS. 18A and 18B, the centerline of the aperture 44 may be coincident with the centerline of the forks 20F1, 20F2) pointing away from the three-dimensional cameras 310C1-310C4. The origin of the elevator origin referential EOR for each respective three-dimensional camera 310C1-310C4 is at the root point of the plane in X and Z, where the camera 310C1-310C4 projects to the plane. The Y origin is then in line with the centerline CL of the aperture 44. Exemplary images from, for example, three-dimensional camera 310C1 and 310C3 are illustrated in FIGS. 18A and 18B showing a point cloud of the aperture 44 (and its sides 44S1-44S4) detected by the respective cameras and the elevator origin referential EOR. Here, selection of a discrete common referential (such as the elevator origin referential EOR) for each of the three-dimensional cameras 310C1-310C4 may serve, in some aspects, for calibration of the three-dimensional cameras 310C1-310C4 to each other by resolving the pose of the elevator origin referential EOR and the characteristics from detection of the pose, given the predetermined location and known characteristics of the three-dimensional cameras 310C1-310C4. In such a case, the three-dimensional camera calibration is commensurate with the robot 14/end effector 410 placement accuracy.

Referring to FIGS. 3A-3D, 5A-13, 15, and 19A-26, a method for automatically building, with a pallet building apparatus (such as palletizer cell 10), a pallet load PAL of pallet load article units CU onto a pallet support SPAL is provided. In the method, the pallet building apparatus is provided (FIG. 26, Block 2600) and includes a frame 24 defining a pallet station with a pallet building base 301 for the pallet load support SPAL. The articulated robot 14 is connected to the frame 24 and has a drive section 14DS with multiple independent drive axis (e.g., of the drives 14D) arranged in a robot reference frame, and an end effector (e.g., end of arm tool 410) configured to hold the pallet load article unit CU in transport. At least one three-dimensional camera 310C1-310C4 is connected to the frame 24 separate and distinct of the articulated robot 14. A controller 10C is operably connected to the at least one articulated robot 14 and the at least one three-dimensional camera 310C1-310C4, the controller 10C being configured to control articulated robot motion, relative to the pallet building base 301, and effect therewith the pallet load build of the pallet load PAL. The palletizer cell 10 also includes an automatic calibration system ACS for calibrating the articulated robot 14, where the controller 10C is communicably connected to the automatic calibration system ACS. In the method, the articulated robot 14 transports and places the pallet load article units CU (FIG. 26, Block 2610) onto the pallet support SPAL so as to build the pallet load PAL on the pallet building base 301. The at least one three-dimensional camera 310C1-310C4 generates three-dimensional imaging of the pallet support SPAL (FIG. 26, Block 2620) on the pallet building base 301 and of a pallet load build on the pallet support SPAL. The controller 10C automatically calibrates the articulated robot 14 (FIG. 26, Block 2630), from a substantially uncalibrated state. The controller 10C automatically teaches the articulated robot 14 a location of the pallet station (FIG. 26, Block 2640) resolving a position of the end effector (e.g., end of arm tool 410) to the pallet station to build the pallet load PAL with placement of the pallet load article units CU on the pallet support SPAL. The controller 10C calibrates the at least one three-dimensional camera 310C1-310C4 (FIG. 26, Block 2650) relative to the end effector (e.g., end of arm tool 410).

Figures 26, 27:
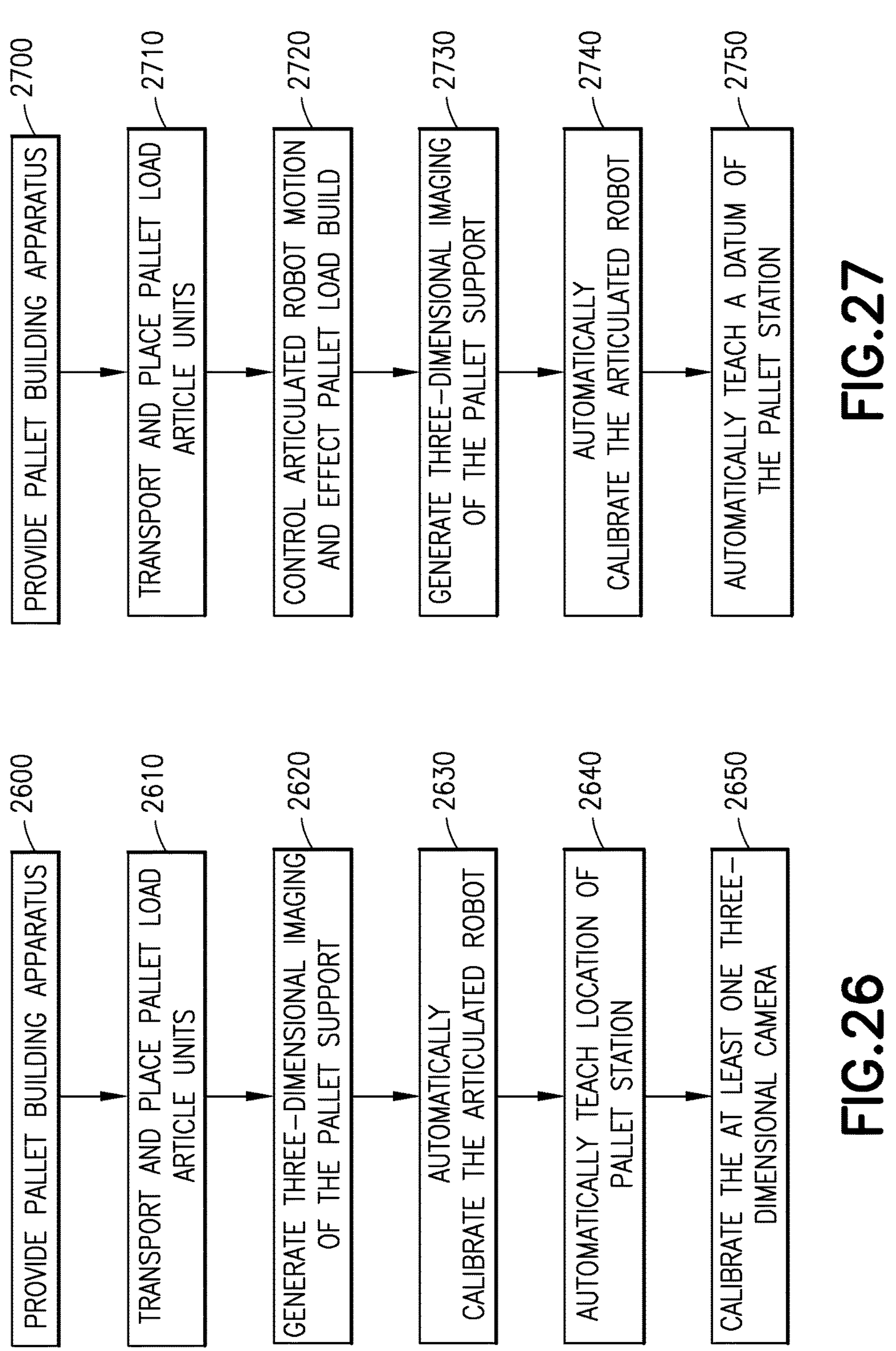
FIG. 26 is an exemplary flow diagram of a method in accordance with aspects of the disclosed embodiment.
FIG. 27 is an exemplary flow diagram of a method in accordance with aspects of the disclosed embodiment.

Referring to FIGS. 3A-3D, 5A-13, 15, 19A-25, and 27, a building, method for automatically with a pallet building apparatus (such as palletizer cell 10), a pallet load PAL of pallet load article units CU onto a pallet support SPAL is provided. In the method, the pallet building apparatus is provided (FIG. 27, Block 2700) and includes a frame 24 defining a pallet station with a pallet building base 301 for the pallet support SPAL. The articulated robot 14 is connected to the frame 24 and has a drive section 14DS with multiple independent drive axis (e.g., of drives 14D) arranged in a robot reference frame, and an end effector (e.g., end of arm tool 410) configured to hold the pallet load article unit CU in transport. A controller 10C is operably connected to the at least one articulated robot 14, and an automatic calibration system ACS for calibrating the articulated robot includes at least one three-dimensional camera 310C1-310C4. The at least one three-dimensional camera 310C1-310C4 is connected to the frame 24 and is configured to three-dimensionally image at least one of part of the articulated robot 14, and the pallet support SPAL or pallet load build on the pallet building base 301. The articulated robot 14 transports and places the pallet load article units CU (FIG. 27, Block 2710) onto the pallet support SPAL so as to build the pallet load PAL on the pallet building base 301. The controller controls s articulated robot motion, relative to the pallet building base, and effects therewith a pallet load build of the pallet load PAL (FIG. 27, Block 2720). The controller 10C generates three-dimensional imaging of the pallet support SPAL on the pallet building base 301 and of the pallet load build on the pallet support SPAL (FIG. 27, Block 2730). The controller 10C is communicably connected to the automatic calibration system ACS and automatically calibrates, with the three-dimensional image, the articulated robot 14 (FIG. 27, Block 2740) from a substantially uncalibrated state, and automatically teaches the articulated robot 14 a datum (as described herein) of the pallet station (FIG. 27, Block 2750), characterizing a placement location for each of the pallet load article units CU placed with the end effector that builds the pallet load PAL on the pallet support SPAL.

In accordance with one or more aspects of the present disclosure a pallet building apparatus for automatically building a pallet load of pallet load article units onto a pallet support, the pallet building apparatus comprises:

a frame defining a pallet station with a pallet building base for the pallet support;

an articulated robot connected to the frame and having a drive section with multiple independent drive axis arranged in a robot reference frame, the articulated robot being configured so as to transport and place the pallet load article units onto the pallet support so as to build the pallet load on the pallet building base, the articulated robot having an end effector configured to hold the pallet load article unit in transport;

at least one three-dimensional camera, connected to the frame separate and distinct of the articulated robot, and disposed to generate three-dimensional imaging of the pallet support on the pallet building base and of a pallet load build on the pallet support;

a controller operably connected to the at least one articulated robot and the at least one three-dimensional camera, the controller being configured to control articulated robot motion, relative to the pallet building base, and effect therewith the pallet load build of the pallet load; and an automatic calibration system for calibrating the articulated robot, the controller being communicably connected to the automatic calibration system, and being configured so as to automatically calibrate the articulated robot, from a substantially uncalibrated state, and automatically teach the articulated robot a location of the pallet station resolving a position of the end effector to the pallet station to build the pallet load with placement of the pallet load article units on the pallet support, and the controller being configured to calibrate the at least one three-dimensional camera relative to the end effector.

In accordance with one or more aspects of the present disclosure the controller and automatic calibration system is configured to effect automatic calibration and auto-teaching of the articulated robot substantially coincident with the automatic calibration of each of the at least one three-dimensional camera imaging each pallet load article unit, placed by the articulated robot, building the pallet load.

In accordance with one or more aspects of the present disclosure the automatic calibration system includes one or more of structure and indicia with calibration features connected to the end effector, the calibration features having a predetermined characteristic describing a predetermined or known shape or pattern.

In accordance with one or more aspects of the present disclosure the calibration features are dependent from the end effector, or the calibration features and end effector are commonly dependent from a common member of the articulated robot, and the calibration features and end effector move as a unit relative to the frame with each articulation of the articulated robot.

In accordance with one or more aspects of the present disclosure the calibration features are disposed with respect to the articulated robot so that the predetermined characteristic are dispositive of a predetermined relation between calibration features and the robot reference frame.

In accordance with one or more aspects of the present disclosure the automatic calibration system includes an electromagnetic sensor, separate and distinct from the three-dimensional camera, configured to sense the calibration features, the controller being communicably coupled to the electromagnetic sensor and register a sensor signal embodying the predetermined characteristics for a corresponding pose of the articulated robot (and a corresponding pose of the calibration features due to articulated robot motion) substantially coincident with the electromagnetic sensor sensing the calibration features and generating the sensor signal.

In accordance with one or more aspects of the present disclosure the controller is configured to move the articulated robot and position the calibration features to an initial position in which the electromagnetic sensor senses the calibration features, the controller being configured to resolve a pose of the calibration features with respect to an electromagnetic sensor reference frame, and from the pose resolved determine a transformation between the electromagnetic sensor reference frame and a three-dimensional camera reference frame so as to calibrate the at least one three-dimensional camera.

In accordance with one or more aspects of the present disclosure a pallet building apparatus for automatically building a pallet load of pallet load article units onto a pallet support is provided. The pallet building apparatus includes: a frame defining a pallet station with a pallet building base for the pallet support; an articulated robot connected to the frame and having a drive section with multiple independent drive axis arranged in a robot reference frame, the articulated robot being configured so as to transport and place the pallet load article units onto the pallet support so as to build the pallet load on the pallet building base, the articulated robot having an end effector configured to hold the pallet load article unit in transport; a controller: operably connected to the at least one articulated robot, the controller being configured to control articulated robot motion, relative to the pallet building base, and effect therewith a pallet load build of the pallet load, and disposed to generate three-dimensional imaging of the pallet support on the pallet building base and of the pallet load build on the pallet support; and an automatic calibration system, for calibrating the articulated robot, including at least one three-dimensional camera, the at least one three-dimensional camera is connected to the frame and is configured to three-dimensionally image at least one of part of the articulated robot, and the pallet support or pallet load build on the pallet building base; wherein the controller communicably connected to the automatic calibration system so as to automatically calibrate, with the three-dimensional image, articulated the robot from a substantially uncalibrated state, and automatically teach the articulated robot a datum of the pallet station and characterizing a placement location for each of the pallet load article units placed with the end effector that builds the pallet load on the pallet support.

In accordance with one or more aspects of the present disclosure the at least one three-dimensional camera is connected to the frame separate and distinct of the articulated robot.

In accordance with one or more aspects of the present disclosure the controller is configured to resolve a position of the end effector to the pallet station to build the pallet load with placement of the pallet load article units on the pallet support.

In accordance with one or more aspects of the present disclosure the controller is configured to calibrate the at least one three-dimensional camera relative to the end effector.

In accordance with one or more aspects of the present disclosure the controller and automatic calibration system are configured to effect automatic calibration and auto-teaching of the articulated robot substantially coincident with the automatic calibration of each of the at least one three-dimensional camera imaging each pallet load article unit, placed by the articulated robot, building the pallet load.

In accordance with one or more aspects of the present disclosure the automatic calibration system includes one or more of structure and indicia with calibration features connected to the end effector, the calibration features having a predetermined characteristic describing a predetermined or known shape or pattern.

In accordance with one or more aspects of the present disclosure the calibration features are dependent from the end effector, or the calibration features and end effector are commonly dependent from a common member of the articulated robot, and the calibration features and end effector move as a unit relative to the frame with each articulation of the articulated robot.

In accordance with one or more aspects of the present disclosure the calibration features are disposed with respect to the articulated robot so that the predetermined characteristic are dispositive of a predetermined relation between calibration features and the robot reference frame.

In accordance with one or more aspects of the present disclosure the automatic calibration system includes an electromagnetic sensor, separate and distinct from the three-dimensional camera, configured to sense the calibration features, the controller being communicably coupled to the electromagnetic sensor and register a sensor signal embodying the predetermined characteristics for a corresponding pose of the articulated robot substantially coincident with the electromagnetic sensor sensing the calibration features and generating the sensor signal.

In accordance with one or more aspects of the present disclosure the controller is configured to move the articulated robot and position the calibration features to an initial position in which the electromagnetic sensor senses the calibration features, the controller being configured to resolve a pose of the calibration features with respect to an electromagnetic sensor reference frame, and from the pose resolved determine a transformation between the electromagnetic sensor reference frame and a three-dimensional camera reference frame so as to calibrate the at least one three-dimensional camera.

In accordance with one or more aspects of the present disclosure a method for automatically building, with a pallet building apparatus, a pallet load of pallet load article units onto a pallet support is provided. The method includes: providing a pallet building apparatus comprising: a frame defining a pallet station with a pallet building base for the pallet support, an articulated robot connected to the frame and having a drive section with multiple independent drive axis arranged in a robot reference frame, and an end effector configured to hold the pallet load article unit in transport, at least one three-dimensional camera, connected to the frame separate and distinct of the articulated robot, a controller operably connected to the at least one articulated robot and the at least one three-dimensional camera, the controller being configured to control articulated robot motion, relative to the pallet building base, and effect therewith the pallet load build of the pallet load, and an automatic calibration system for calibrating the articulated robot, where the controller is communicably connected to the automatic calibration system; transporting and placing, with the articulated robot, the pallet load article units onto the pallet support so as to build the pallet load on the pallet building base; generating, with the at least one three-dimensional camera, three-dimensional imaging of the pallet support on the pallet building base and of a pallet load build on the pallet support; automatically calibrating, with the controller, the articulated robot, from a substantially uncalibrated state; automatically teaching, with the controller, the articulated robot a location of the pallet station resolving a position of the end effector to the pallet station to build the pallet load with placement of the pallet load article units on the pallet support; and calibrating, with the controller, the at least one three-dimensional camera relative to the end effector.

In accordance with one or more aspects of the present disclosure the controller and automatic calibration system effect automatic calibration and auto-teaching of the articulated robot substantially coincident with the automatic calibration of each of the at least one three-dimensional camera imaging each pallet load article unit, placed by the articulated robot, building the pallet load.

In accordance with one or more aspects of the present disclosure the automatic calibration system includes one or more of structure and indicia with calibration features connected to the end effector, the calibration features having a predetermined characteristic describing a predetermined or known shape or pattern.

In accordance with one or more aspects of the present disclosure the calibration features are dependent from the end effector, or the calibration features and end effector are commonly dependent from a common member of the articulated robot, and the calibration features and end effector move as a unit relative to the frame with each articulation of the articulated robot.

In accordance with one or more aspects of the present disclosure the calibration features are disposed with respect to the articulated robot so that the predetermined characteristic are dispositive of a predetermined relation between calibration features and the robot reference frame.

In accordance with one or more aspects of the present disclosure the automatic calibration system includes an electromagnetic sensor, separate and distinct from the three-dimensional camera, and the method further comprises: sensing, with the electromagnetic sensor, the calibration features; and with the controller communicably coupled to the electromagnetic sensor, registering a sensor signal embodying the predetermined characteristics for a corresponding pose of the articulated robot substantially coincident with the electromagnetic sensor sensing the calibration features and generating the sensor signal.

In accordance with one or more aspects of the present disclosure the method further includes, with the controller: moving the articulated robot and positioning the calibration features to an initial position in which the electromagnetic sensor senses the calibration features, and resolving a pose of the calibration features with respect to an electromagnetic sensor reference frame, and from the pose resolved determining a transformation between the electromagnetic sensor reference frame and a three-dimensional camera reference frame so as to calibrate the at least one three-dimensional camera.

In accordance with one or more aspects of the present disclosure a method for automatically building, with a pallet building apparatus, a pallet load of pallet load article units onto a pallet support is provided. The method includes: providing a pallet building apparatus comprising: a frame defining a pallet station with a pallet building base for the pallet support, an articulated robot connected to the frame and having a drive section with multiple independent drive axis arranged in a robot reference frame, and an end effector configured to hold the pallet load article unit in transport, a controller operably connected to the at least one articulated robot, and an automatic calibration system for calibrating the articulated robot and including at least one three-dimensional camera, the at least one three-dimensional camera is connected to the frame and is configured to three-dimensionally image at least one of part of the articulated robot, and the pallet support or pallet load build on the pallet building base; transporting and placing, with the articulated robot, the pallet load article units onto the pallet support so as to build the pallet load on the pallet building base; controlling, with the controller, articulated robot motion, relative to the pallet building base, and effecting therewith a pallet load build of the pallet load; and generating, with the controller, three-dimensional imaging of the pallet support on the pallet building base and of the pallet load build on the pallet support; wherein the controller is communicably connected to the automatic calibration system and automatically calibrates, with the three-dimensional image, the articulated robot from a substantially uncalibrated state, and automatically teaches the articulated robot a datum of the pallet station, characterizing a placement location for each of the pallet load article units placed with the end effector that builds the pallet load on the pallet support.

In accordance with one or more aspects of the present disclosure the at least one three-dimensional camera is connected to the frame separate and distinct of the articulated robot.

In accordance with one or more aspects of the present disclosure the method further includes, resolving, with the controller, a position of the end effector to the pallet station to build the pallet load with placement of the pallet load article units on the pallet support.

In accordance with one or more aspects of the present disclosure the controller calibrates the at least one three-dimensional camera relative to the end effector.

In accordance with one or more aspects of the present disclosure the controller and automatic calibration system are effect automatic calibration and auto-teaching of the articulated robot substantially coincident with the automatic calibration of each of the at least one three-dimensional camera imaging each pallet load article unit, placed by the articulated robot, building the pallet load.

In accordance with one or more aspects of the present disclosure the automatic calibration system includes one or more of structure and indicia with calibration features connected to the end effector, the calibration features having a predetermined characteristic describing a predetermined or known shape or pattern.

In accordance with one or more aspects of the present disclosure the calibration features are dependent from the end effector, or the calibration features and end effector are commonly dependent from a common member of the articulated robot, and the calibration features and end effector move as a unit relative to the frame with each articulation of the articulated robot.

In accordance with one or more aspects of the present disclosure the calibration features are disposed with respect to the articulated robot so that the predetermined characteristic are dispositive of a predetermined relation between calibration features and the robot reference frame.

In accordance with one or more aspects of the present disclosure the automatic calibration system includes an electromagnetic sensor, separate and distinct from the three-dimensional camera, and the method further comprises: sensing the calibration features with the electromagnetic sensor; where the controller is communicably coupled to the electromagnetic sensor and registers a sensor signal embodying the predetermined characteristics for a corresponding pose of the articulated robot substantially coincident with the electromagnetic sensor sensing the calibration features and generating the sensor signal.

In accordance with one or more aspects of the present disclosure the method further includes, with the controller: moving the articulated robot and positioning the calibration features to an initial position in which the electromagnetic sensor senses the calibration features; and resolving a pose of the calibration features with respect to an electromagnetic sensor reference frame, and from the pose resolved determining a transformation between the electromagnetic sensor reference frame and a three-dimensional camera reference frame so as to calibrate the at least one three-dimensional camera.

It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace such alternatives, all modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the present disclosure.

What is claimed is:

1. A pallet building apparatus for automatically building a pallet load of pallet load article units onto a pallet support, the pallet building apparatus comprising:

- a frame defining a pallet station with a pallet building base for the pallet support;
- an articulated robot connected to the frame and having a drive section with multiple independent drive axis arranged in a robot reference frame, the articulated robot being configured so as to transport and place the pallet load article units onto the pallet support so as to build the pallet load on the pallet building base, the articulated robot having an end effector configured to hold the pallet load article unit in transport;
- at least one three-dimensional camera, connected to the frame separate and distinct of the articulated robot, and disposed to generate three-dimensional imaging of the pallet support on the pallet building base and of a pallet load build on the pallet support;
- a controller operably connected to the at least one articulated robot and the at least one three-dimensional camera, the controller being configured to control articulated robot motion, relative to the pallet building base, and effect therewith the pallet load build of the pallet load; and
- an automatic calibration system for calibrating the articulated robot, the controller being communicably connected to the automatic calibration system, and being configured so as to automatically calibrate the articulated robot, a substantially from uncalibrated state, and automatically teach the articulated robot a location of the pallet station resolving a position of the end effector to the pallet station to build the pallet load with placement of the pallet load article units on the pallet support, and the controller being configured to calibrate the at least one three-dimensional camera relative to the end effector.

2. The pallet building apparatus of claim 1, wherein the controller and automatic calibration system are configured to effect automatic calibration and auto-teaching of the articulated robot substantially coincident with the automatic calibration of each of the at least one three-dimensional camera imaging each pallet load article unit, placed by the articulated robot, building the pallet load.

3. The pallet building apparatus of claim 1, wherein the automatic calibration system includes one or more of structure and indicia with calibration features connected to the end effector, the calibration features having a predetermined characteristic describing a predetermined or known shape or pattern.

4. The pallet building apparatus of claim 3, wherein the calibration features are dependent from the end effector, or the calibration features and end effector are commonly dependent from a common member of the articulated robot, and the calibration features and end effector move as a unit relative to the frame with each articulation of the articulated robot.

5. The pallet building apparatus of claim 3, wherein the calibration features are disposed with respect to the articulated robot so that the predetermined characteristic are dispositive of a predetermined relation between calibration features and the robot reference frame.

6. The pallet building apparatus of claim 3, wherein the automatic calibration system includes an electromagnetic sensor, separate and distinct from the three-dimensional camera, configured to sense the calibration features, the controller being communicably coupled to the electromagnetic sensor and register a sensor signal embodying the predetermined characteristics for a corresponding pose of the articulated robot substantially coincident with the electromagnetic sensor sensing the calibration features and generating the sensor signal.

7. The pallet building apparatus of claim 6, wherein the controller is configured to move the articulated robot and position the calibration features to an initial position in which the electromagnetic sensor senses the calibration features, the controller being configured to resolve a pose of the calibration features with respect to an electromagnetic sensor reference frame, and from the pose resolved determine a transformation between the electromagnetic sensor reference frame and a three-dimensional camera reference frame so as to calibrate the at least one three-dimensional camera.

8. A pallet building apparatus for automatically building a pallet load of pallet load article units onto a pallet support, the pallet building apparatus comprising:

- a frame defining a pallet station with a pallet building base for the pallet support;
- an articulated robot connected to the frame and having a drive section with multiple independent drive axis arranged in a robot reference frame, the articulated robot being configured so as to transport and place the pallet load article units onto the pallet support so as to build the pallet load on the pallet building base, the articulated robot having an end effector configured to hold the pallet load article unit in transport;
- a controller:
  - operably connected to the at least one articulated robot, the controller being configured to control articulated robot motion, relative to the pallet building base, and effect therewith a pallet load build of the pallet load, and disposed to generate three-dimensional imaging of the pallet support on the pallet building base and of the pallet load build on the pallet support; and an automatic calibration system, for calibrating the articulated robot, including at least one three-dimensional camera, the at least one three-dimensional camera is connected to the frame and is configured to three-dimensionally image at least one of part of the articulated robot, and the pallet support or pallet load build on the pallet building base;

wherein the controller is communicably connected to the automatic calibration system so as to automatically calibrate, with the three-dimensional image, the articulated robot from a substantially uncalibrated state, and automatically teach the articulated robot a datum of the pallet station and characterizing a placement location for each of the pallet load article units placed with the end effector that builds the pallet load on the pallet support.

9. The pallet building apparatus of claim 8, wherein the at least one three-dimensional camera is connected to the frame separate and distinct of the articulated robot.

10. The pallet building apparatus of claim 8, wherein the controller is configured to resolve a position of the end effector to the pallet station to build the pallet load with placement of the pallet load article units on the pallet support.

11. The pallet building apparatus of claim 8, wherein the controller is configured to calibrate the at least one three-dimensional camera relative to the end effector.

12. The pallet building apparatus of claim 8, wherein the controller and automatic calibration system are configured to effect automatic calibration and auto-teaching of the articulated robot substantially coincident with the automatic calibration of each of the at least one three-dimensional camera imaging each pallet load article unit, placed by the articulated robot, building the pallet load.

13. The pallet building apparatus of claim 8, wherein the automatic calibration system includes one or more of structure and indicia with calibration features connected to the end effector, the calibration features having a predetermined characteristic describing a predetermined or known shape or pattern.

14. The pallet building apparatus of claim 13, wherein the calibration features are dependent from the end effector, or the calibration features and end effector are commonly dependent from a common member of the articulated robot, and the calibration features and end effector move as a unit relative to the frame with each articulation of the articulated robot.

15. The pallet building apparatus of claim 13, wherein the calibration features are disposed with respect to the articulated robot so that the predetermined characteristic are dispositive of a predetermined relation between calibration features and the robot reference frame.

16. The pallet building apparatus of claim 13, wherein the automatic calibration system includes an electromagnetic sensor, separate and distinct from the three-dimensional camera, configured to sense the calibration features, the controller being communicably coupled to the electromagnetic sensor and register a sensor signal embodying the predetermined characteristics for a corresponding pose of the articulated robot substantially coincident with the electromagnetic sensor sensing the calibration features and generating the sensor signal.

17. The pallet building apparatus of claim 16, wherein the controller is configured to move the articulated robot and position the calibration features to an initial position in which the electromagnetic sensor senses the calibration features, the controller being configured to resolve a pose of the calibration features with respect to an electromagnetic sensor reference frame, and from the pose resolved determine a transformation between the electromagnetic sensor reference frame and a three-dimensional camera reference frame so as to calibrate the at least one three-dimensional camera.

18. A method for automatically building, with a pallet building apparatus, a pallet load of pallet load article units onto a pallet support, the method comprising:

providing a pallet building apparatus comprising:

a frame defining a pallet station with a pallet building base for the pallet support, an articulated robot connected to the frame and having a drive section with multiple independent drive axis arranged in a robot reference frame, and an end effector configured to hold the pallet load article unit in transport, at least one three-dimensional camera, connected to the frame separate and distinct of the articulated robot, a controller operably connected to the at least one articulated robot and the at least one three-dimensional camera, the controller being configured to control articulated robot motion, relative to the pallet building base, and effect therewith the pallet load build of the pallet load, and an automatic calibration system for calibrating the articulated robot, where the controller is communicably connected to the automatic calibration system;

transporting and placing, with the articulated robot, the pallet load article units onto the pallet support so as to build the pallet load on the pallet building base;

generating, with the at least one three-dimensional camera, three-dimensional imaging of the pallet support on the pallet building base and of a pallet load build on the pallet support;

automatically calibrating, with the controller, the articulated robot, from a substantially uncalibrated state;

automatically teaching, with the controller, the articulated robot a location of the pallet station resolving a position of the end effector to the pallet station to build the pallet load with placement of the pallet load article units on the pallet support; and calibrating, with the controller, the at least one three-dimensional camera relative to the end effector.

19. The method of claim 18, wherein the controller and automatic calibration system effect automatic calibration and auto-teaching of the articulated robot substantially coincident with the automatic calibration of each of the at least one three-dimensional camera imaging each pallet load article unit, placed by the articulated robot, building the pallet load.

20. The method of claim 18, wherein the automatic calibration system includes one or more of structure and indicia with calibration features connected to the end effector, the calibration features having a predetermined characteristic describing a predetermined or known shape or pattern.

21. The method of claim 20, wherein the calibration features are dependent from the end effector, or the calibration features and end effector are commonly dependent from a common member of the articulated robot, and the calibration features and end effector move as a unit relative to the frame with each articulation of the articulated robot.

22. The method of claim 20, wherein the calibration features are disposed with respect to the articulated robot so that the predetermined characteristic are dispositive of a predetermined relation between calibration features and the robot reference frame.

23. The method of claim 20, wherein the automatic calibration system includes an electromagnetic sensor, separate and distinct from the three-dimensional camera, and the method further comprises:

sensing, with the electromagnetic sensor, the calibration features; and with the controller communicably coupled to the electromagnetic sensor, registering a sensor signal embodying the predetermined characteristics for a corresponding pose of the articulated robot substantially coincident with the electromagnetic sensor sensing the calibration features and generating the sensor signal.

24. The method of claim 23, further comprising, with the controller:

moving the articulated robot and positioning the calibration features to an initial position in which the electromagnetic sensor senses the calibration features, and resolving a pose of the calibration features with respect to an electromagnetic sensor reference frame, and from the pose resolved determining a transformation between the electromagnetic sensor reference frame and a three-dimensional camera reference frame so as to calibrate the at least one three-dimensional camera.

25. A method for automatically building, with a pallet building apparatus, a pallet load of pallet load article units onto a pallet support, the method comprising:

providing a pallet building apparatus comprising:

a frame defining a pallet station with a pallet building base for the pallet support, an articulated robot connected to the frame and having a drive section with multiple independent drive axis arranged in a robot reference frame, and an end effector configured to hold the pallet load article unit in transport, a controller operably connected to the at least one articulated robot, and an automatic calibration system for calibrating the articulated robot and including at least one three-dimensional camera, the at least one three-dimensional camera is connected to the frame and is configured to three-dimensionally image at least one of part of the articulated robot, and the pallet support or pallet load build on the pallet building base;

transporting and placing, with the articulated robot, the pallet load article units onto the pallet support so as to build the pallet load on the pallet building base;

controlling, with the controller, articulated robot motion, relative to the pallet building base, and effecting therewith a pallet load build of the pallet load; and generating, with the controller, three-dimensional imaging of the pallet support on the pallet building base and of the pallet load build on the pallet support;

wherein the controller is communicably connected to the automatic calibration system and automatically calibrates, with the three-dimensional image, the articulated robot from a substantially uncalibrated state, and automatically teaches the articulated robot a datum of the pallet station, characterizing a placement location for each of the pallet load article units placed with the end effector that builds the pallet load on the pallet support.

26. The method of claim 25, wherein the at least one three-dimensional camera is connected to the frame separate and distinct of the articulated robot.

27. The method of claim 25, further comprising, resolving, with the controller, a position of the end effector to the pallet station to build the pallet load with placement of the pallet load article units on the pallet support.

28. The method of claim 25, wherein the controller calibrates the at least one three-dimensional camera relative to the end effector.

29. The method of claim 25, wherein the controller and automatic calibration system are effect automatic calibration and auto-teaching of the articulated robot substantially coincident with the automatic calibration of each of the at least one three-dimensional camera imaging each pallet load article unit, placed by the articulated robot, building the pallet load.

30. The method of claim 25, wherein the automatic calibration system includes one or more of structure and indicia with calibration features connected to the end effector, the calibration features having a predetermined characteristic describing a predetermined or known shape or pattern.

31. The method of claim 30, wherein the calibration features are dependent from the end effector, or the calibration features and end effector are commonly dependent from a common member of the articulated robot, and the calibration features and end effector move as a unit relative to the frame with each articulation of the articulated robot.

32. The method of claim 30, wherein the calibration features are disposed with respect to the articulated robot so that the predetermined characteristic are dispositive of a predetermined relation between calibration features and the robot reference frame.

33. The method of claim 30, wherein the automatic calibration system includes an electromagnetic sensor, separate and distinct from the three-dimensional camera, and the method further comprises:

sensing the calibration features with the electromagnetic sensor;

where the controller is communicably coupled to the electromagnetic sensor and registers a sensor signal embodying the predetermined characteristics for a corresponding pose of the articulated robot substantially coincident with the electromagnetic sensor sensing the calibration features and generating the sensor signal.

34. The method of claim 33, further comprising, with the controller:

moving the articulated robot and positioning the calibration features to an initial position in which the electromagnetic sensor senses the calibration features; and resolving a pose of the calibration features with respect to an electromagnetic sensor reference frame, and from the pose resolved determining a transformation between the electromagnetic sensor reference frame and a three-dimensional camera reference frame so as to calibrate the at least one three-dimensional camera.

* * * * *